US008873356B2

(12) United States Patent
Yamazaki et al.

(10) Patent No.: US 8,873,356 B2
(45) Date of Patent: Oct. 28, 2014

(54) DISC DEVICE HAVING A PICKER FOR CONVEYING A PLURALTY OF DISCS IN A STACKED STATE

(71) Applicant: Panasonic Corporation, Osaka (JP)

(72) Inventors: Takuto Yamazaki, Nara (JP); Masanori Ohnishi, Osaka (JP); Yasue Chihara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/916,899

(22) Filed: Jun. 13, 2013

(65) Prior Publication Data

US 2013/0336098 A1 Dec. 19, 2013

(30) Foreign Application Priority Data

Jun. 15, 2012 (JP) ................. 2012-136004

(51) Int. Cl.
*G11B 17/22* (2006.01)
*G11B 23/03* (2006.01)

(52) U.S. Cl.
CPC .......... *G11B 17/221* (2013.01); *G11B 23/0323* (2013.01); *G11B 17/225* (2013.01)
USPC ................................... 369/30.78

(58) Field of Classification Search
USPC ................. 369/30.85, 30.78, 30.55
See application file for complete search history.

(56) References Cited

U.S. PATENT DOCUMENTS

| 4,787,074 | A | * | 11/1988 | Deck et al. | ................ | 369/30.55 |
| 4,912,575 | A | | 3/1990 | Shiosaki | | |
| 5,255,138 | A | * | 10/1993 | Serita et al. | ................ | 360/98.04 |
| 5,267,225 | A | * | 11/1993 | Fukasawa et al. | ......... | 369/30.85 |
| 5,274,516 | A | * | 12/1993 | Kakuta et al. | ................ | 360/92.1 |
| 5,539,712 | A | * | 7/1996 | Menke et al. | ............. | 369/30.58 |
| 5,742,570 | A | * | 4/1998 | Taki et al. | ................ | 369/30.63 |
| 5,818,802 | A | * | 10/1998 | Menke et al. | ............. | 369/30.55 |
| 5,841,744 | A | * | 11/1998 | Menke et al. | ............. | 369/30.85 |
| 5,910,939 | A | * | 6/1999 | Shiba et al. | ................ | 369/30.57 |
| 6,636,462 | B1 | * | 10/2003 | Drynkin et al. | ............. | 369/30.19 |
| 8,276,170 | B2 | * | 9/2012 | Douglass et al. | ............. | 720/617 |

FOREIGN PATENT DOCUMENTS

| JP | 62-257668 | 11/1987 |
| JP | 2005-25888 | 1/2005 |
| JP | 2011-204311 | 10/2011 |

* cited by examiner

*Primary Examiner* — Angel Castro
(74) *Attorney, Agent, or Firm* — Wenderoth, Lind & Ponack, L.L.P.

(57) ABSTRACT

A disc device with which the disc replacing time can further be suppressed includes a picker for conveying a plurality of discs in a stacked state, and a carrier which retains the plurality of discs in a stacked state, which supplies the retained plurality of discs to a respective one of a plurality of disc drives, respectively, and which collects the supplied plurality of discs in a stacked state. The carrier is structured to retain a stacked object made up of a first plurality of discs collected from the plurality of disc drives and a second plurality of discs to be supplied next to the plurality of disc drives.

7 Claims, 48 Drawing Sheets

Fig.36
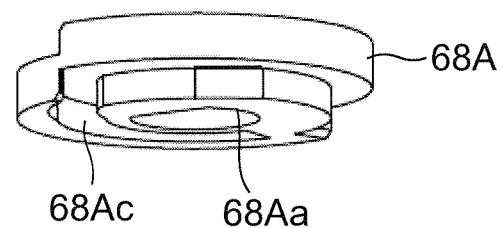
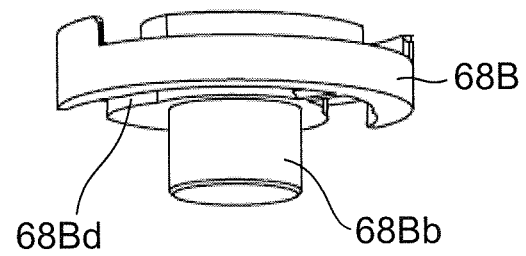

DISC DEVICE HAVING A PICKER FOR CONVEYING A PLURALTY OF DISCS IN A STACKED STATE

TECHNICAL FIELD

The technical field relates to a disc device that supplies a disc (a disc-like information recording medium such as a CD or a DVD) to each of a plurality of disc drives.

BACKGROUND ART

Conventionally, as a disc device of this type, a device disclosed in Japanese Unexamined Patent Publication No. 2011-204311 A is known, for example. The disc device disclosed in Japanese Unexamined Patent Publication No. 2011-204311 A includes a magazine including a plurality of magazine trays each storing one disc, and a plurality of disc drives. The disc device disclosed in Japanese Unexamined Patent Publication No. 2011-204311 A is structured such that: an arbitrary magazine tray is drawn out from the magazine; one disc stored in the drawn out magazine tray is suctioned and held by a suction pad; and further, the disc is placed on the tray of an arbitrary disc drive. Further, the disc device disclosed in Japanese Unexamined Patent Publication No. 2011-204311 A is structured such that discs supplied to a plurality of disc drives, respectively, are suctioned and held by the suction pad one by one, to be returned to an arbitrary magazine tray.

In recent years, with the progress of cloud computing, it is required to further increase data capacity in the disc device. In order to increase the data capacity, simply thinking, the number of magazines should be increased and the number of discs to be stored should be increased.

However, an increase in the number of pieces of magazines inevitably increases the distance between the disc drive and a magazine that is placed at the farthest position from the disc drive. This invites an increase in the disc conveying time. Further, since the disc device disclosed in Japanese Unexamined Patent Publication No. 2011-204311 A is structured to convey the disc one by one between the magazines and the disc drives, considerable time is required for replacing the discs supplied to a plurality of disc drives by next discs.

Accordingly, the applicant has developed a disc device including a carrier which retains a plurality of discs in a stacked state, which supplies the retained plurality of discs to a plurality of disc drives, respectively, and which collects the supplied plurality of discs in a stacked state.

With the disc device, since a plurality of discs can be collectively conveyed between the magazine and any disc drive, the time required for replacing the discs supplied to a plurality of disc drives by next discs (hereinafter referred to as the disc replacing time) can be drastically suppressed.

However, this disc device still remains a matter of improvement in suppressing the disc replacing time.
(Expertise which Forms Basis of Present Disclosure)

With the aforementioned disc device developed by the applicant, discs are replaced in accordance with the procedure shown in FIG. 61.

Firstly, a first plurality of discs supplied to a plurality of disc drives, respectively, are collected by the carrier in a stacked state (Step S11).

Next, the first magazine tray is conveyed to the pass position (Step S12). Here, "the pass position" refers to the position where a plurality of discs can be passed from the carrier to any magazine tray or from any magazine tray to the carrier.

Next, the carrier stores the collected first plurality of discs in the first magazine tray (Step S13).

Next, the first magazine tray is returned to a prescribed position (Step S14).

Next, the second magazine tray is conveyed to the pass position (Step S15).

Next, the carrier retains the second plurality of discs stored in the second magazine tray (Step S16).

Next, the second plurality of discs retained by the carrier are supplied to a plurality of disc drives, respectively (Step S17).

Thus, replacement of the discs is completed.

The inventors have made the following findings as a result of an extensive study on a further reduction in the disc replacing time. The inventors have found that the disc replacing time can be drastically suppressed by: in place of allowing the carrier to immediately store the collected first plurality of discs in the first magazine tray, allowing the carrier to retain, in addition to the collected first plurality of discs, the second plurality of discs stored in the second magazine tray; and allowing the second plurality of discs to be supplied to a plurality of disc drives. Based on the expertise, the inventors arrived at the following disclosure.

SUMMARY OF THE INVENTION

The present disclosure provides a disc device with which the disc replacing time can be further suppressed.

The disc device according to the present disclosure comprises, a carrier which retains a plurality of discs in a stacked state, which supplies the retained plurality of discs to a plurality of disc drives, respectively, and which collects the supplied plurality of discs in a stacked state, wherein the carrier is structured to retain a stacked object made up of a first plurality of discs collected from the plurality of disc drives and a second plurality of discs to be supplied next to the plurality of disc drives.

With the disc device of the present disclosure, the disc replacing time can be further suppressed.

According to a first aspect of the present disclosure, there is provided a disc device comprising:

a carrier which retains a plurality of discs in a stacked state, which supplies the retained plurality of discs to a plurality of disc drives, respectively, and which collects the supplied plurality of discs in a stacked state, wherein the carrier is structured to retain a stacked object made up of a first plurality of discs collected from the plurality of disc drives and a second plurality of discs to be supplied next to the plurality of disc drives.

According to a second aspect of the present disclosure, there is provided the disc device according to the first aspect, wherein in a state where the carrier retains the stacked object, a first retaining space where the first plurality of discs are located has a height corresponding to an integral multiple of two or more times a height of a second retaining space where the second plurality of discs are located.

According to a third aspect of the present disclosure, there is provided the disc device according to the first or second aspect, wherein the carrier includes a disc holding unit which holds a bottommost disc out of the plurality of discs, the second retaining space is provided above the disc holding unit, and the first retaining space is provided to be in contact with the second retaining space on the second retaining space.

According to a fourth aspect of the present disclosure, there is provided the disc device according to the first aspect, wherein the carrier is structured to release retaining of the first plurality of discs above the second plurality of discs and stack the first plurality of discs on the second plurality of discs, and thereafter to retain the stacked object made up of the first plurality of discs and the second plurality of discs.

According to a fifth aspect of the present disclosure, there is provided the disc device according to the fourth aspect, wherein the carrier includes a disc chuck unit which is inserted into a center hole provided to each of the first and second plurality of discs, to retain the first and second plurality of discs.

According to a sixth aspect of the present disclosure, there is provided the disc device according to the fourth or fifth aspect, further comprising:

a first magazine tray which stores the first plurality of discs, and a second magazine tray which stores the second plurality of discs, wherein the carrier stacks the first plurality of discs on the second plurality of discs stored in the second magazine tray, thereafter retaining the stacked object; the carrier supplying the second plurality of discs out of the stacked object to the plurality of disc drives, respectively, thereafter storing the first plurality of discs in the first magazine tray.

According to a seventh aspect of the present disclosure, there is provided the disc device according to the sixth aspects, further comprising a picker which conveys the first and second magazine trays, wherein the picker allows the carrier to be capable of retaining the stacked object by conveying the second magazine tray to a pass position in a state where the carrier retains the first plurality of discs, when the carrier supplies the second plurality of discs out of the stacked object to the plurality of disc drives, respectively, the picker conveys the second magazine tray to a prescribed position and conveys the first magazine tray to the pass position, and after the carrier stores the first plurality of discs in the first magazine tray, the picker conveys the first magazine tray to a prescribed position.

BRIEF DESCRIPTION OF THE DRAWINGS

These and other aspects and features of the present disclosure will become clear from the following description taken in conjunction with the preferred embodiments thereof with reference to the accompanying drawings, in which:

FIG. 36 is a perspective view of two cam plates included in the camshaft unit shown in FIG. 35 as seen diagonally from below.

DETAILED DESCRIPTION OF THE INVENTION

In the following, a detailed description will be given of an embodiment with reference to the drawings as appropriate. It is to be noted that more details than necessary may not be given. For example, a detailed description of well-known matters or a repetitive description of substantially identical structures may be omitted, for the purpose of avoiding unnecessary redundancy in the following description, to facilitate understanding of the person skilled in the art.

It is to be noted that, the inventors provide the accompanying drawings and the following description in order for the person skilled in the art to fully understand the present disclosure. Accordingly, such drawings and description are not intended to limit the subject of the invention defined in the claims.

Embodiment

Figure 1:
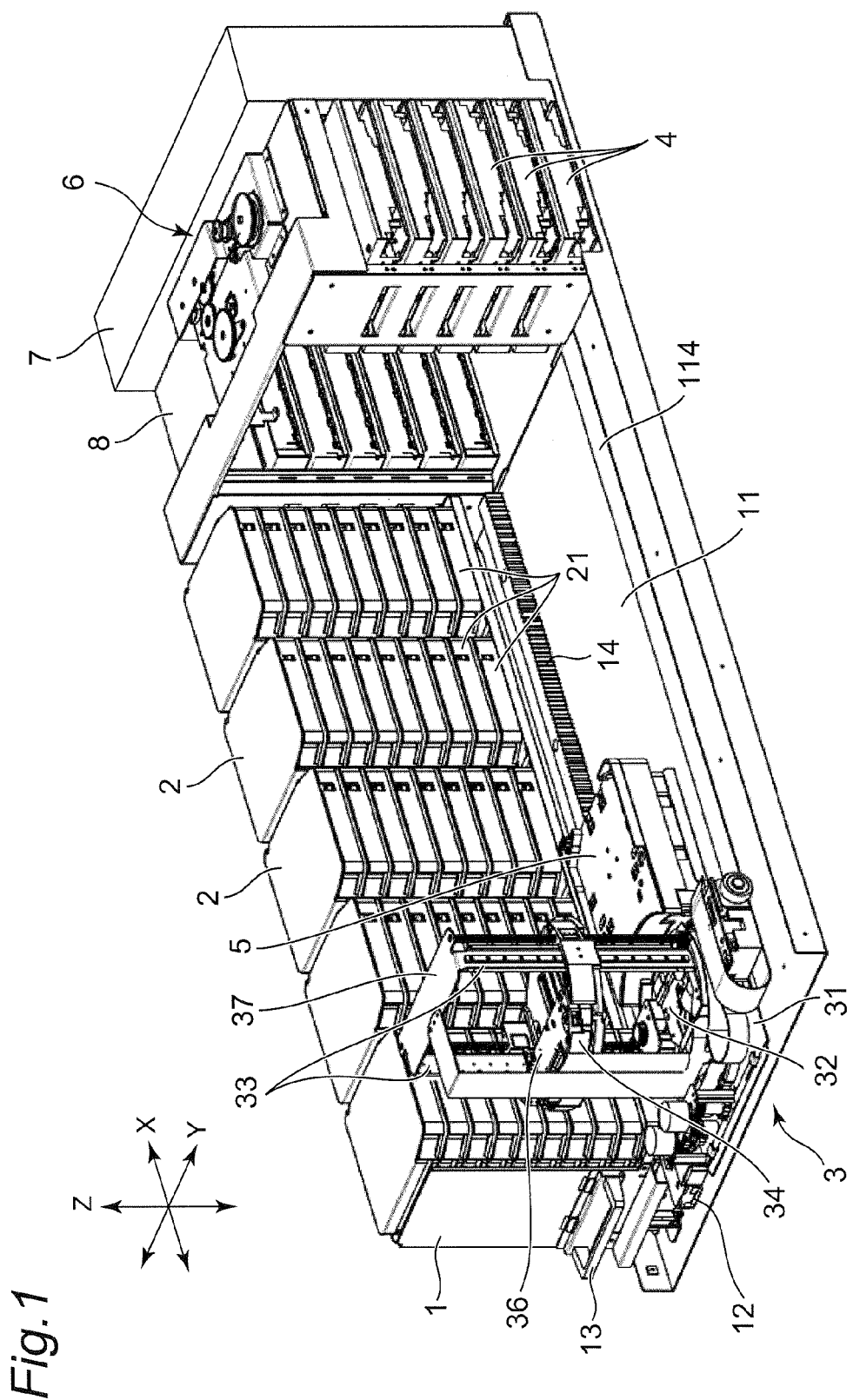
FIG. 1 is a perspective view showing the schematic structure of a disc device according to the present embodiment.

FIG. 1 is a perspective view showing the schematic structure of a disc device according to the present embodiment. It is to be noted that, in the present embodiment, the left side in FIG. 1 is referred to as the "device-front side", and the right side in FIG. 1 is referred to as the "device-rear side".

Firstly, with reference to FIG. 1, a description will be given of an overall structure of the disc device according to the present embodiment.

The disc device according to the present embodiment includes two magazine stockers 1, 1. The two magazine stockers 1, 1 are provided on a bottom chassis 11 so as to oppose to each other in a device width direction Y. It is to be noted that, in FIG. 1, one of the magazine stockers 1 (on the near side) is not shown. Further, the top panel and the partition plate of the magazine stocker 1 are not shown in FIG. 1.

Each magazine stocker 1 stores a plurality of magazines 2. Each magazine 2 includes magazine trays 21 storing a plurality of (e.g., 12 pieces of) discs. Between the two magazine stockers 1, 1, a picker 3 draws out the magazine tray 21 from one magazine 2 selected from a plurality of magazines 2 and holds the magazine tray 21.

The picker 3 is structured to convey the held magazine tray 21 to a position near a plurality of disc drives 4 arranged at the device-rear side. The picker 3 is integrally provided with a lifter 5 that pushes out a plurality of discs from the magazine tray 21.

Each of the disc drives 4 is an apparatus that performs recording or reproducing of information on or from a disc. Further, each of the disc drives 4 is a tray-scheme disc drive that load discs using trays. The plurality of disc drives 4 are stacked in a device height direction Z, and arranged so as to be adjacent to the magazine stockers 1, 1 on the device-rear side. Between the plurality of disc drives 4 arranged as being stacked so as to be adjacent to one magazine stocker 1 and the plurality of disc drives 4 arranged as being stacked so as to be adjacent to the other magazine stocker 1, a carrier 6 is provided.

The carrier 6 is structured to: retain a plurality of discs pushed out by the lifter 5 in such a stacked state; separate one disc from the retained plurality of discs above a tray 4a (see FIG. 23) ejected from an arbitrary disc drive 4; and place the separated disc on the tray 4a.

Further toward device-rear side than the carrier 6 and the plurality of disc drives 4, an electric circuit and a power supply 7 are provided. The electric circuit and the power supply 7 are provided with a control unit that controls operations (motor and the like) of devices such as the picker 3, the disc drives 4, the carrier 6, and the like. The control unit is connected to, for example, a host computer that manages data. The host computer sends commands to the control unit to perform operations such as data reading from or writing on the specified magazine 2, based on instructions from the operator. The control unit controls the operation of the devices such as the picker 3, the disc drive 4, the carrier 6, and the like according to the commands.

Next, a description will be given of the structure of the aforementioned devices and components in more detail.

The magazine stockers 1 are provided along guide rails 12 that slidably guide the picker 3. The guide rails 12 are provided so as to extend in a device depth direction X (in the longitudinal direction of the rows of magazines 1,1). A grip 13 is provided at the side face on the device-front side of each magazine stocker 1. The magazine stocker 1 can be shifted toward the device-front side by the grip 13 being pulled. Each magazine stocker 1 is provided with a partition plate (not shown) formed to be grid-like as seen from the device width direction Y. In each of the space surrounded by the partition plate, the magazine 2 is stored.

Figure 2A:
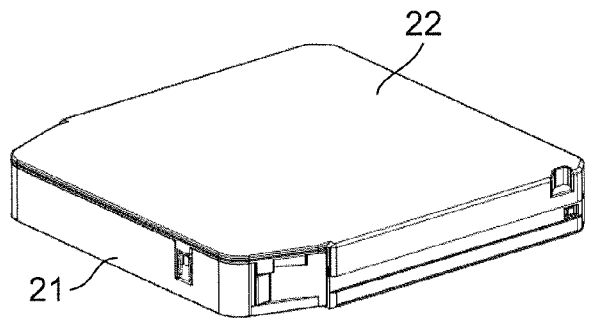
FIG. 2A is a perspective view of a magazine included in the disc device shown in FIG. 1.
Figure 2B:
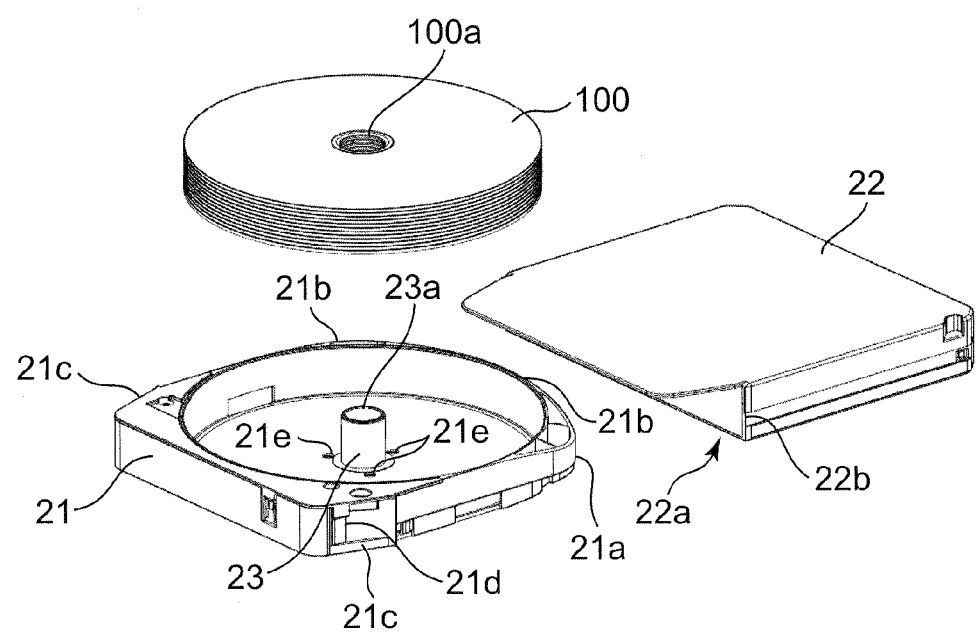
FIG. 2B is an exploded perspective view of the magazine shown in FIG. 2A.

As shown in FIG. 2A, the magazine 2 includes the magazine tray 21, and a case 22 that has a substantially rectangular parallelepiped shape and that stores the magazine tray 21. As shown in FIG. 2B, at the front face (one side face) of the case 22, an opening 22a into which the magazine tray 21 can be inserted and taken out is provided.

The magazine tray 21 is formed to have an outer shape being substantially rectangular in planar view. The magazine tray 21 stores a plurality of discs 100 as being stacked in close contact with one another. At the opposing corner portions that position on the back side of the magazine case 22 in a state where the magazine tray 21 is stored in the case 22, cut portions 21a, 21a are formed. Further, a side face 21b that positions on the back side of the magazine case 22 in the state where the magazine tray 21 is stored in the magazine case 22 is formed to be arc-like as a whole including the cut portions 21a, 21a.

At the opposing corner portions that position on the front face side of the case 22 in the state where the magazine tray 21 is stored in the case 22, cutout portions 21c, 21c are formed. On the inner side of the cutout portions 21c, 21c in the width direction of the magazine tray 21, engaging recess portions 21d, 21d with which a pair of hooks 35, 35, whose description will follow, engage are formed.

The magazine tray 21 is provided with a core rod 23, which is inserted into a center hole 100a provided at each of the plurality of discs 100 to restrict shifting of the discs 100 in the plane direction. This core rod 23 prevents the discs 100 from being damaged by such shifting of the discs 100 in the plane direction. The core rod 23 is provided with an engaging portion 23a for engaging with a spindle head 67b of a disc chuck unit 62, whose description will follow.

Near the core rod 23, at least one hole 21e into which up-and-down pins 52a of the lifter 5, whose description will follow, are provided. In the present embodiment, three holes 21e are provided at an interval of 120 degrees. Further, the three holes 21e are provided at the position opposing to the non-recording-and-reproducing region of the inner circumferential portion of each disc 100 when the disc 100 is inserted into the core rod 23.

Figure 3:
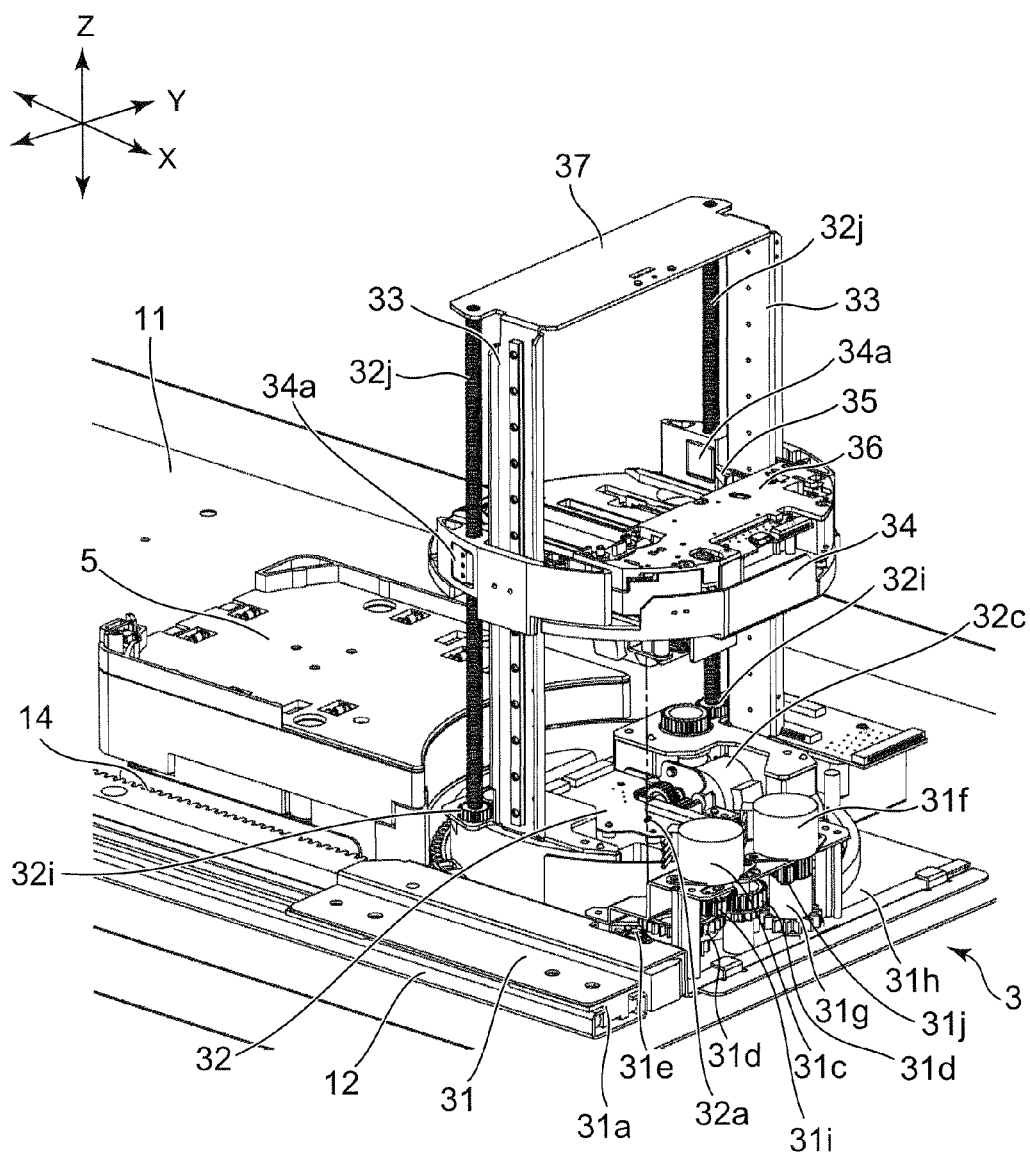
FIG. 3 is a perspective view of a picker included in the disc device shown in FIG. 1.

The picker 3 includes a run base 31. As shown in FIG. 3, a movable platform 31a slidably shifting along the guide rail 12 is attached on one magazine stocker 1 side of the run base 31.

Figure 4:
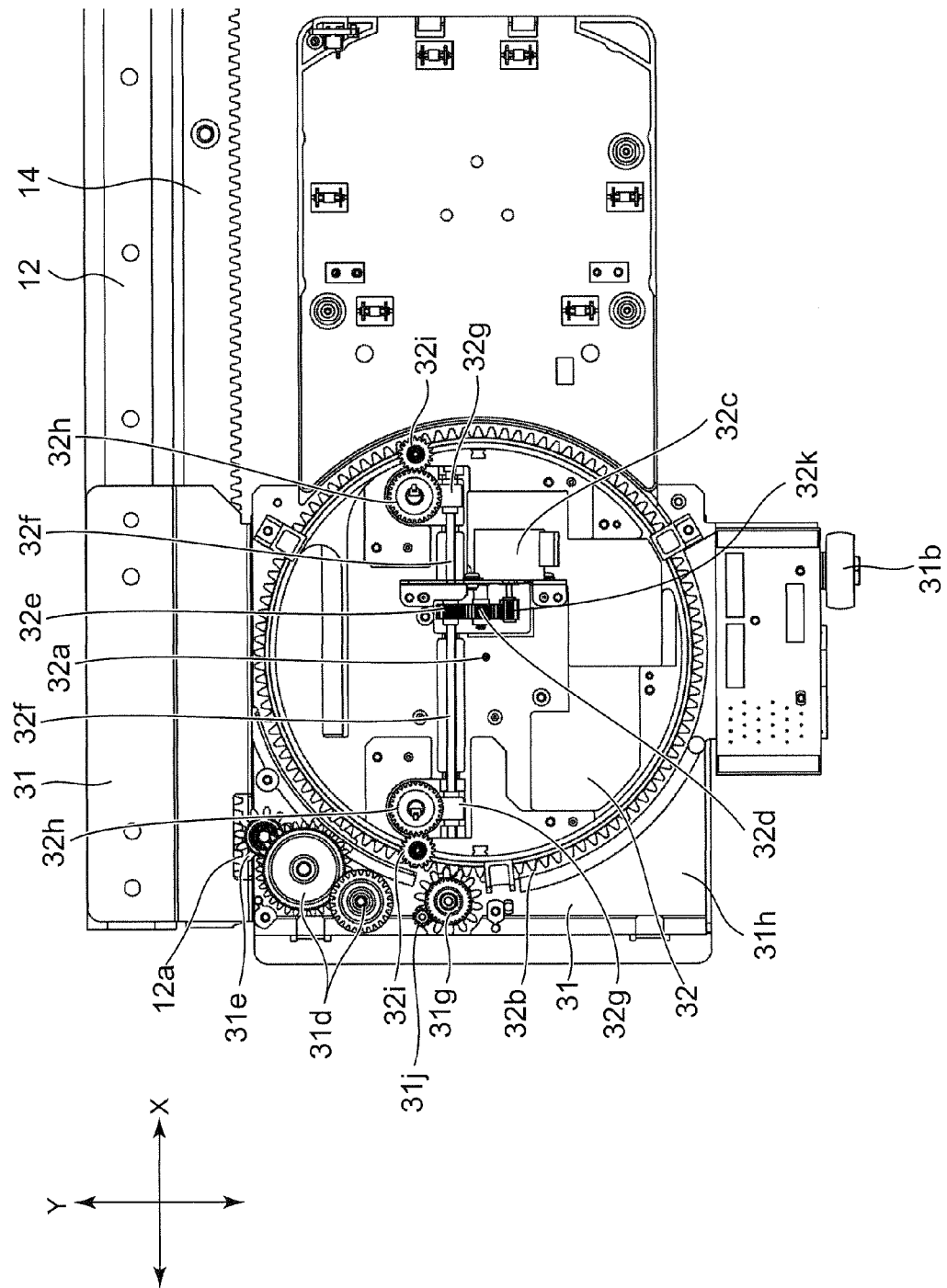
FIG. 4 is a plan view showing the structure of a drive system of an up-and-down table included in the picker shown in FIG. 3.

Further, as shown in FIG. 4, a roller 31b is attached on other magazine stocker 1 side of the run base 31.

As shown in FIG. 3, the run base 31 is provided with a picker motor 31c that produces drive force for causing the picker 3 to shift in the device depth direction X. A reduction gear 31d meshes with a motor gear 31i, into which the drive shaft of the picker motor 31c is press fitted. The reduction gear 31d meshes with a pinion gear 31e. The pinion gear 31e meshes with a rack 14 provided adjacent to the guide rail 12 to extend in the device depth direction X.

When the picker motor 31c is driven, the drive force of the picker motor 31c is transferred to the pinion gear 31e via the motor gear 31i and the reduction gear 31d, to rotate the pinion gear 31e. Here, the rack 14 is fixed to the bottom chassis 11. On the other hand, the run base 31 is not fixed to the bottom chassis 11. Accordingly, when the pinion gear 31e rotates, the pinion gear 31e shifts along the rack 14, whereby the picker 3 shifts in the device depth direction X.

As the picker motor 31c, for example, a stepping motor is employed. Applying a prescribed pulse to the picker motor 31c, the picker 3 can be shifted to be located at the front of a prescribed magazine 2.

A picker base 31h made of resin is attached to the run base 31 made of a sheet metal. The picker base 31h is provided with a rotary table 32 so as to be rotatable substantially about a rotation axis 32a extending in the device height direction Z. Further, the picker base 31h is provided with a rotary table motor 31f that produces the drive force for causing the rotary table 32 to rotate. As shown in FIG. 4, a reduction gear 31g meshes with the motor gear 31j, into which the drive shaft of the rotary table motor 31f is press fitted. The reduction gear 31g meshes with a rotary table gear 32b provided at the outer circumferential portion of the rotary table 32. When the rotary table motor 31f is driven, the drive force of the rotary table motor 31f is transferred to the rotary table gear 32b via the motor gear 31j and the reduction gear 31g, whereby the rotary table 32 rotates.

The rotary table 32 is provided with a pair of up-and-down rails 33, 33 extending along the device height direction Z and opposing to each other. Between the pair of up-and-down rails 33, 33, an up-and-down table 34 is provided. Further, the rotary table 32 is provided with an up-and-down table motor 32c that produces the drive force for causing the up-and-down table 34 to rise and lower.

As shown in FIG. 4, a relay gear 32d meshes with a motor gear 32k, into which the drive shaft of the up-and-down table motor 32c is press fitted. The relay gear 32d meshes with a coupling shaft gear 32e. A coupling shaft 32f penetrates through the center portion of the coupling shaft gear 32e. Worms 32g, 32g are fixed to the opposite ends of the coupling shaft 32f. The worms 32g mesh with relay gears 32h. The relay gears 32h mesh with lead screw gears 32i. The lead screw gears 32i are fixed to lead screws 32j. The lead screws 32j are provided so as to extend in the device height direction Z along the up-and-down rails 33. As shown in FIG. 3, nuts 34a provided to the up-and-down table 34 are screwed with the lead screws 32j.

When the up-and-down table motor 32c is driven, the drive force of the up-and-down table motor 32c is transferred to the lead screws 32j via the motor gear 32k, the relay gear 32d, the coupling shaft gear 32e, the coupling shaft 32f, the worms 32g, the relay gears 32h, and the lead screw gears 32i, whereby the lead screws 32j rotate. Thus, the up-and-down table 34 rises and lowers in the device height direction Z along the pair of up-and-down rails 33 and 33.

Figure 8:
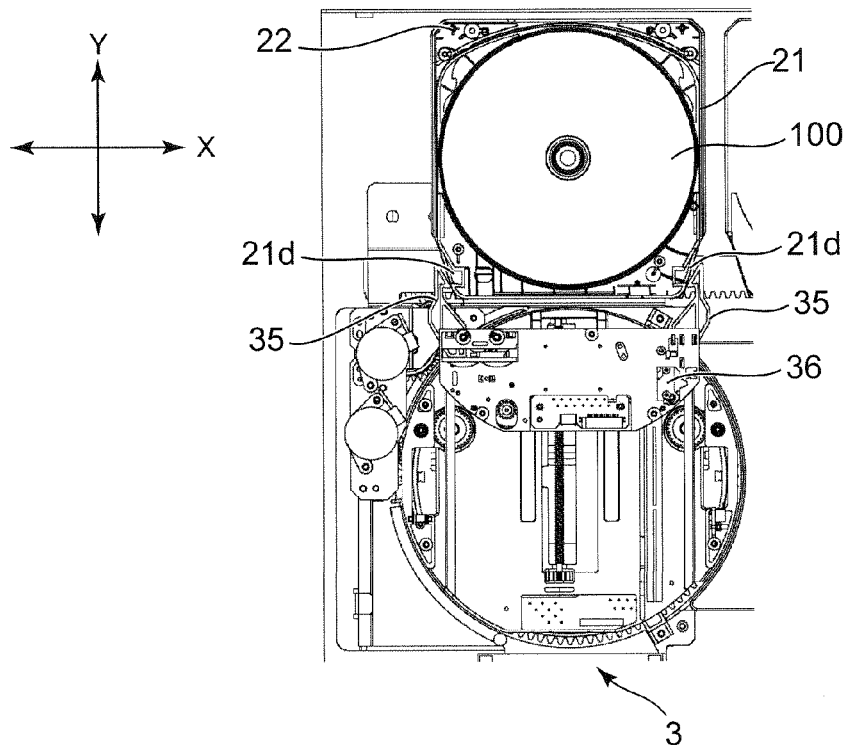
FIG. 8 is a plan view showing the manner of the picker shown in FIG. 3 drawing out the magazine tray from the magazine.

As shown in FIG. 8, the up-and-down table 34 is provided with a pair of hooks 35, 35 that can engage with engaging recess portions 21d of the magazine tray 21, and a chuck 36 functioning to open and close the pair of hooks 35, 35 and to cause the pair of hooks 35, 35 to shift forward and backward.

Figure 5:
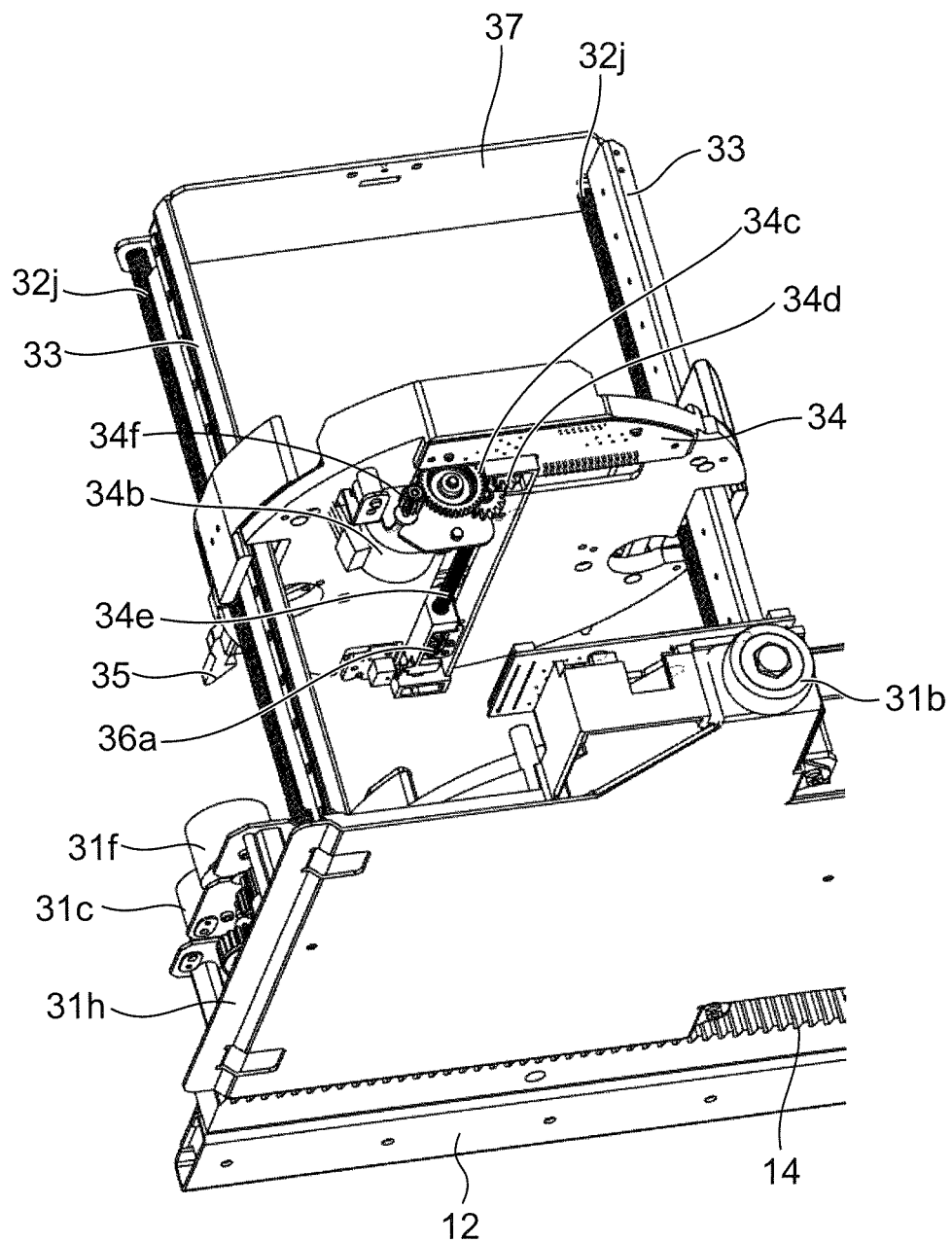
FIG. 5 is a perspective view of the picker shown in FIG. 3 as seen diagonally from below.

Further, as shown in FIG. 5, the up-and-down table 34 is provided with a chuck motor 34b. A reduction gear 34c meshes with a motor gear 34f, into which the drive shaft of the chuck motor 34b is press fitted. The reduction gear 34c meshes with a lead screw gear 34d. The lead screw gear 34d is fixed to a lead screw 34e. The lead screw 34e is provided to extend in the direction perpendicular to the line connecting between the pair of up-and-down rails 33 and 33. A nut 36a fixed to the chuck 36 is screwed with the lead screw 34e.

When the chuck motor 34b is driven, the drive force of the chuck motor 34b is transferred to the nut 36a via the motor gear 34f, the reduction gear 34c, the lead screw gear 34d, and the lead screw 34e, whereby the chuck 36 shifts along the lead screw 34e.

Further, the chuck 36 is structured to be capable of adjusting the interval of the pair of hooks 35, 35. By the chuck 36 reducing the interval between the pair of hooks 35, 35, the pair of hooks 35, 35 can engage with the engaging recess portions 21d, 21d of the magazine tray 21. On the other hand, by the chuck 36 increasing the interval of the pair of hooks 35, 35, the engaged state between the pair of hooks 35, 35 and the engaging recess portions 21d, 21d of the magazine tray 21 can be released.

The paired up-and-down rails 33 are attached to opposite side faces of a U-shaped angle plate 37, respectively. The top end portions of the paired lead screws 32j are rotatably attached to the top face of the angle plate 37.

The picker motor 31c, the rotary table motor 31f, the up-and-down table motor 32c, and the chuck motor 34b are connected to the control unit of the electric circuit and the power supply 7 via an FFC (flexible flat cable) 114 (see FIG. 1), and drive under control of the control unit.

Figure 6:
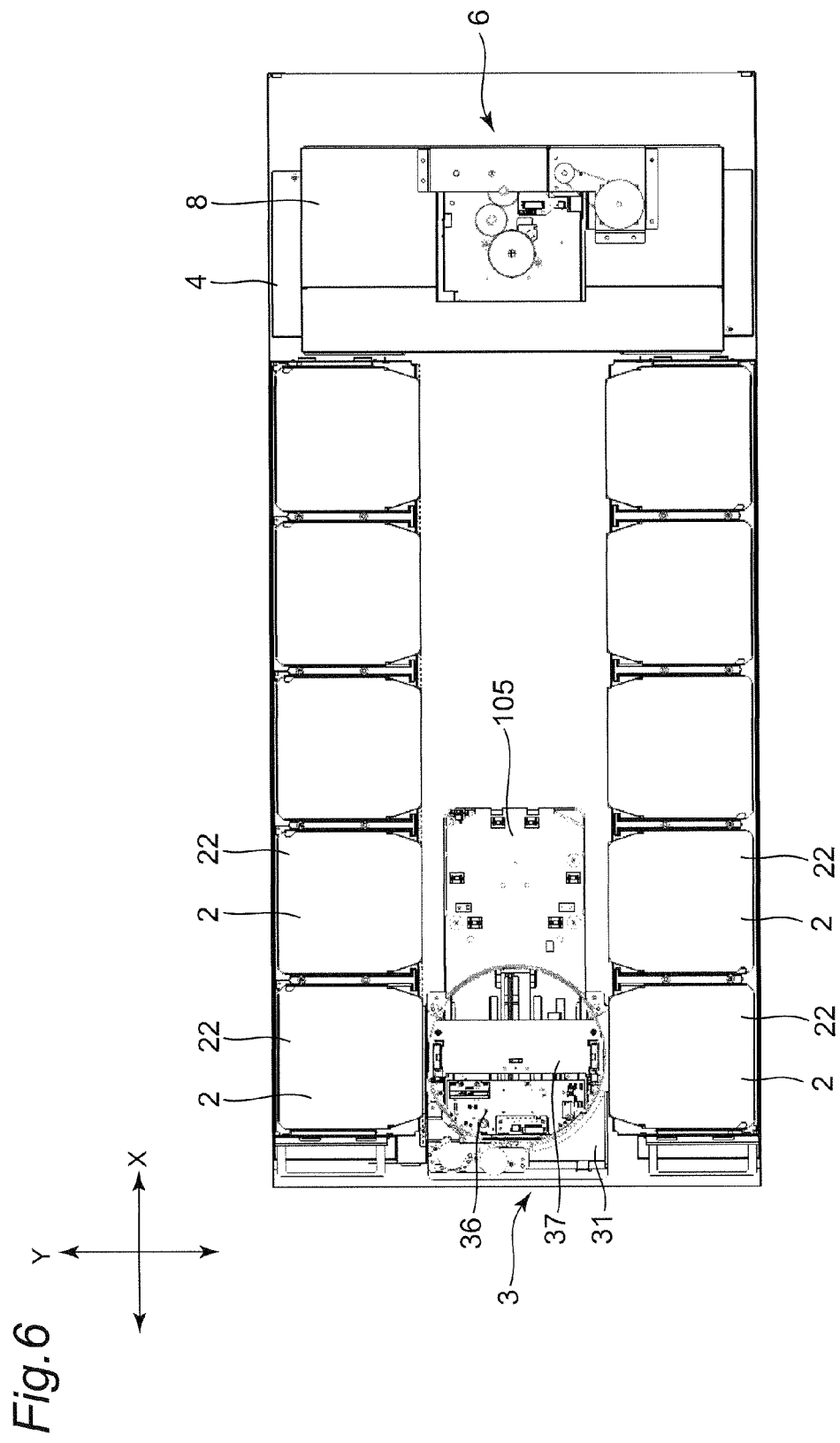
FIG. 6 is a plan view showing the state where the picker shown in FIG. 3 shifts to the position at the front of the magazine selected from a plurality of magazines.
Figure 7:
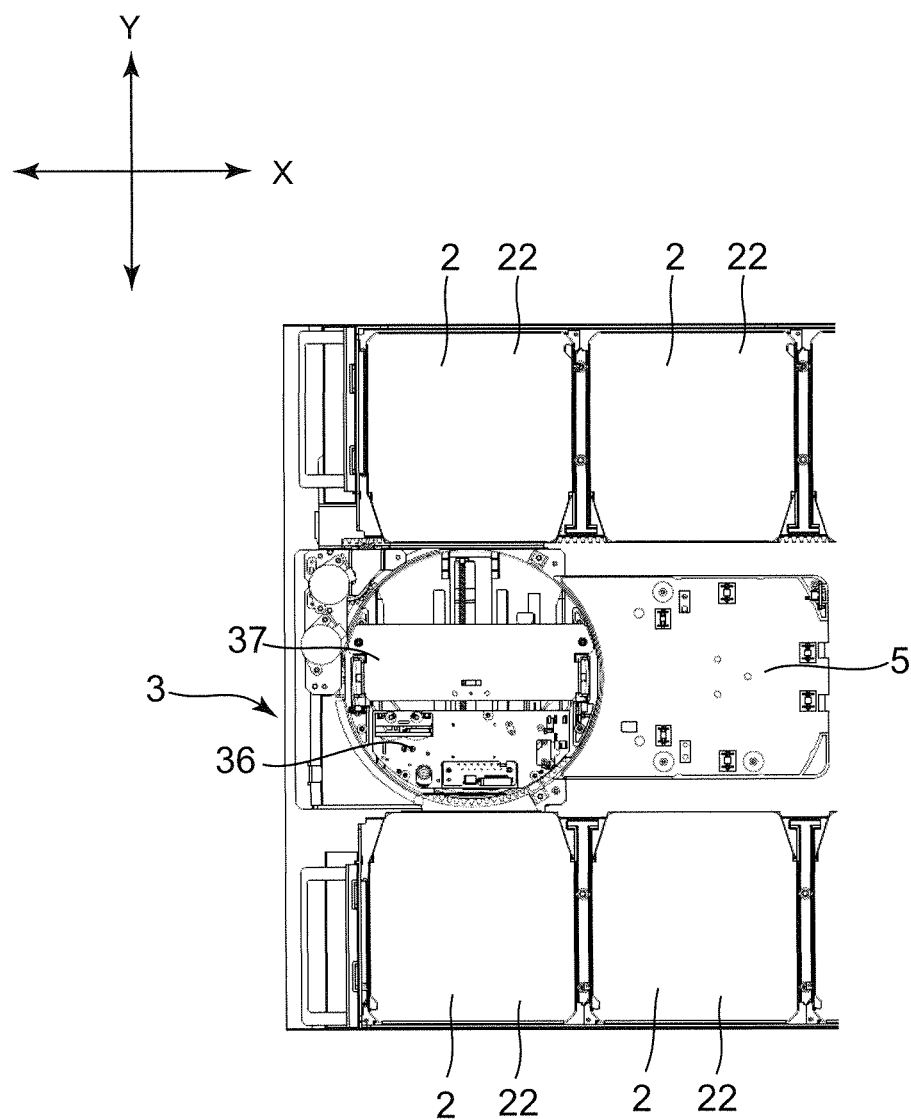
FIG. 7 is a plan view showing the manner of the picker shown in FIG. 3 drawing out a magazine tray from the magazine.

FIGS. 6 to 12 each show the manner of the picker 3 drawing out the magazine tray 21 from the case 22. As the run base 31 runs in the device depth direction X and the up-and-down table 34 rises and lowers in the device height direction Z along the pair of up-and-down rails 33, as shown in FIG. 6, the picker 3 shifts to the location at the front of one magazine 2 selected from a plurality of magazines 2. Further, as shown in FIG. 7, the rotary table 32 is rotated so that the chuck 36 is oriented to the front side of the magazine 2.

Figure 9:
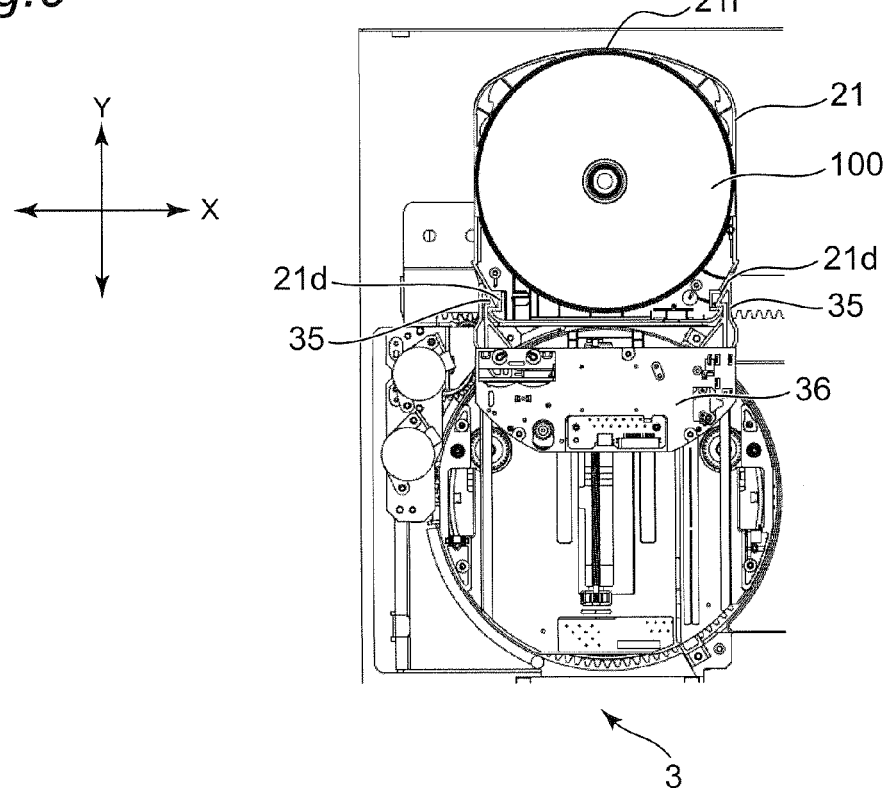
FIG. 9 is a plan view showing the manner of the picker shown in FIG. 3 drawing out the magazine tray from the magazine.

Thereafter, as shown in FIG. 8, the chuck 36 advances toward the magazine tray 21, whereby, as shown in FIG. 9, the pair of hooks 35, 35 is engaged with the engaging recess portions 21d, 21d of the magazine tray 21. In this state, by the chuck 36 receding from the case 22, the magazine tray 21 is drawn out from the case 22.

Figure 10:
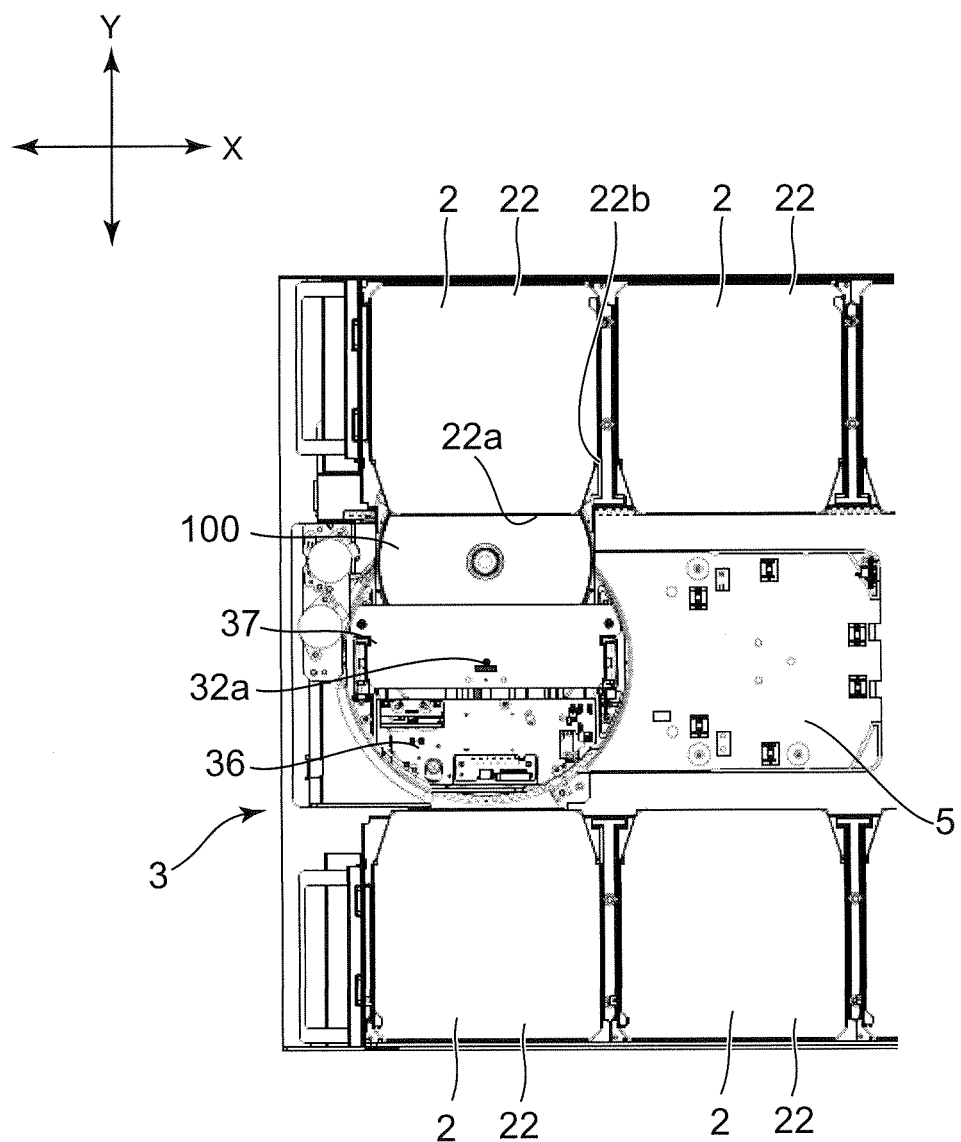
FIG. 10 is a plan view showing the manner of the picker shown in FIG. 3 drawing out the magazine tray from the magazine.
Figure 11:
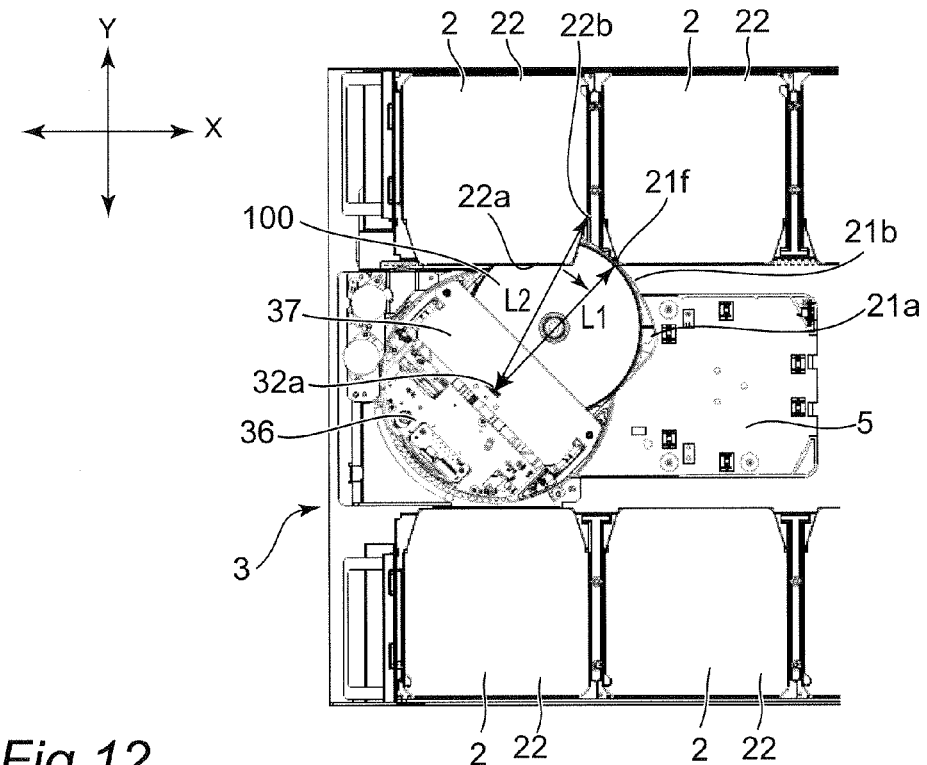
FIG. 11 is a plan view showing the manner of the picker shown in FIG. 3 drawing out the magazine tray from the magazine.
Figure 12:
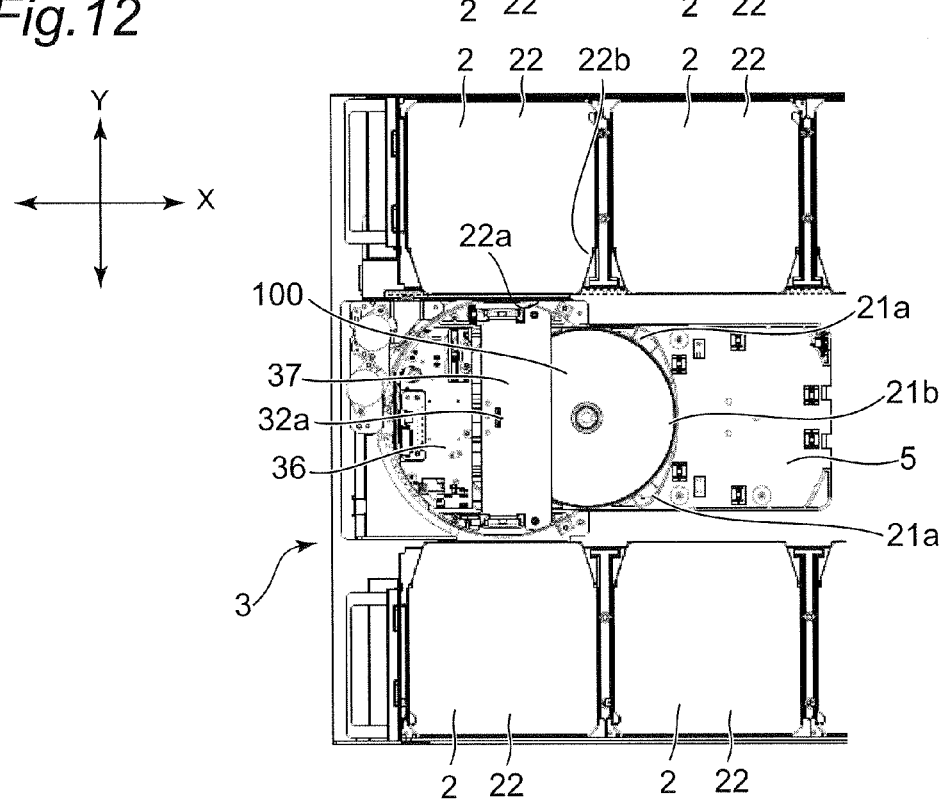
FIG. 12 is a plan view showing the state where the picker shown in FIG. 3 has drawn out the magazine tray from the magazine.

As shown in FIG. 10, by the chuck 36 receding (i.e., shifting to the location at the front of the case 22), after the cut portions 21a of the magazine tray 21 pass through the opening 22a of the case 22, the rotary table 32 rotates clockwise substantially about the rotation axis 32a. In other words, as shown in FIG. 11, when the distance L1 between a vertex 21f (i.e., the position farthest from the rotation axis 32a) of the side face 21b of the magazine tray 21 and the rotation axis 32a becomes smaller than the distance L2 between the front end portion 22b of the side face of the case 22 and the rotation axis 32a, the rotary table 32 rotates clockwise substantially about the rotation axis 32a. In accordance with the rotation of the rotary table 32, as shown in FIGS. 11 and 12, the magazine tray 21 rotates substantially about the rotation axis 32a. As a result, as shown in FIG. 12, the magazine tray 21 is completely drawn out from the case 22.

Figure 13:
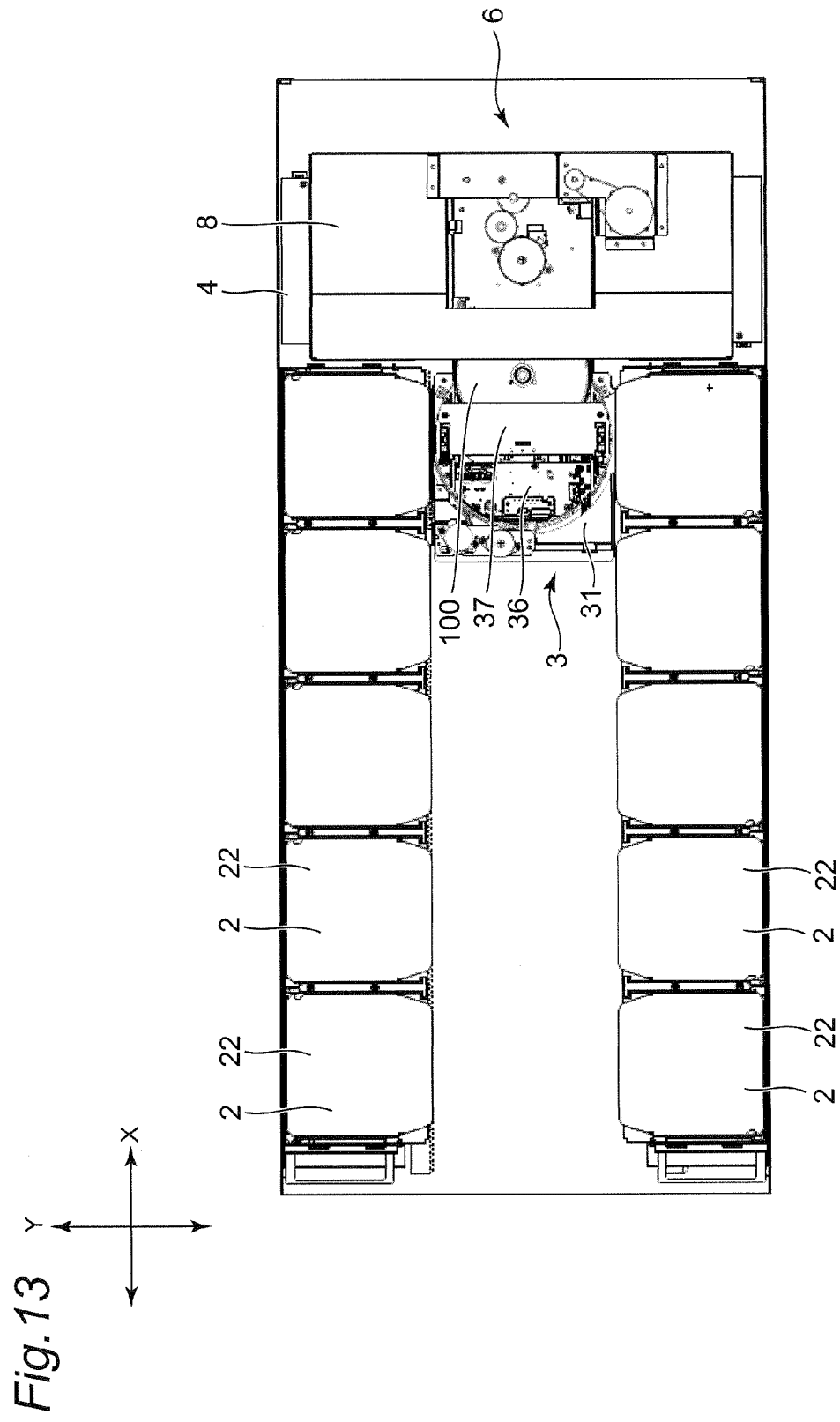
FIG. 13 is a plan view showing the state where the picker shown in FIG. 3 has conveyed the magazine tray to a position near the plurality of disc drives.
Figure 14:
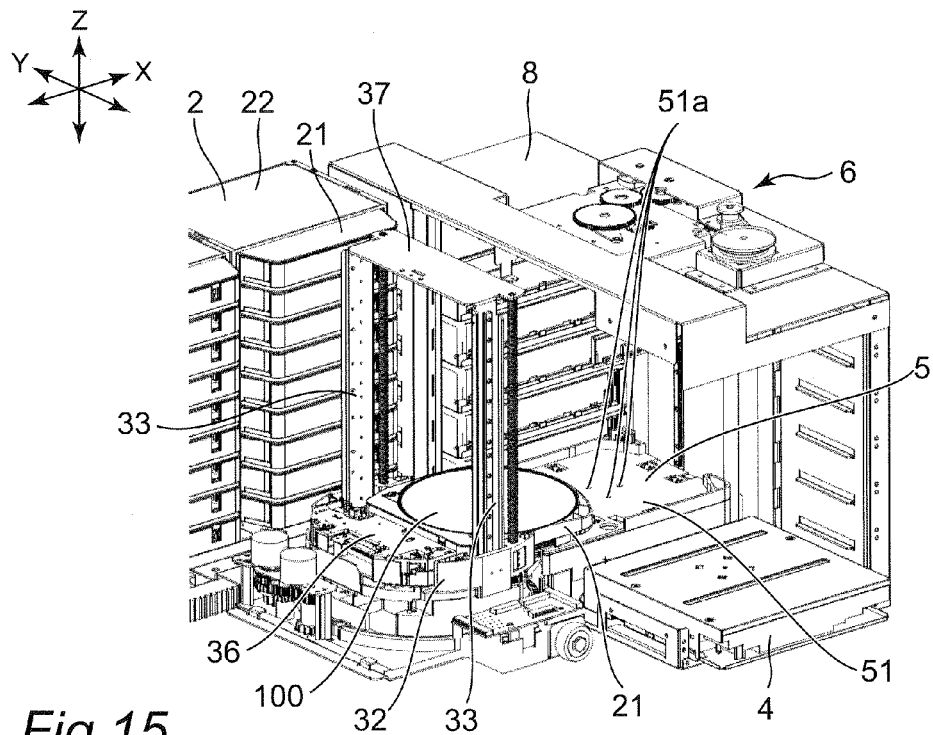
FIG. 14 is a perspective view showing the state where the picker shown in FIG. 3 has conveyed the magazine tray to a position near the plurality of disc drives.
Figure 15:
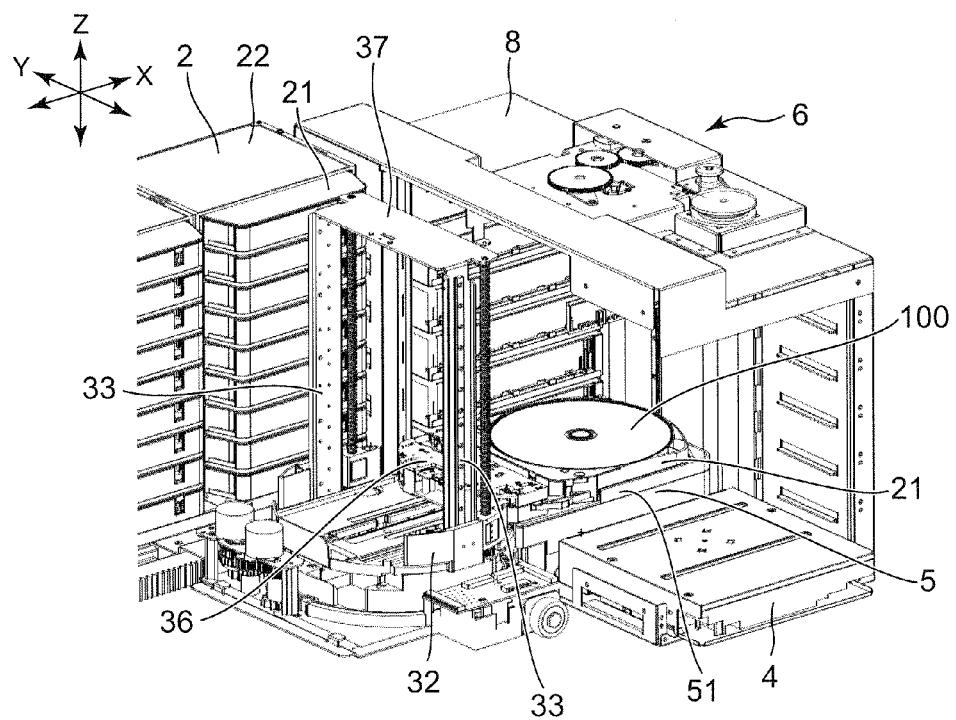
FIG. 15 is a perspective view showing the state where the picker shown in FIG. 3 has shifted the magazine tray to a position above a lifter included in the disc device shown in FIG. 1.

As shown in FIG. 12, the magazine tray 21 drawn out from the case 22 is conveyed to the location near the plurality of disc drives 4 as shown in FIGS. 13 and 14, by the run base 31 of the picker 3 running to the device-rear side. Thereafter, as shown in FIG. 15, the chuck 36 of the picker 3 advances, and the magazine tray 21 is placed at a prescribed position on the magazine tray guide 51 at the top of the lifter 5. It is to be noted that, the disc drives 4 on the near side are not shown in FIGS. 14 and 15. Similarly, the disc drives 4 on the near side are not shown also in FIGS. 21 to 28, which will be referred to later.

Figure 16:
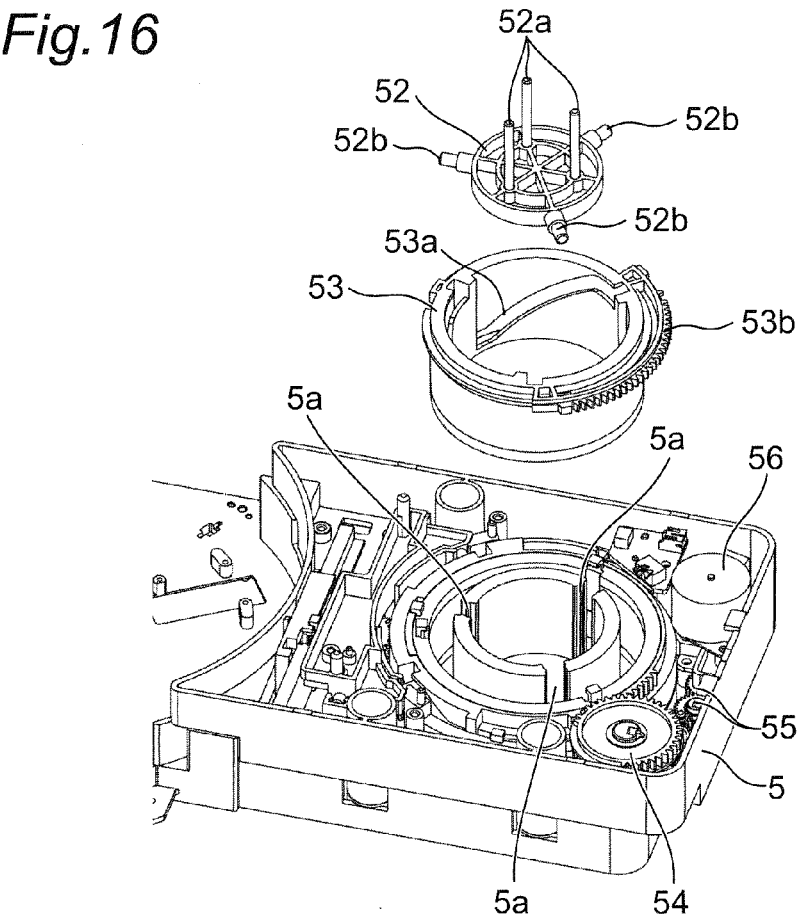
FIG. 16 is an exploded perspective view showing the state where a magazine tray guide of the lifter included in the disc device shown in FIG. 1 is removed.
Figure 17:
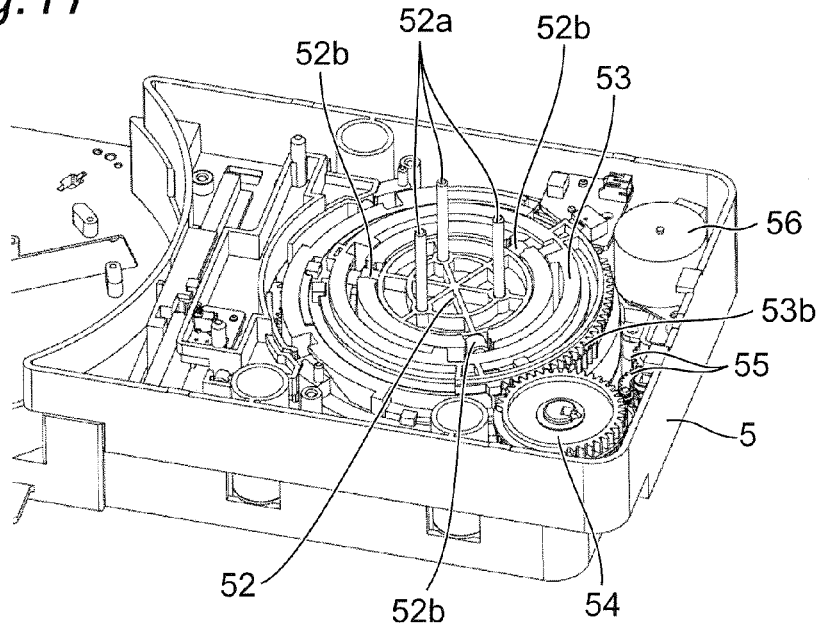
FIG. 17 is an assembly perspective view showing the state where the magazine tray guide of the lifter included in the disc device shown in FIG. 1 is removed.

FIG. 16 is an exploded perspective view showing the state where the magazine tray guide 51 of the lifter 5 is taken out, and FIG. 17 is an assembly perspective view thereof.

As shown in FIGS. 16 and 17, the lifter 5 includes an up-and-down plate 52, a rotary cam 53, a drive gear 54, a relay gear 55, and a lifter motor 56.

The up-and-down plate 52 includes up-and-down pins 52a each being an exemplary rod-like member, and cam pins 52b. In the present embodiment, the three up-and-down pins 52a are provided at an interval of 120 degrees, and so are the three cam pins 52b.

The three up-and-down pins 52a are provided at positions where they agree with the three holes 21e provided at the magazine tray 21 as shown in FIG. 2B, when the magazine tray 21 is placed at the prescribed position on the magazine tray guide 51 as shown in FIG. 15. Further, as shown in FIG. 14, the magazine tray guide 51 is provided with three holes 51a at the positions corresponding to the three up-and-down pins 52a. The three cam pins 52b are engaged with three slits 5a provided at the body of the lifter 5. The slits 5a are provided so as to extend in the device height direction Z.

Three cam grooves 53a are provided at the inner circumferential face of the rotary cam 53. Each cam groove 53a has an inclined face along which the tip portion of corresponding one of the three cam pins 52b slides. A cam gear 53b is provided at the outer circumferential face of the rotary cam 53. The cam gear 53b meshes with the drive gear 54. The drive gear 54 meshes with the relay gear 55. The relay gear 55 meshes with the motor gear (not shown), into which the drive shaft of the lifter motor 56 is press fitted.

When the lifter motor 56 is driven, the drive force of the lifter motor 56 is transferred to the drive gear 54 via the motor gear (not shown) and the relay gear 55, whereby the drive gear 54 rotates. Thus, the rotary cam 53 meshing with the drive gear 54 by the cam gear 53b rotates. As the rotary cam 53 rotates, tip portions of the three cam pins 52b, whose rotation is regulated by the three slits 5a, slide along the inclined face of the three cam grooves 53a, and the up-and-down plate 52 rises and lowers in the device height direction Z. The lifter motor 56 is connected to the control unit of the electric circuit and the power supply 7 via the FFC 14 (see FIG. 1), and drives under control of the control unit.

As shown in FIG. 17, when the up-and-down plate 52 rises, the three up-and-down pins 52a enter inside the magazine tray 21 through the three holes 51a of the magazine tray guide 51 and the three holes 21e of the magazine tray 21. By the rising of the three up-and-down pins 52a, a plurality of discs 100 are pushed out from the magazine tray 21. The plurality of discs 100 pushed out by the three up-and-down pins 52a are retained by the carrier 6.

Figure 18:
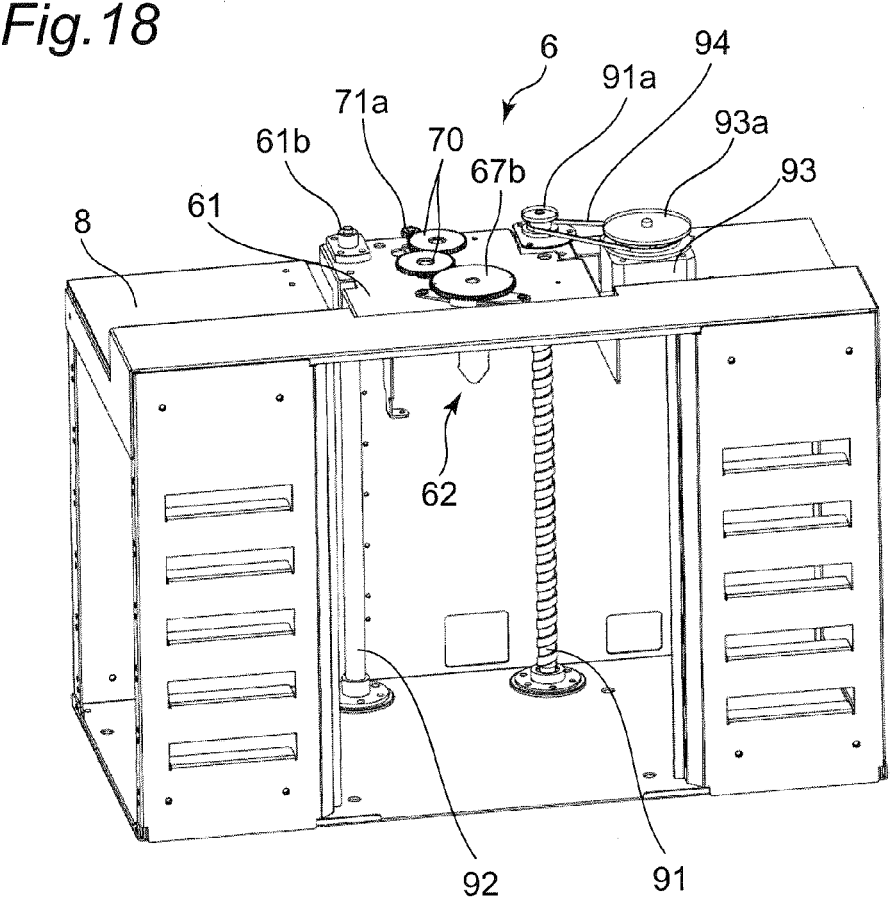
FIG. 18 is a perspective view of a carrier included in the disc device shown in FIG. 1.

As shown in FIG. 18, the carrier 6 is provided at a housing 8 storing a plurality of (e.g., 12 pieces of) disc drives 4. The carrier 6 includes a shift base 61 shifting in the device height direction Z and a disc chuck unit 62 provided at the shift base 61.

Figure 19:
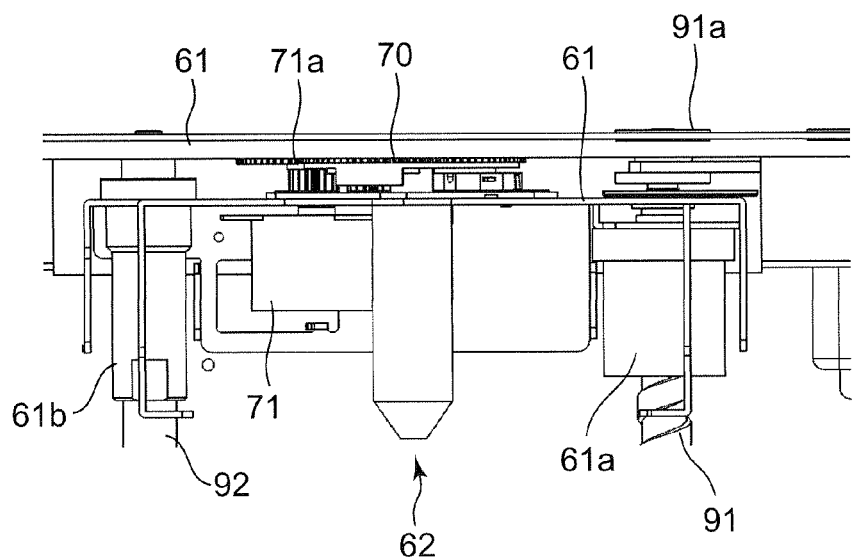
FIG. 19 is a partial enlarged side view of the carrier shown in FIG. 18.

As shown in FIG. 19, the shift base 61 is connected to a ball screw 91 via a bush 61a and connected to a guide shaft 92 via a guide shaft bearing 61b. The ball screw 91 and the guide shaft 92 are provided so as to extend in the device height direction Z.

As shown in FIG. 18, a pulley 91a is attached to the top end portion of the ball screw 91. Further, the housing 8 is provided with a carrier motor 93 that produces the drive force for rotating the ball screw 91 about its axis. A pulley 93a is attached to the drive shaft of the carrier motor 93. A belt 94 is wrapped around the pulley 91a and the pulley 93a.

When the carrier motor 93 is driven, the drive force of the carrier motor 93 is transferred to the ball screw 91 via the pulley 93a, the belt 94, and the pulley 91a, and the ball screw 91 rotates about its axis. By the rotation of the ball screw 91, the shift base 61 is guided by the ball screw 91 and the guide shaft 92 and shifts in the device height direction Z. The carrier motor 93 is connected to the control unit of the electric circuit and the power supply 7, and drives under control of the control unit.

The disc chuck unit 62 is structured to retain a plurality of discs 100 pushed out by the lifter 5, and to separate the retained plurality of discs 100 one by one. The detail of the structure of the shift base 61 and the disc chuck unit 62 will be detailed later.

Figure 20:
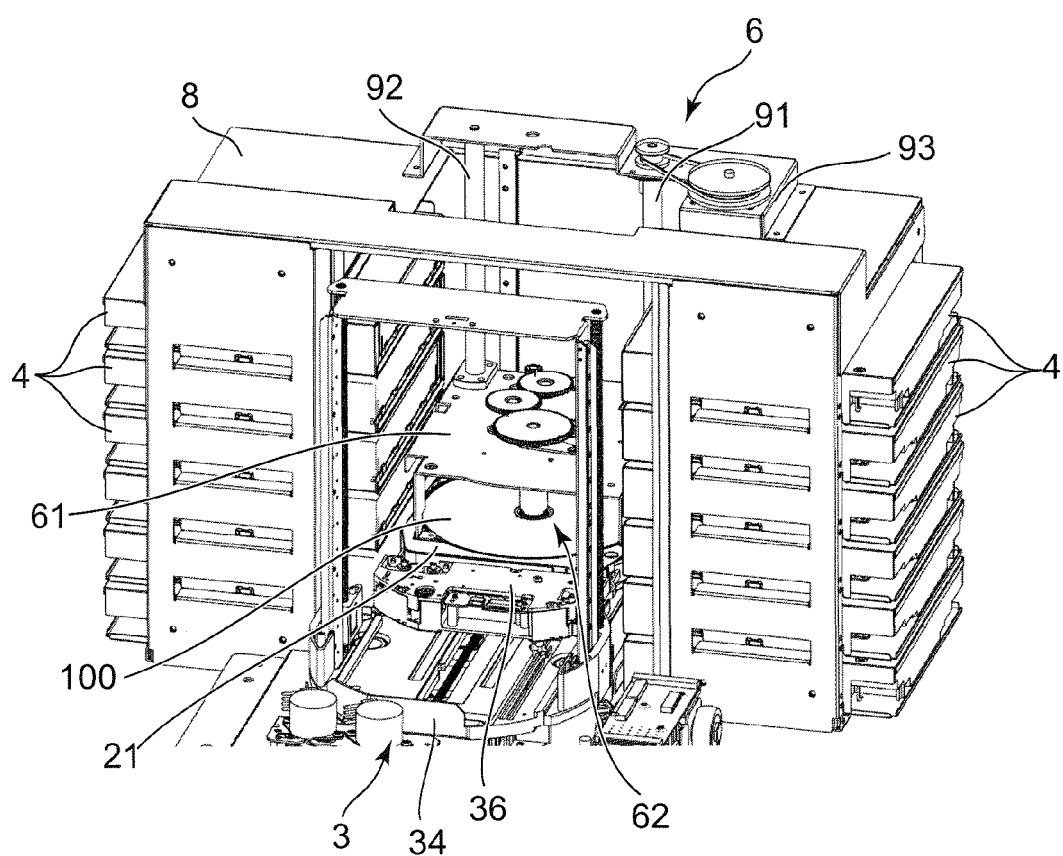
FIG. 20 is a perspective view showing the state where a disc chuck unit included in the carrier shown in FIG. 18 is lowered to a position above and near the magazine tray.
Figure 21:
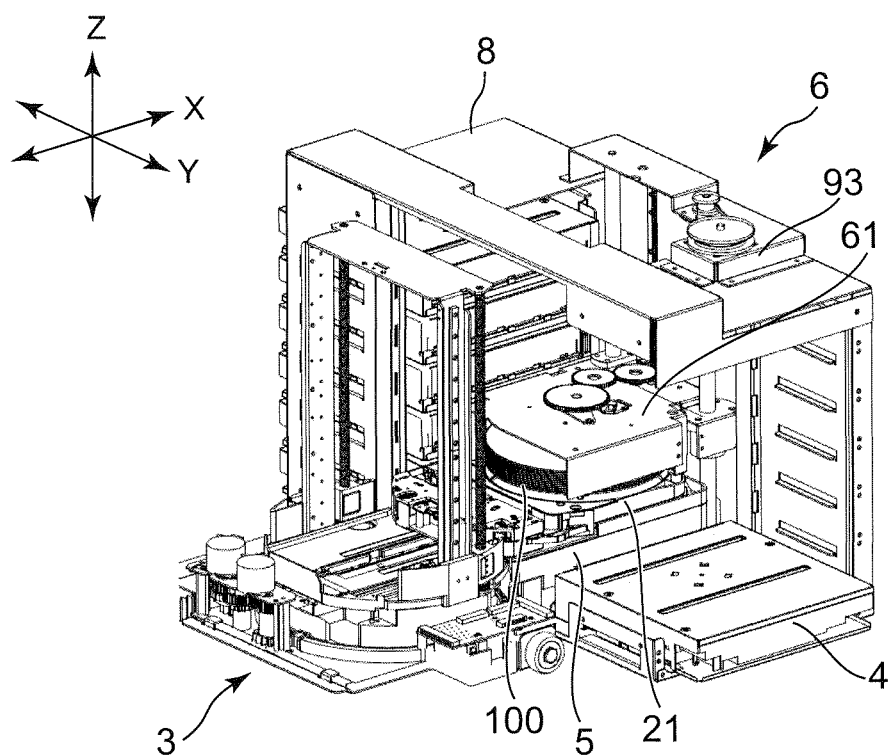
FIG. 21 is a perspective view showing the state where all the discs are held by the disc chuck unit.

As shown in FIG. 15, when the magazine tray 21 is placed at a prescribed position at the top of the lifter 5, as shown in FIG. 20, the shift base 61 is lowered to the position near the magazine tray 21. Thus, the tip portion of the disc chuck unit 62 engages with the engaging portion 23a of the core rod 23 (see FIG. 2B) provided at the magazine tray 21, whereby the disc chuck unit 62 and the core rod 23 become coaxial to each other. In this state, the lifter motor 56 is driven and the up-and-down plate 52 rises (see FIG. 17).

When the up-and-down plate 52 rises, the up-and-down pins 52a enter inside the magazine tray 21 through the holes 51a and 21e, to push out a plurality of discs 100 from the magazine tray 21. Thus, as show in FIG. 21, the disc chuck unit 62 retains the plurality of discs 100.

Figure 22:
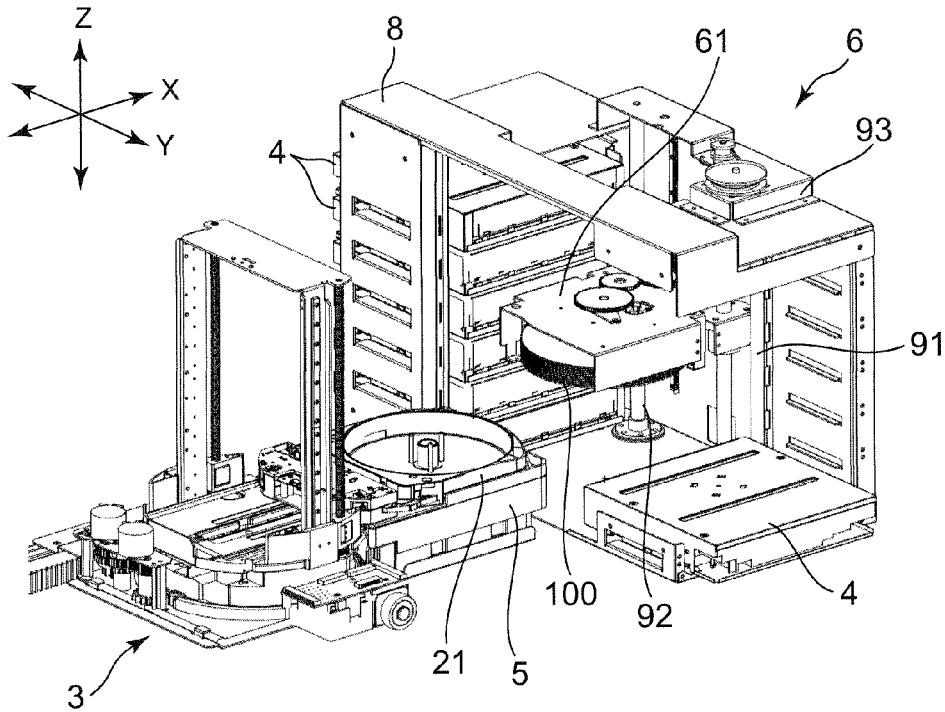
FIG. 22 is a perspective view showing the state, which follows the state shown in FIG. 21, where the picker has shifted to the device-front side, and the magazine tray has receded from the position near the disc drive.
Figure 23:
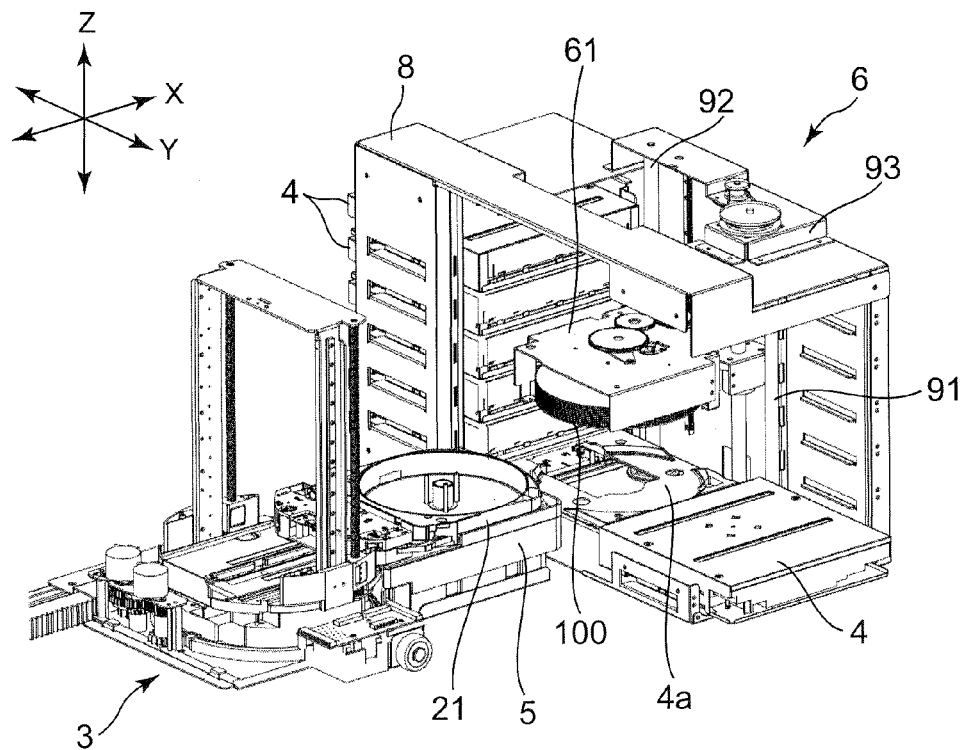
FIG. 23 is a perspective view showing the state, which follows the state shown in FIG. 22, where a tray of the bottommost-stage disc drive is ejected.

When the disc chuck unit 62 retains all the discs 100, the shift base 61 rises as being guided by the ball screw 91 and the guide shaft 92. Thus, engagement between the tip portion of the disc chuck unit 62 and the engaging portion 23a of the core rod 23 (see FIG. 2B) is released. Thereafter, as shown in FIG. 22, the picker 3 shifts to the device-front side, and the magazine tray 21 recedes from the location near the disc drive 4. Thereafter, under control of the control unit of the electric circuit and the power supply 7, the tray 4a of the disc drive 4 is ejected as shown in FIG. 23.

Figure 24:
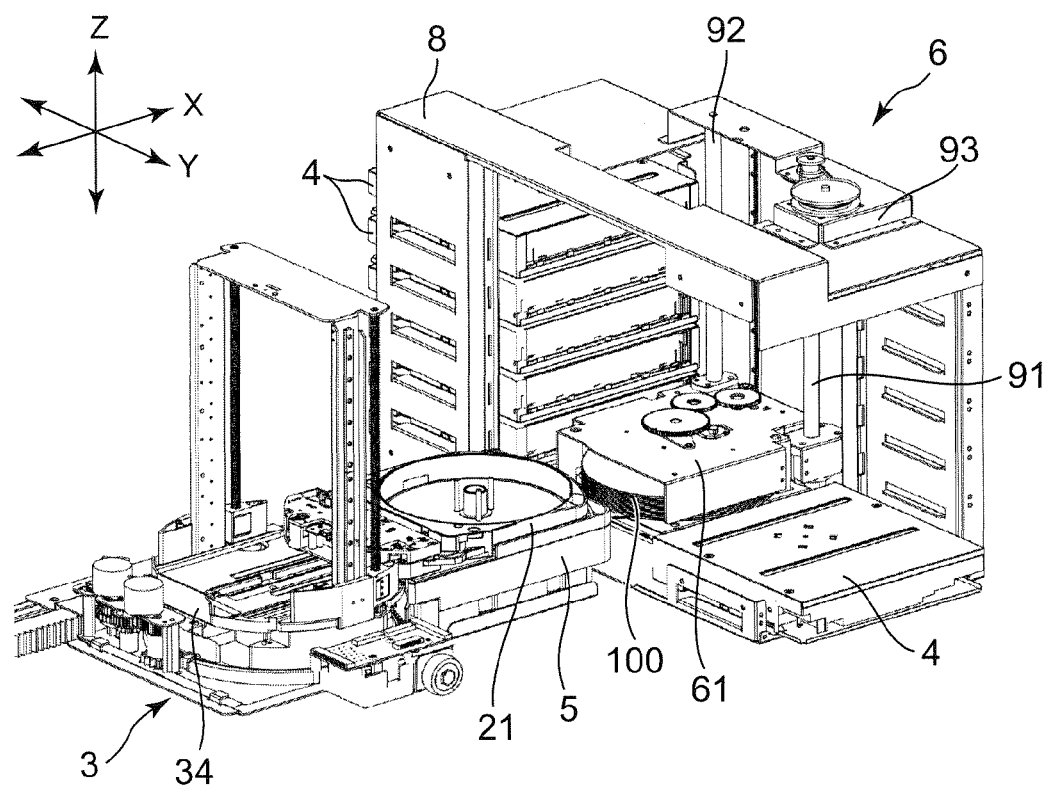
FIG. 24 is a perspective view showing the state, which follows the state shown in FIG. 23, where a shift base is lowered such that the plurality of discs retained by the disc chuck unit position above the tray.
Figure 25:
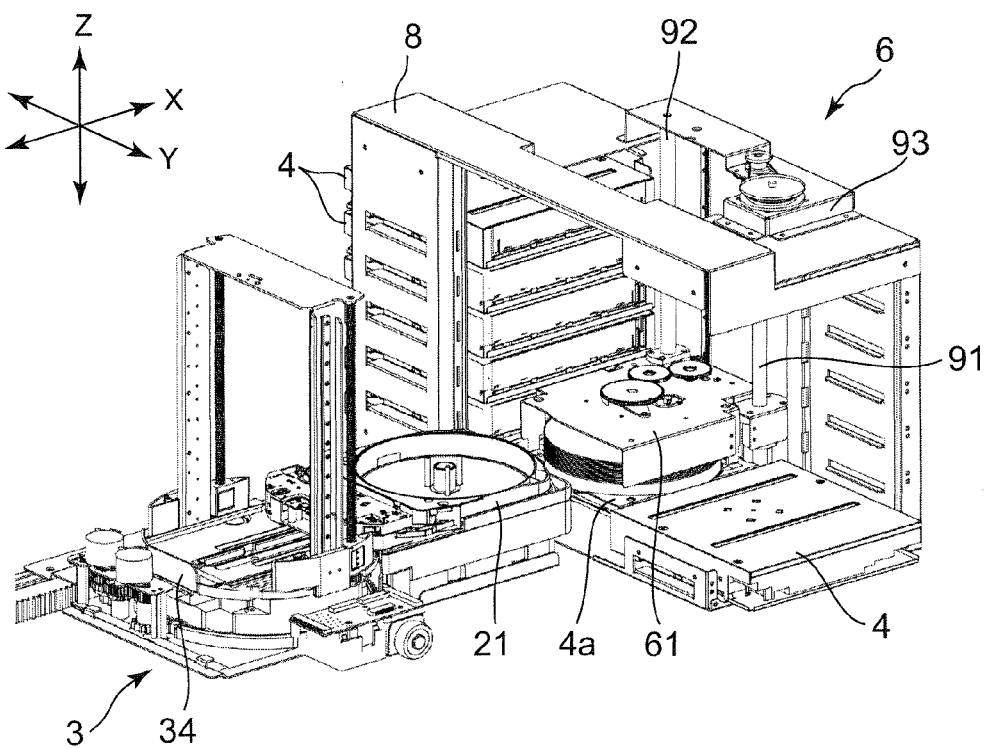
FIG. 25 is a perspective view showing the state where the bottommost disc is placed on the tray.

Thereafter, as shown in FIG. 24, the shift base 61 is lowered such that the plurality of discs 100 retained by the disc chuck unit 62 are located above the tray 4a (e.g., immediately above). Thereafter, by the disc chuck unit 62, the bottommost disc 100 is separated from the other discs, and placed on the tray 4a. FIG. 25 is a perspective view showing the state where the bottommost disc 100 is placed on the tray 4a.

Figure 26:
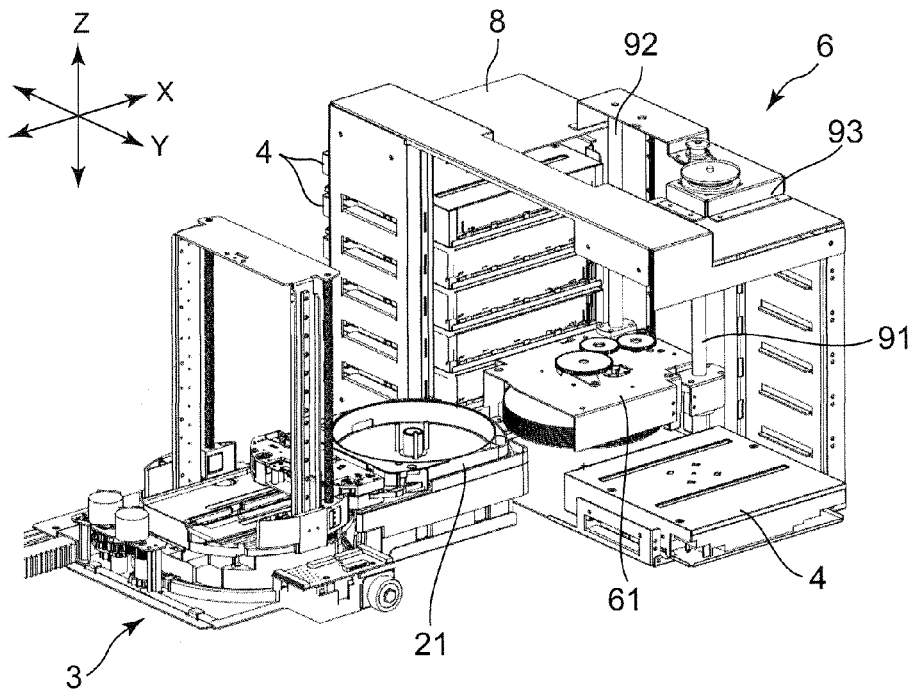
FIG. 26 is a perspective view showing the state, which follows the state shown in FIG. 25, where the tray has been carried into the disc drive.

When the bottommost disc 100 is placed on the tray 4a, the shift base 61 is raised such that the disc chuck unit 62 and the tray 4a are not brought into contact with each other. Thereafter, as shown in FIG. 26, the tray 4a is carried into the disc drive 4. Thereafter or simultaneously therewith, the tray 4a of the disc drive 4 opposing to the handled disc drive is ejected (not shown). Thereafter, in the manner similarly to that described above, a disc 100 is placed on the tray 4a, and the tray 4a is carried into the disc drive 4. Thus, the loading operation as to the disc drives 4 of the bottommost stage (first stage) is completed. This loading operation is repeated as to the second and following stages.

Figure 27:
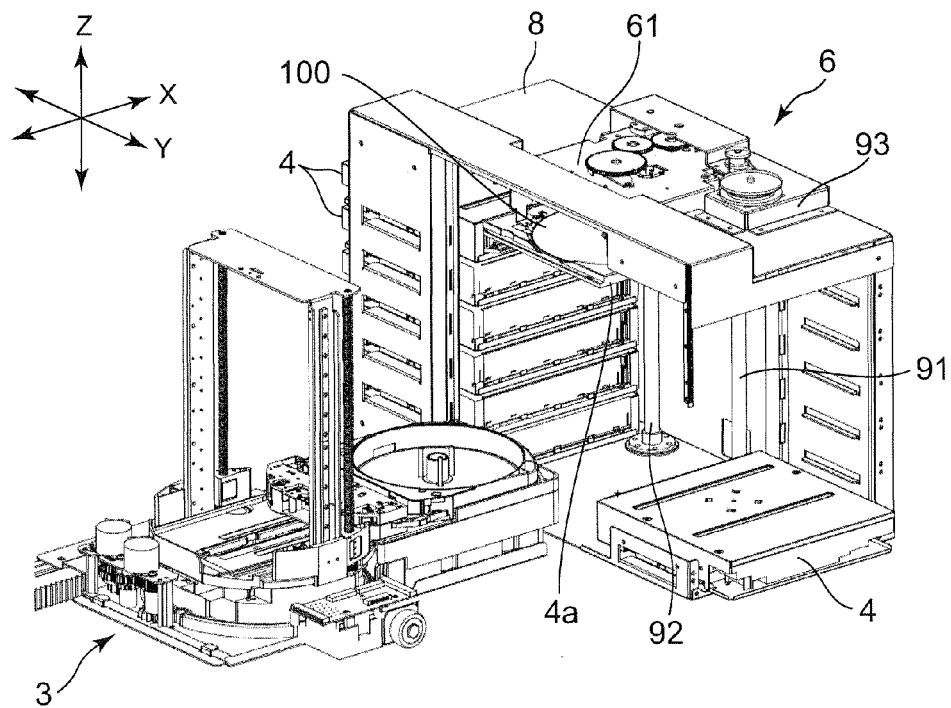
FIG. 27 is a perspective view where the carrier places a disc on the tray of the topmost-stage disc drive.

FIG. 27 shows the manner in which a disc 100 is placed on the tray 4a of the disc drive 4 of the topmost stage (e.g., sixth stage). When the loading operation as to the topmost-stage disc drives 4 is completed, all the disc drives 4 now accommodate the discs 100, and recording on or reproduction from the discs 100 in the disc drives 4 is enabled.

It is to be noted that, the collection of the discs 100 in the disc drives 4 should be performed in the order reverse to the foregoing manner, for example. Specifically, it is performed as follows.

Firstly, as shown in FIG. 27, the tray 4a of the topmost-stage disc drive 4 is ejected.

Thereafter, the disc chuck unit 62 is inserted into the center hole 100a of the disc 100 on the tray 4a, and the disc chuck unit 62 retains the disc 100.

Thereafter, the tray 4a from which the disc 100 is collected by the disc chuck unit 62 is carried into the disc drive 4. Thereafter or simultaneously therewith, the tray 4a of the disc drive 4 opposing to the handled disc drive is ejected (not shown). Thereafter, in the manner similarly to that described above, the disc 100 of the tray 4a is collected by the disc chuck unit 62, and the tray 4a is carried into the disc drive 4. Thus, the disc collection operation as to the disc drives 4 of the topmost stage (first stage) is completed. This disc collection operation is repeated until the discs 100 in the bottommost-stage disc drives 4 are collected.

When the disc chuck unit 62 has collected all the discs 100, the shift base 61 is raised. Thereafter, the picker 3 shifts to the device-rear side, and the magazine tray 21 is set below the disc chuck unit 62.

Thereafter, the shift base 61 is lowered, and the tip portion of the disc chuck unit 62 engages with the engaging portion 23a (see FIG. 2B) of the core rod 23, whereby the disc chuck unit 62 and the core rod 23 become coaxial to each other.

Figure 28:
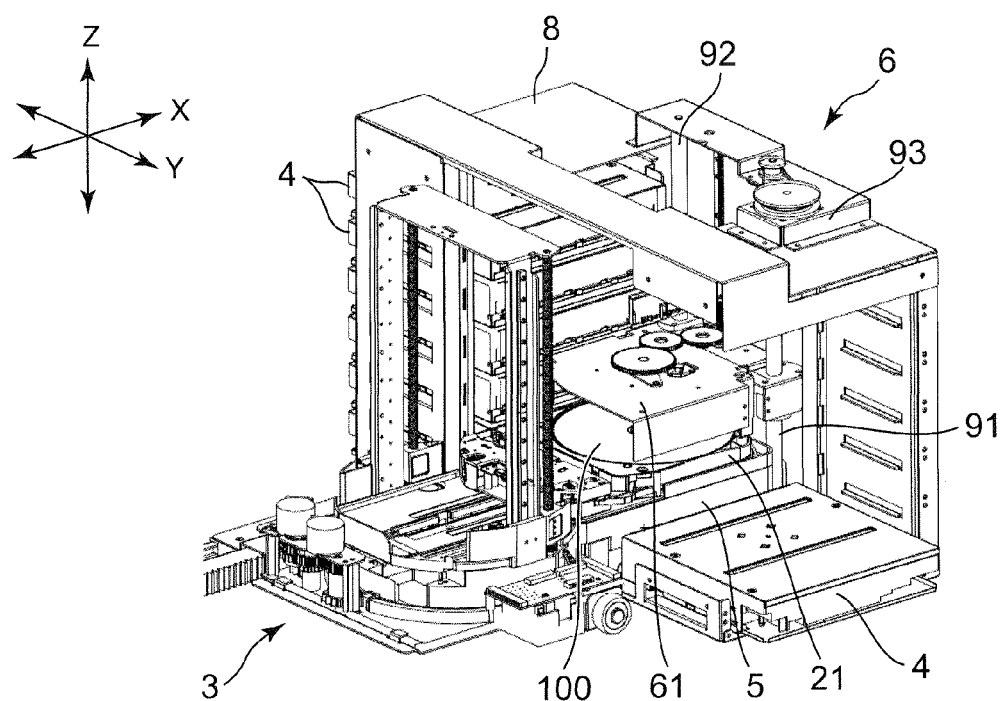
FIG. 28 is a perspective view showing the state where a plurality of discs collected by the carrier are stored in the magazine tray.

Thereafter, all the discs 100 retained by the disc chuck unit 62 are pushed into the magazine tray 21 as shown in FIG. 28, and stored.

Thereafter, the shift base 61 is raised, and the engagement between the tip portion of the disc chuck unit 62 and the engaging portion 23a of the core rod 23 is released.

The magazine tray 21 having stored all the discs 100 are returned into the magazine stocker 1 by the picker 3. This conveyance of the magazine tray 21 into the magazine stocker 1 is achieved by, for example, performing the operations that are reverse to the operations having been described with reference to FIGS. 6 to 15.

Next, a more detailed description will be given of the structure of the disc chuck unit 62.

Figure 29:
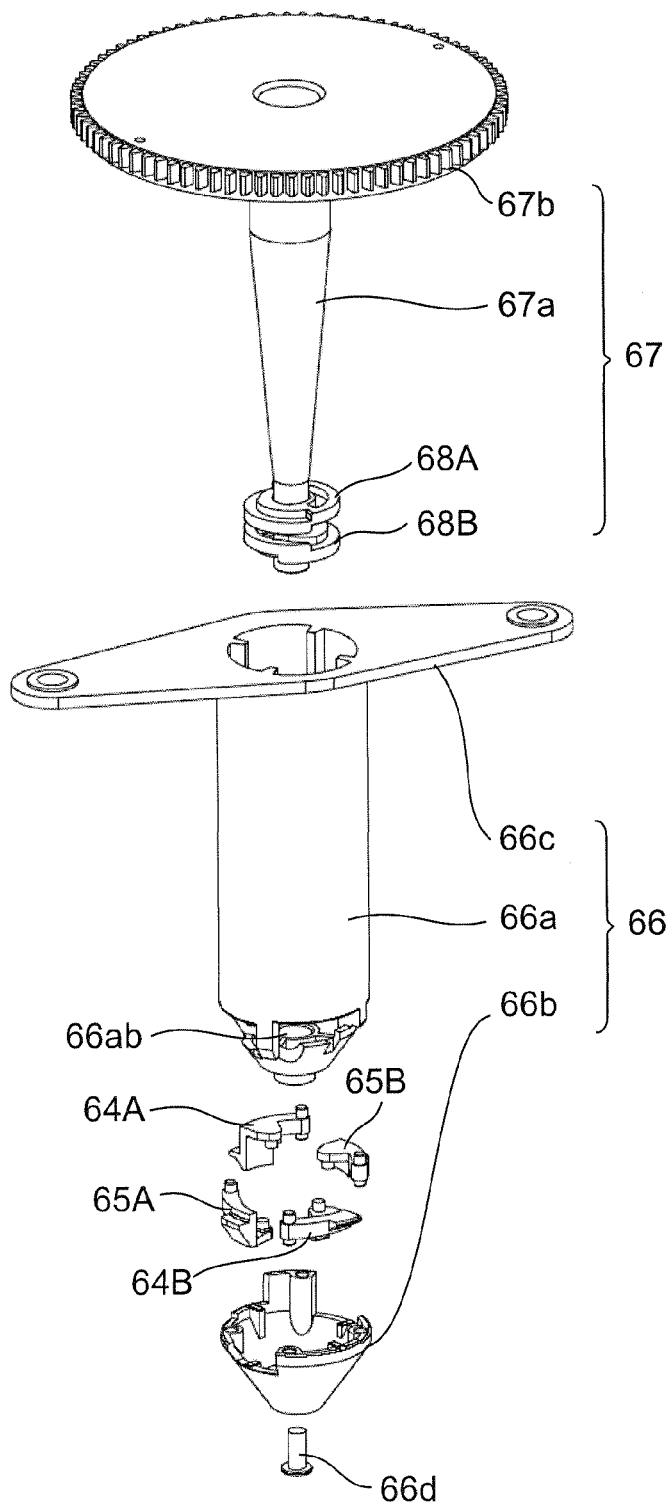
FIG. 29 is an exploded perspective view of the disc chuck unit included in the carrier shown in FIG. 18 as seen diagonally from above.
Figure 30:
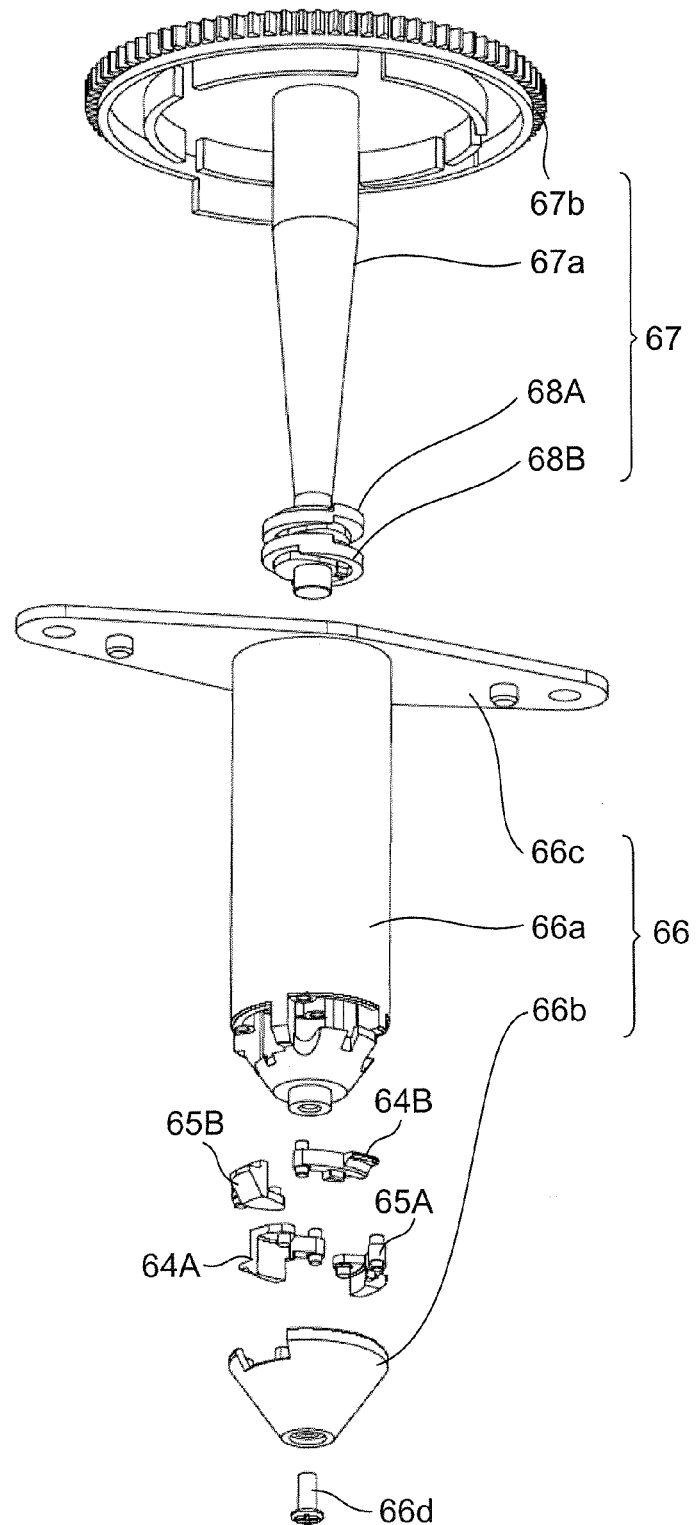
FIG. 30 is an exploded perspective view of the disc chuck unit included in the carrier shown in FIG. 18 as seen diagonally from below.

As shown in FIGS. 29 and 30, the disc chuck unit 62 includes separator hooks 64A, 64B, bottom hooks 65A, 65B, a spindle unit 66, and a camshaft unit 67.

Figure 31:
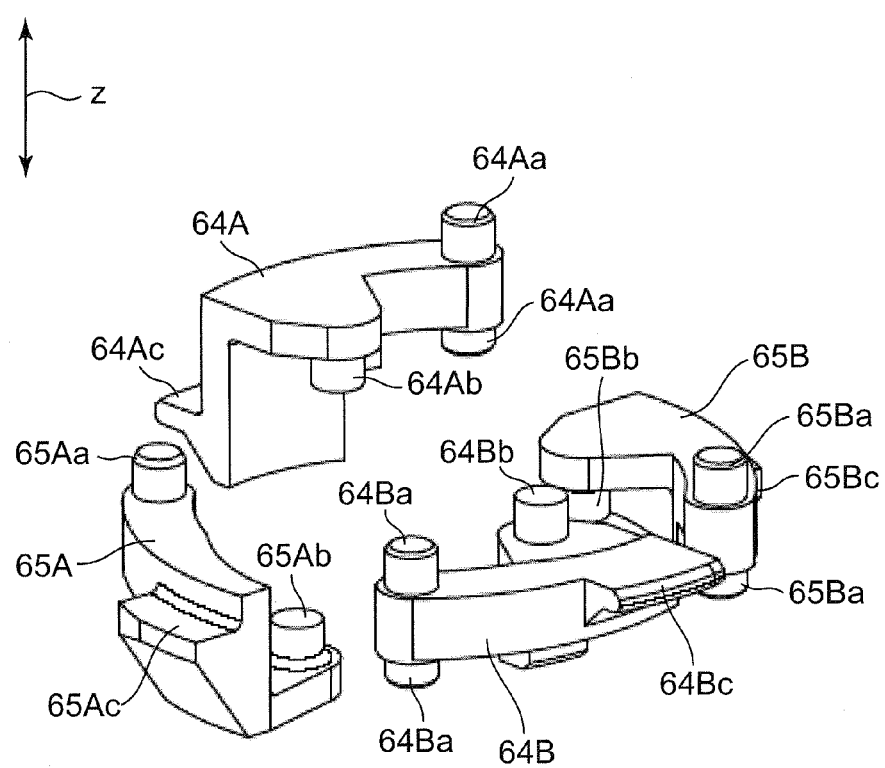
FIG. 31 is an enlarged perspective view of two separator hooks and two bottom hooks included in the disc chuck unit shown in FIG. 29.

FIG. 31 is an enlarged perspective view of the separator hooks 64A, 64B and the bottom hooks 65A, 65B. The hooks 64A to 65B are formed to be substantially lever-shaped, and include rotary shafts 64Aa to 65Ba and drive pins 64Ab to 65Bb extending in the device height direction Z, and claw portions 64Ac to 65Bc projecting in the direction crossing the device height direction Z.

Figure 32:
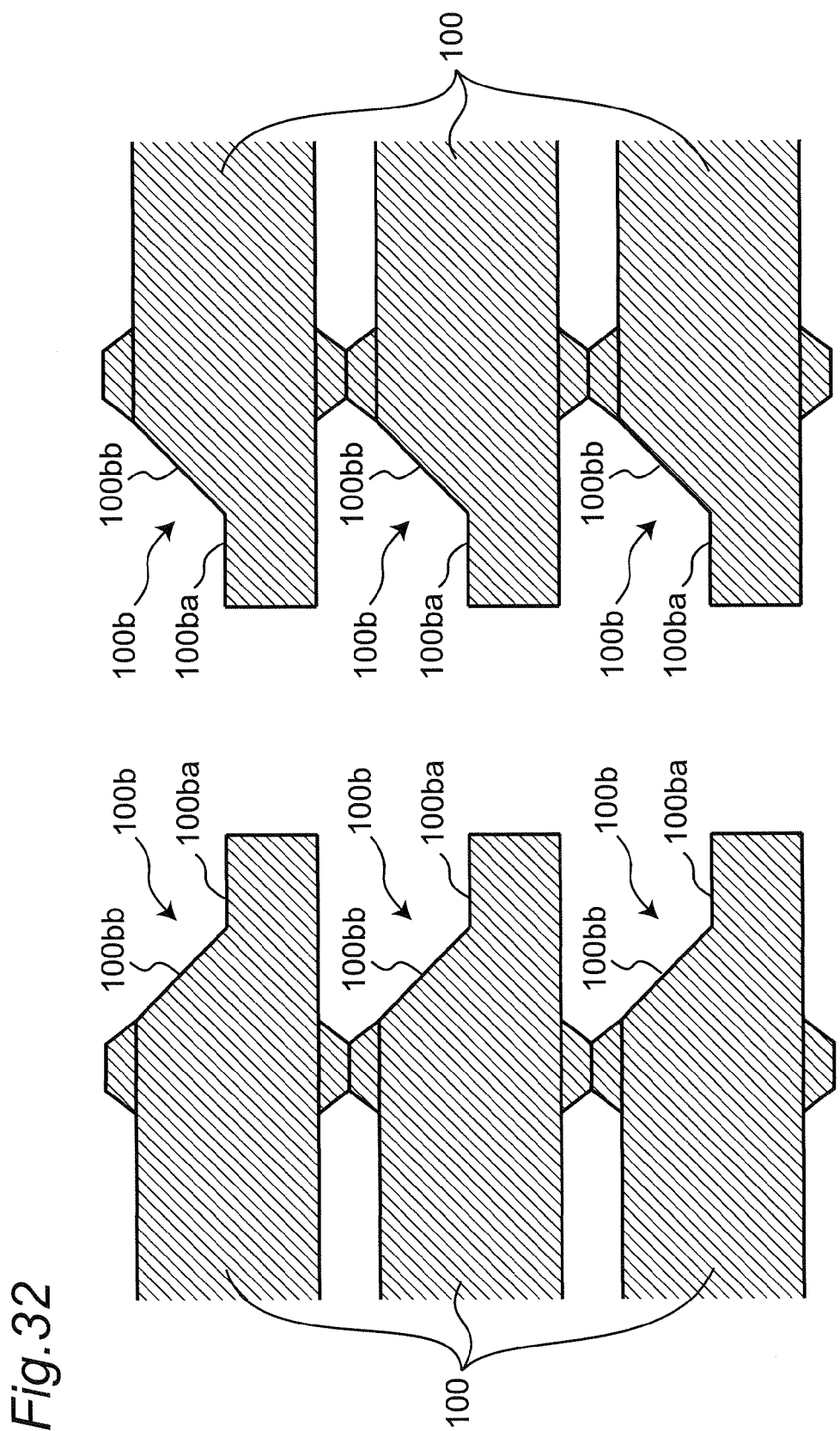
FIG. 32 is a cross sectional view showing the discs each provided with a recess portion at their inner circumferential portion.

Further, as shown in FIG. 32, in the present embodiment, the inner circumferential portion of each disc 100 is provided with a recess portion 100b. The recess portion 100b is formed to have a shape obtained by cutting the top corner portion of the inner circumferential portion of the disc 100 so as to have a level face 100ba and an inclined face 100bb. As shown in FIG. 31, the bottom faces of the claw portions 64Ac, 64Bc of the separator hooks 64A, 64B are each formed to have an inclined face, such that the thickness becomes greater downward from the outer circumferential side to the inner circumferential side. Further, the top faces of the claw portions 64Ac to 65Bc are formed to be perpendicular to the device height direction Z.

As shown in FIGS. 29 and 30, the spindle unit 66 includes a spindle shaft 66a of a substantially cylindrical shape, a spindle head 66b of a substantially circular truncated cone shape provided below the spindle shaft 66a, and a flange 66c provided at the top end portion of the spindle shaft 66a.

By the flange 66c being directly or indirectly attached to the shift base 61, the spindle unit 66 shifts integrally with the shift base 61. The diameter of the spindle shaft 66a is set to be smaller than the diameter of the center hole 100a of each disc 100. For example, the diameter of the spindle shaft 66a is 14.5 mm, and the diameter of the center hole 100a of the disc 100 is 15 mm.

Figure 33:
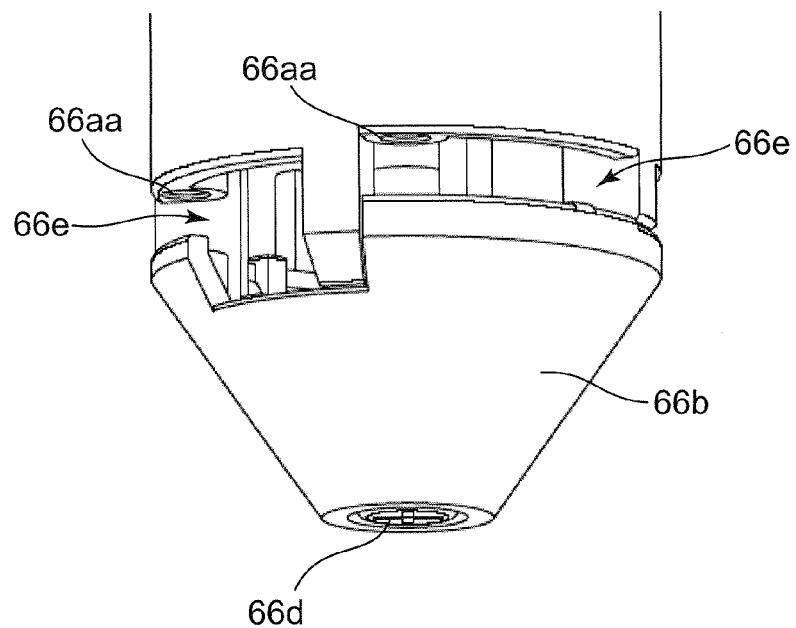
FIG. 33 is a perspective view showing the state where a spindle head included in the disc chuck unit shown in FIG. 29 is fixed to the bottom end portion of a spindle shaft by a screw.

As shown in FIG. 33, the spindle head 66b is fixed to the bottom end portion of the spindle shaft 66a by a screw 66d. Between the spindle head 66b and the spindle shaft 66a, four openings 66e are formed. The claw portions 64Ac to 65Bc of the hooks 64A to 65B are structured so as to be capable of advancing and retracting through the openings 66e.

Figure 34:
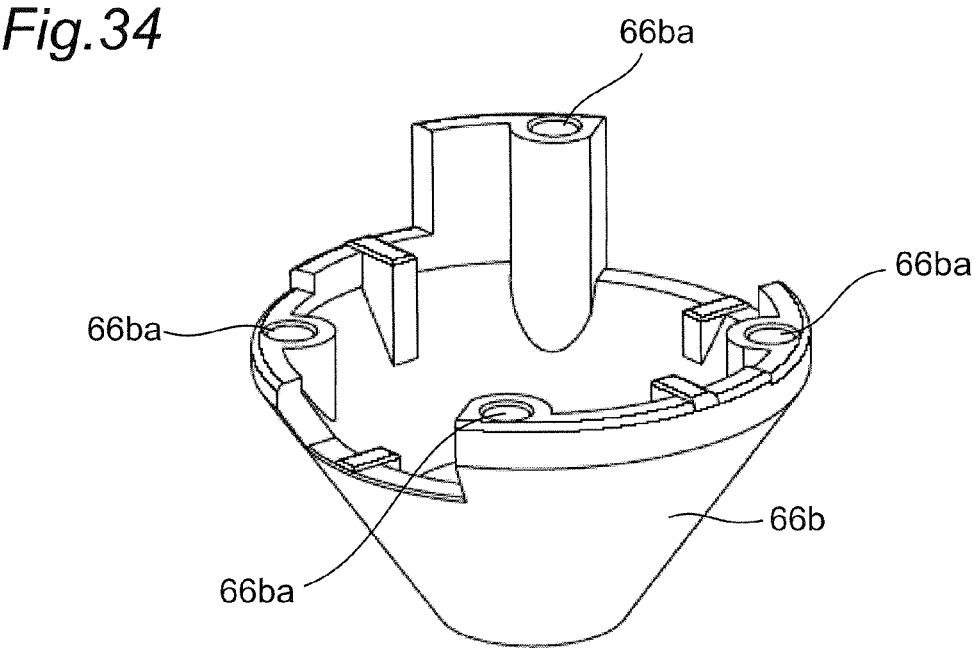
FIG. 34 is a perspective view of the spindle head included in the disc chuck unit shown in FIG. 29.

As shown in FIG. 34, the spindle head 66b is provided with four rotary shaft holes 66ba. Further, as shown in FIG. 33, the spindle shaft 66a is provided with rotary shaft holes 66aa at the positions corresponding to the positions opposing to the rotary shaft holes 66ba. The hooks 64A to 65B are rotatably retained, by the rotary shafts 64Aa to 65Ba being inserted into corresponding rotary shaft holes 66aa, 66ba. Further, the hooks 64A to 65B are retained such that the top faces of the claw portions 64Ac, 64Bc of the separator hooks 64A, 64B are positioned higher than the top faces of the claw portions 65Ac, 65Bc of the bottom hooks 65A, 65B by the thickness of approximately one disc. Further, the separator hook 64A and the separator hook 64B are retained at the positions being out of phase by 180 degrees from each other in the circumferential direction of the spindle unit 66. The bottom hook 65A and the bottom hook 65B are retained at the positions being out of phase by 180 degrees from each other in the circumferential direction of the spindle unit 66.

Figure 35:
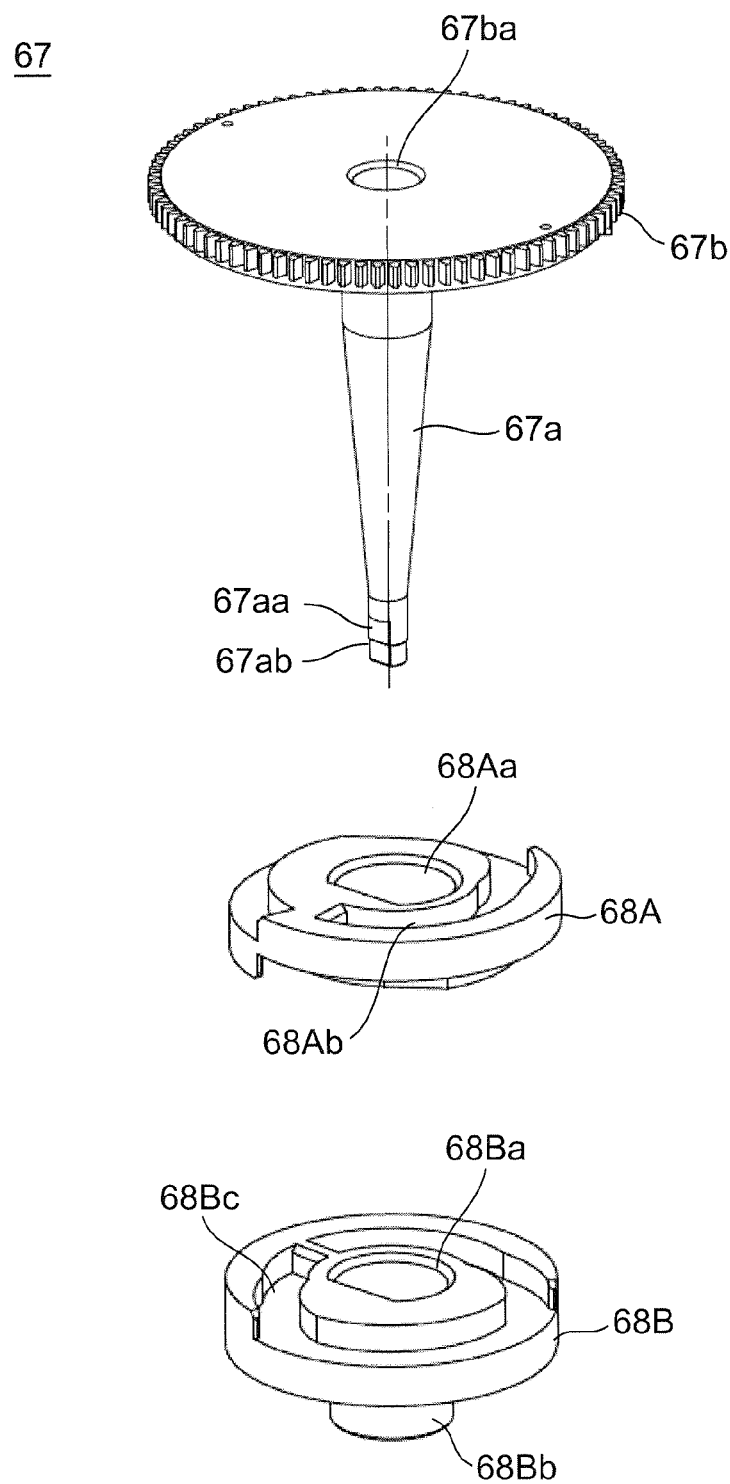
FIG. 35 is an exploded perspective view of a camshaft unit included in the disc chuck unit shown in FIG. 29.
Figure 37A:
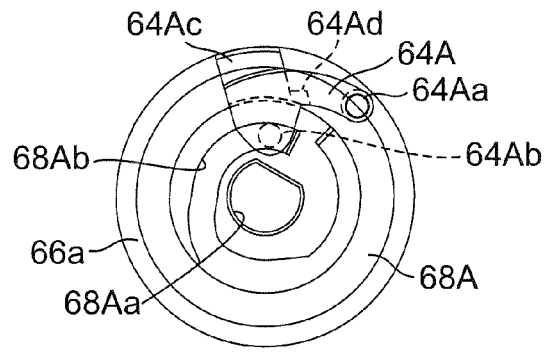
FIG. 37A is a diagram showing the manner of a drive pin of one separator hook sliding along a cam groove formed at the top face of one cam plate.
Figure 37B:
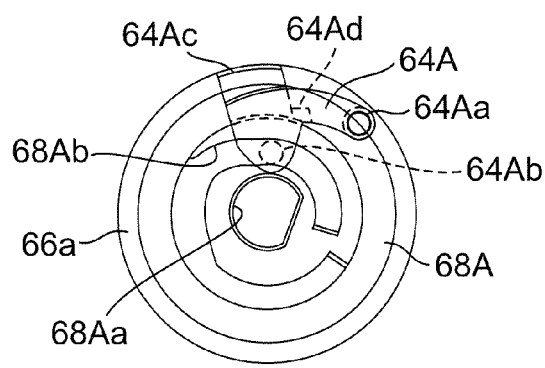
FIG. 37B is a diagram showing the manner of the drive pin of the one separator hook sliding along the cam groove formed at the top face of the one cam plate.
Figure 37C:
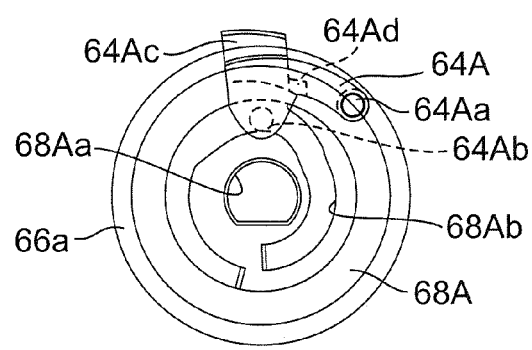
FIG. 37C is a diagram showing the manner of the drive pin of the one separator hook sliding along the cam groove formed at the top face of the one cam plate.
Figure 37D:
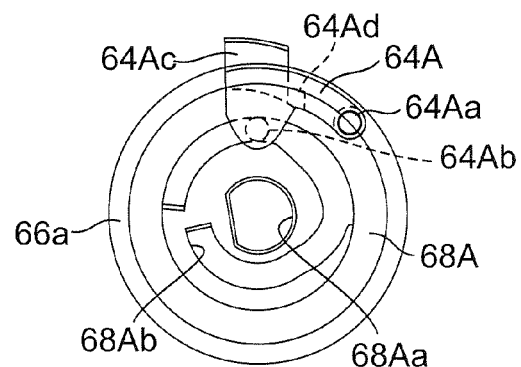
FIG. 37D is a diagram showing the manner of the drive pin of the one separator hook sliding along the cam groove formed at the top face of the one cam plate.
Figure 38A:
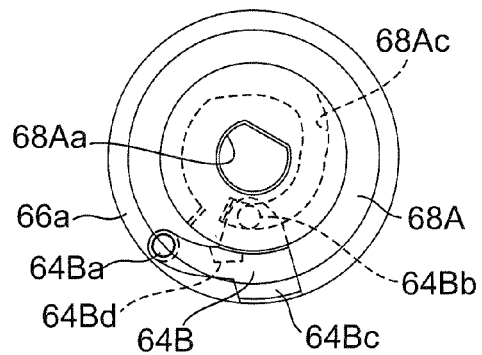
FIG. 38A is a diagram showing the manner of a drive pin of other separator hook sliding along a cam groove formed at the bottom face of the one cam plate.
Figure 38B:
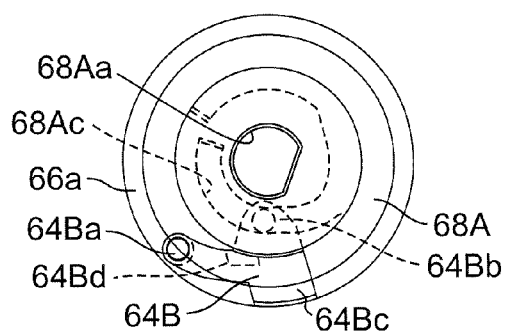
FIG. 38B is a diagram showing the manner of the drive pin of the other separator hook sliding along the cam groove formed at the bottom face of the one cam plate.
Figure 38C:
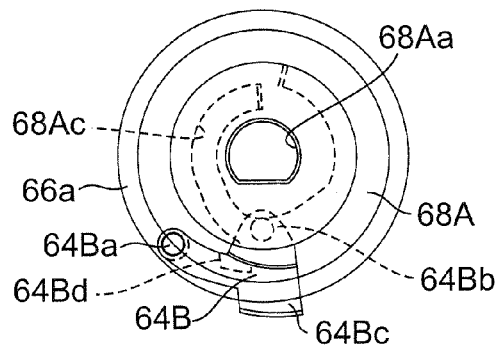
FIG. 38C is a diagram showing the manner of the drive pin of the other separator hook sliding along the cam groove formed at the bottom face of the one cam plate.
Figure 38D:
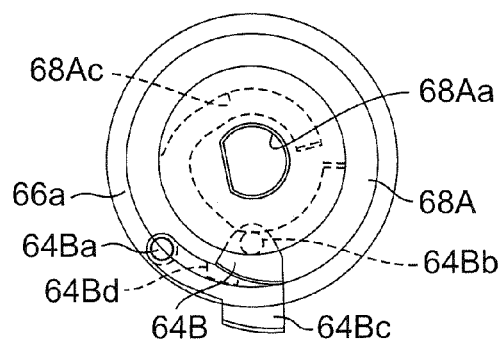
FIG. 38D is a diagram showing the manner of the drive pin of the other separator hook sliding along the cam groove formed at the bottom face of the one cam plate.
Figure 39A:
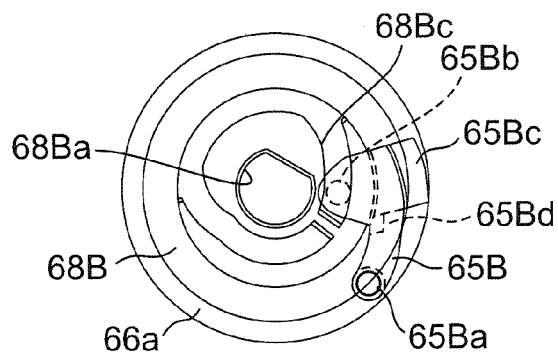
FIG. 39A is a diagram showing the manner of a drive pin of one bottom hook sliding along a cam groove formed at the top face of other cam plate.
Figure 39B:
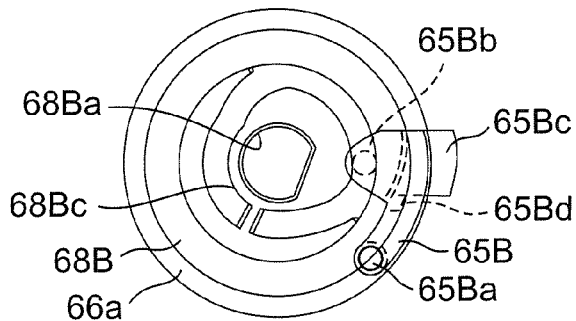
FIG. 39B is a diagram showing the manner of the drive pin of the one bottom hook sliding along the cam groove formed at the top face of the other cam plate.
Figure 39C:
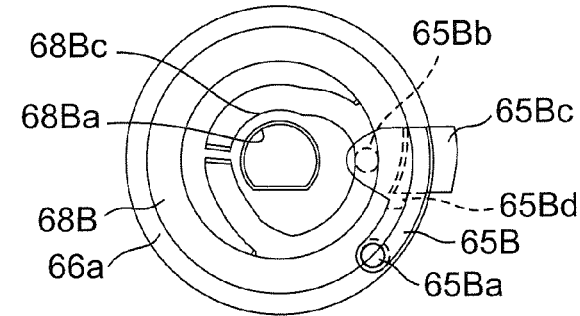
FIG. 39C is a diagram showing the manner of the drive pin of the one bottom hook sliding along the cam groove formed at the top face of the other cam plate.
Figure 39D:
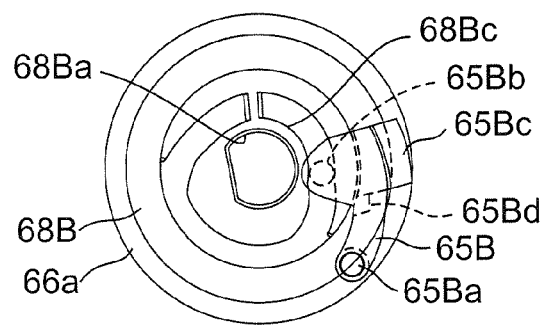
FIG. 39D is a diagram showing the manner of the drive pin of the one bottom hook sliding along the cam groove formed at the top face of the other cam plate.
Figure 40A:
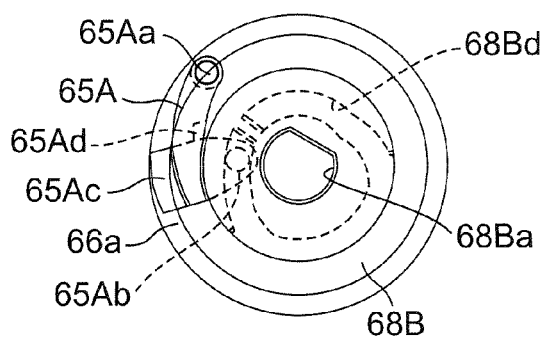
FIG. 40A is a diagram showing the manner of a drive pin of other bottom hook sliding along a cam groove formed at the bottom face of the other cam plate.
Figure 40B:
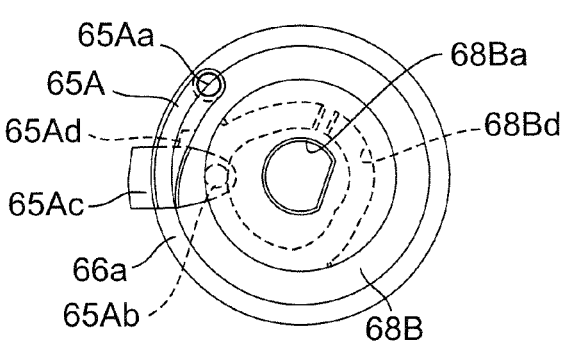
FIG. 40B is a diagram showing the manner of the drive pin of the other bottom hook sliding along the cam groove formed at the bottom face of the other cam plate.
Figure 40C:
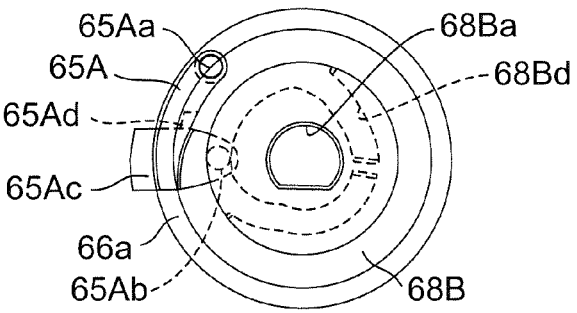
FIG. 40C is a diagram showing the manner of the drive pin of the other bottom hook sliding along the cam groove formed at the bottom face of the other cam plate.
Figure 40D:
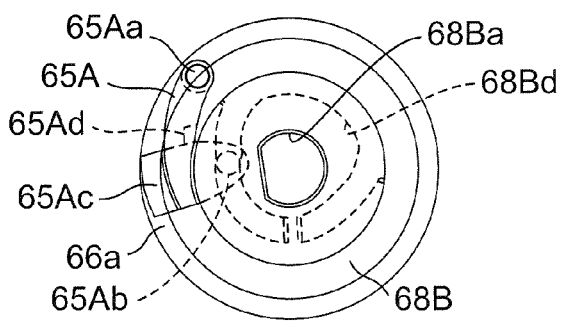
FIG. 40D is a diagram showing the manner of the drive pin of the other bottom hook sliding along the cam groove formed at the bottom face of the other cam plate.

As shown in FIG. 35, the camshaft unit 67 includes a substantially cylindrical camshaft 67a, a cam gear 67b provided at the top end portion of the camshaft 67a, and cam plates 68A, 68B provided at the bottom end portion of the camshaft 67a.

At the center portion of the cam gear 67b, a rotary shaft hole 67ba is provided. Into the rotary shaft hole 67ba, a rotary shaft (not shown) provided at the shift base 61 is inserted. As shown in FIG. 18, the cam gear 67b meshes with a relay gear 70. The relay gear 70 is structured with two gears, for example, and rotatably provided at the shift base 61. Further, as shown in FIG. 18 or 19, the relay gear 70 meshes with a motor gear 71a, into which the drive shaft of the disc chuck motor 71, which is an example of a drive source, provided at the shift base 61 is press fitted.

When the disc chuck motor 71 is driven, the drive force of the disc chuck motor 71 is transferred to the camshaft 67a via the motor gear 71a, the relay gear 70, and the cam gear 67b, whereby the camshaft 67a rotates. The disc chuck motor 71 is connected to the control unit of the electric circuit and the power supply 7, and drives under control of the control unit.

As shown in FIG. 35, the bottom end portion of the camshaft 67a is provided with an engaging portion 67aa for engaging with the cam plate 68A, and an engaging portion 67*ab* for engaging with the cam plate 68B. The engaging portions 67*aa*, 67*ab* are each formed to have a D-shaped cross section.

At the center portion of the cam plate 68A, a D-shaped rotary shaft hole 68Aa is provided. The cam plate 68A is structured so as to be capable of integrally rotating with the camshaft 67*a*, by the engaging portion 67*aa* of the camshaft 67*a* engaging with the rotary shaft hole 68Aa.

At the center portion of the top face of the cam plate 68B, a D-shaped rotary shaft hole 68Ba is provided. The cam plate 68B is structured so as to be capable of integrally rotating with the camshaft 67*a*, by the engaging portion 67*ab* of the camshaft 67*a* engaging with the rotary shaft hole 68Ba.

Further, at the center portion of the bottom face of the cam plate 68B, a rotary shaft 68Bb is provided. As shown in FIG. 29, the rotary shaft 68Bb is inserted into a rotary shaft bearing 66*ab* provided at the bottom end portion of the spindle shaft 66*a*.

The top face of the cam plate 68A is provided with a cam groove 68Ab (see FIG. 35) along which the drive pin 64Ab of the separator hook 64A slides when the camshaft 67*a* rotates. FIGS. 37A to 37D each show the manner of the drive pin 64Ab of the separator hook 64A sliding along the cam groove 68Ab.

The bottom face of the cam plate 68A is provided with a cam groove 68Ac (see FIG. 36) along which the drive pin 64Bb of the separator hook 64B slides when the camshaft 67*a* rotates. FIGS. 38A to 38D each show the manner of the drive pin 64Bb of the separator hook 64B sliding along the cam groove 68Ac. The cam groove 68Ac has mirror symmetry relative to the cam groove 68Ab, and is provided at the position being out of phase by 180 degrees in the circumferential direction of the spindle unit 66.

The top face of the cam plate 68B is provided with a cam groove 68Bc (see FIG. 35) along which the drive pin 65Bb of the bottom hook 65B slides when the camshaft 67*a* rotates. FIGS. 39A to 39D each show the manner of the drive pin 65Bb of the bottom hook 65B sliding along the cam groove 68Bc.

The bottom face of the cam plate 68B is provided with a cam groove 68Bd (see FIG. 36) along which the drive pin 65Ab of the bottom hook 65A slides when the camshaft 67*a* rotates. FIGS. 40A to 40D each show the manner of the drive pin 65Ab of the bottom hook 65A sliding along the cam groove 68Bd. The cam groove 68Bd has mirror symmetry relative to the cam groove 68Bc, and is provided at the position being out of phase by 180 degrees in the circumferential direction of the spindle unit 66.

FIGS. 41A to 41D are each a diagram focusing on the positional relationship between the camshaft 67*a* and the four hooks 64A to 65B.

Figure 41A:
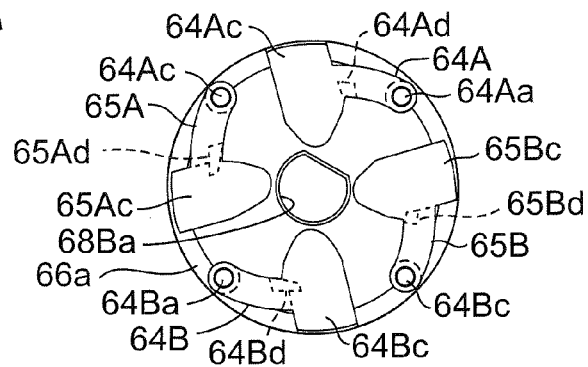
FIG. 41A is a diagram showing the manner of the hooks shown in FIGS. 37A to 40D sliding along corresponding cam grooves, focusing on the positional relationship between a camshaft and the hooks.
Figure 41B:
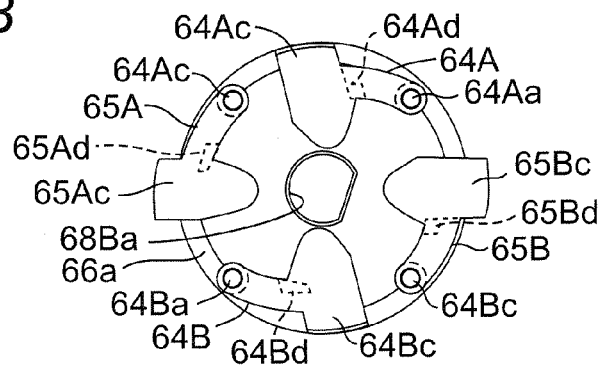
FIG. 41B is a diagram showing the manner of the hooks shown in FIGS. 37A to 40D sliding along corresponding cam grooves, focusing on the positional relationship between the camshaft and the hooks.
Figure 41C:
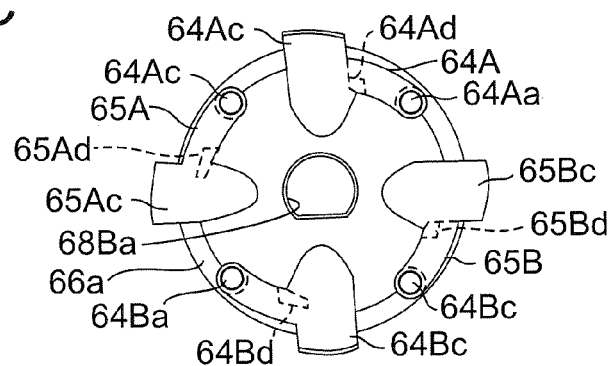
FIG. 41C is a diagram showing the manner of the hooks shown in FIGS. 37A to 40D sliding along corresponding cam grooves, focusing on the positional relationship between the camshaft and the hooks.
Figure 41D:
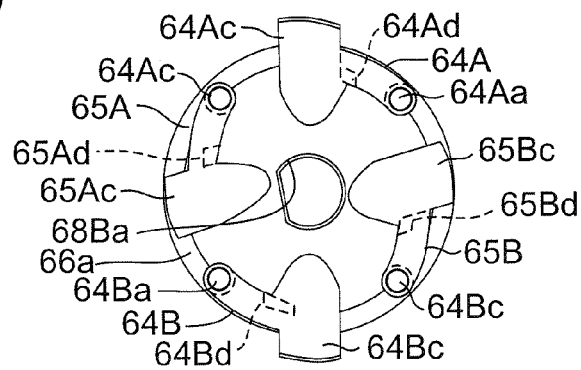
FIG. 41D is a diagram showing the manner of the hooks shown in FIGS. 37A to 40D sliding along corresponding cam grooves, focusing on the positional relationship between the camshaft and the hooks.

The separator hook 64A and the separator hook 64B shift such that, in accordance with the rotation of the camshaft 67*a*, their respective claw portions 64Ac, 64Bc are located at the position inside the spindle shaft 66*a* (see FIGS. 41A and 41B), the position outside the spindle shaft 66*a* (see FIG. 41C), and the position further outside the spindle shaft 66*a* (see FIG. 41D). It is to be noted that, the separator hooks 64A, 64B are provided with stoppers 64Ad, 64Bd for restricting the rotation range.

In the following, the position shown in FIG. 41A where all the hooks 64A to 65B are located inside the spindle shaft 66*a* is referred to as the stored position. Further, the position shown in FIG. 41B where only the bottom hooks 65A, 65B are located outside the spindle shaft 66*a* is referred to as the inner circumferential holding position. Further, the position shown in FIG. 41C where all the hooks 64A to 65B are located outside the spindle shaft 66*a* is referred to as the switching position. Further, the position shown in FIG. 41D where the separator hooks 64A, 64B are located further outside the spindle shaft 66*a* and the bottom hooks 65A, 65B are located inside the spindle shaft 66*a* is referred to as the separating position.

Next, with reference to FIGS. 42 to 50, a description will be given of the operation in which the carrier 6 separates one disc from a plurality of discs and places the separated disc on the tray 4*a* of the disc drive 4. It is to be noted that, throughout FIGS. 42 to 50, for the sake of convenience, the claw portions 64Ac, 64Ad of the separator hooks 64A, 64B and the claw portions 65Ac, 65Bc of the bottom hooks 65A, 65B are shown to be on an identical cross section. Further, here, the description is started from the state where the up-and-down pins 52*a* push out a plurality of discs 100 from the magazine tray 21.

Figure 42:
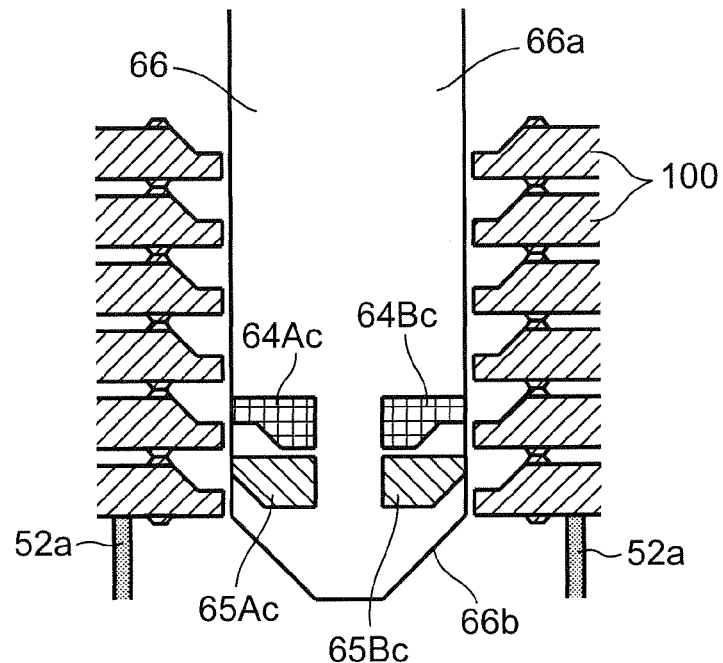
FIG. 42 is a diagram schematically showing the manner of the carrier shown in FIG. 18 separating one disc from a plurality of discs.

When the up-and-down pins 52*a* push out a plurality of discs 100, as shown in FIG. 42, the spindle unit 66 is inserted inside the center hole 100*a* of a plurality of discs 100. Here, the hooks 64A to 65B are located at the stored position (see FIG. 41A).

Figure 43:
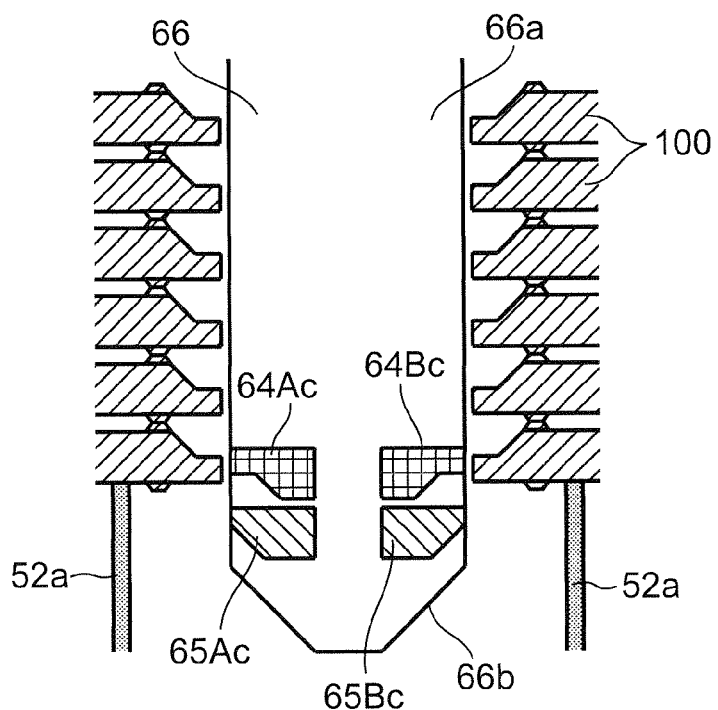
FIG. 43 is a diagram schematically showing the manner of the carrier shown in FIG. 18 separating one disc from a plurality of discs.
Figure 44:
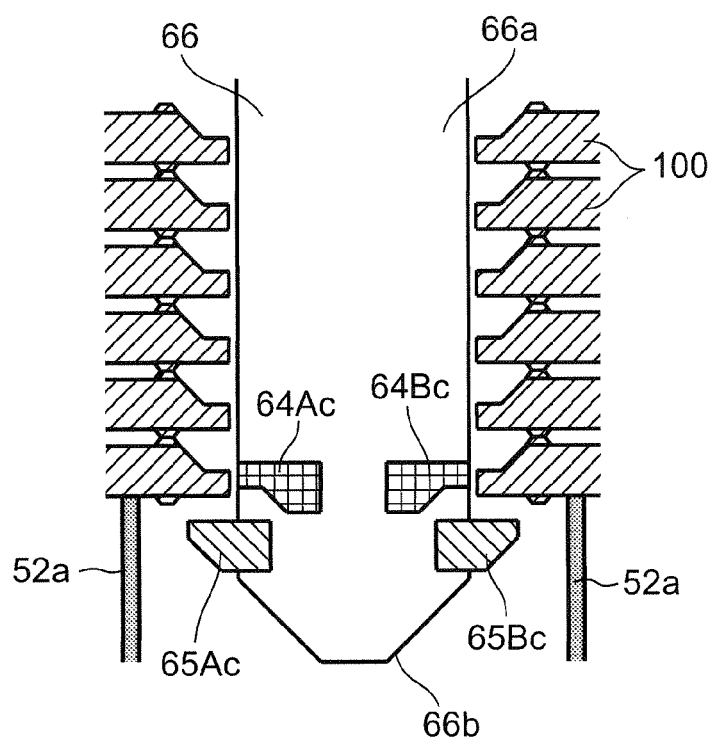
FIG. 44 is a diagram schematically showing the manner of the carrier shown in FIG. 18 separating one disc from a plurality of discs.

As shown in FIG. 43, when the up-and-down pins 52*a* push the plurality of discs 100 until the claw portions 65Ac, 65Bc of the bottom hooks 65A, 65B are located lower than the bottommost disc among the plurality of discs, the disc chuck motor 71 (see FIG. 19) is driven, whereby the camshaft 67*a* axially rotates in the normal direction. Thus, as shown in FIG. 44, the hooks 64A to 65B shift from the stored position (see FIG. 41A) to the inner circumferential holding position (see FIG. 41B).

Figure 45:
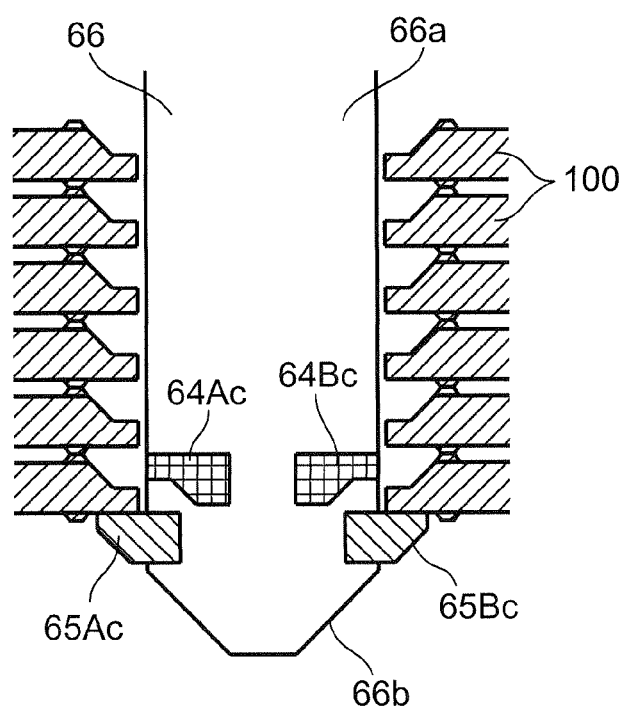
FIG. 45 is a diagram schematically showing the manner of the carrier shown in FIG. 18 separating one disc from a plurality of discs.

Thereafter, the shift base 61 is raised, and as shown in FIG. 45, the top face of the claw portions 65Ac, 65Bc of the bottom hooks 65A, 65B are brought into contact with the inner circumferential portion of the bottommost disc 100, to hold all the discs 100. Further, at this time, engagement between the spindle head 66*b* and the engaging portion 23*a* (see FIG. 2B) of the core rod 23 is released.

Figure 46:
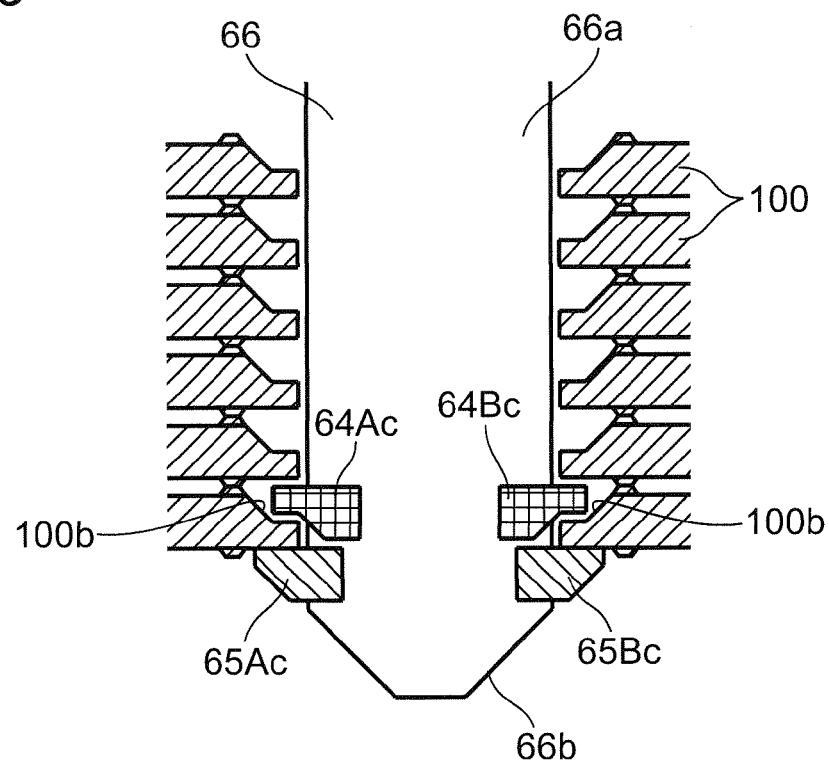
FIG. 46 is a diagram schematically showing the manner of the carrier shown in FIG. 18 separating one disc from a plurality of discs.

Thereafter, the disc chuck motor 71 (see FIG. 19) is further driven, whereby the camshaft 67*a* further rotates in the normal direction. Thus, the hooks 64A to 65B shift from the inner circumferential holding position (see FIG. 41B) to the switching position (see FIG. 41C), and as shown in FIG. 46, the claw portions 64Ac, 64Bc of the separator hooks 64A, 64B are inserted into the recess portion 100*b* of the bottommost disc 100.

Thereafter, the picker 3 shifts to the device-front side, whereby the magazine tray 21 recedes from the position near the disc drive 4 (see FIG. 22). Thereafter, the tray 4*a* of the disc drive 4 is discharged (see FIG. 23).

Figure 47:
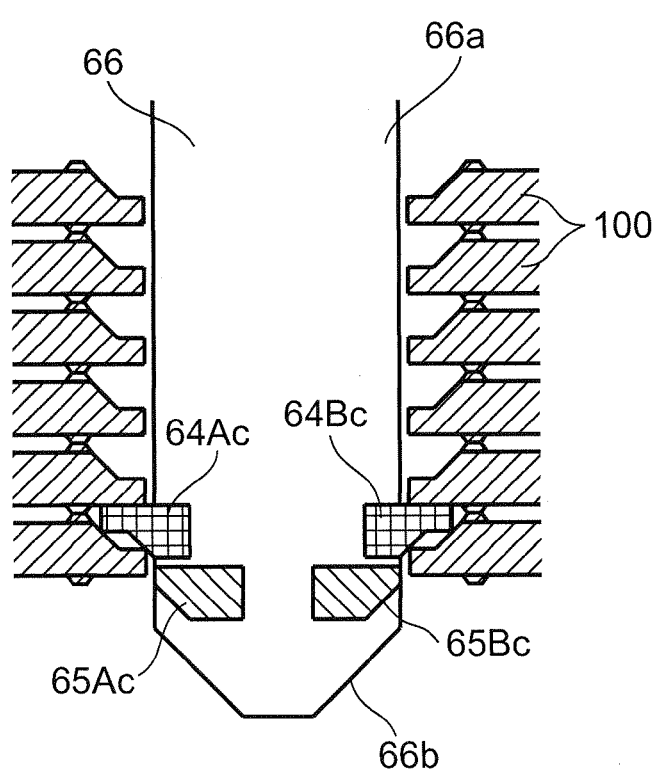
FIG. 47 is a diagram schematically showing the manner of the carrier shown in FIG. 18 separating one disc from a plurality of discs.
Figure 48:
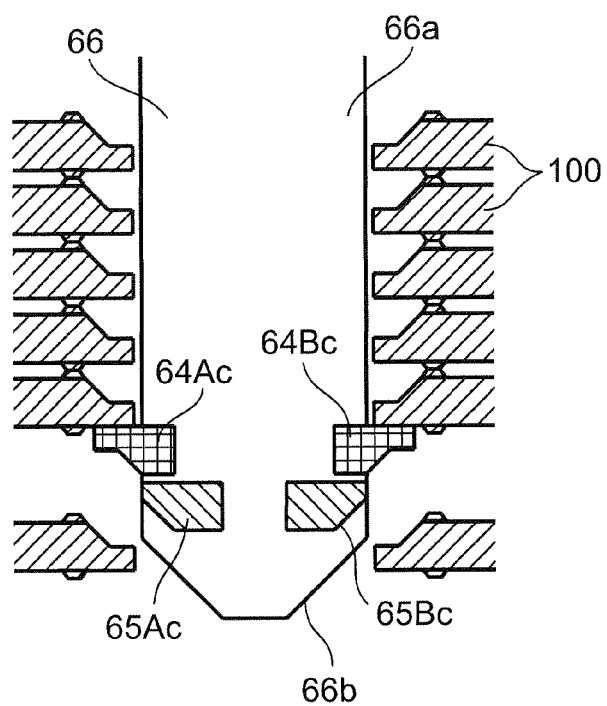
FIG. 48 is a diagram schematically showing the manner of the carrier shown in FIG. 18 separating one disc from a plurality of discs.

Thereafter, the shift base 61 is lowered such that the plurality of discs 100 retained by the spindle unit 66 is located above the tray 4*a* (e.g., immediately above). In this state, the disc chuck motor 71 is further driven, and the camshaft 67*a* is rotated further in the normal direction. Thus, the hooks 64A to 65B shift from the switching position (see FIG. 41C) to the separating position (see FIG. 41D), and as shown in FIG. 47, the claw portions 65Ac, 65Bc of the bottom hooks 65A, 65B shift to the position inside the spindle shaft 66*a*. As a result, as shown in FIG. 48, the bottommost disc 100 falls by its self weight, to be placed on the tray 4*a*. Further, at this time, the inclined face formed at the bottom face of each of the claw portions 64Ac, 64Bc of the separator hooks 64A, 64B pushes the bottommost disc 100 downward, to function to aid the disc 100 in falling by its self weight. Still further, at this time, the separator hooks 64A, 64B further project outside the spindle shaft 66*a*, and the top faces of the claw portions 64Ac, 64Bc of the separator hooks 64A, 64B are brought into contact with the inner circumferential portion of the bottommost disc 100 out of the rest of the disc, and hold the rest of the discs 100.

When the bottommost disc 100 is placed on the tray 4a, the shift base 61 is raised such that the spindle unit 66 and the tray 4a are not brought into contact with each other. Thereafter, the tray 4a is carried into the disc drive 4. Thereafter or simultaneously therewith, the tray 4a of the disc drive 4 opposing to the handled disc drive is ejected (not shown).

Figure 49:
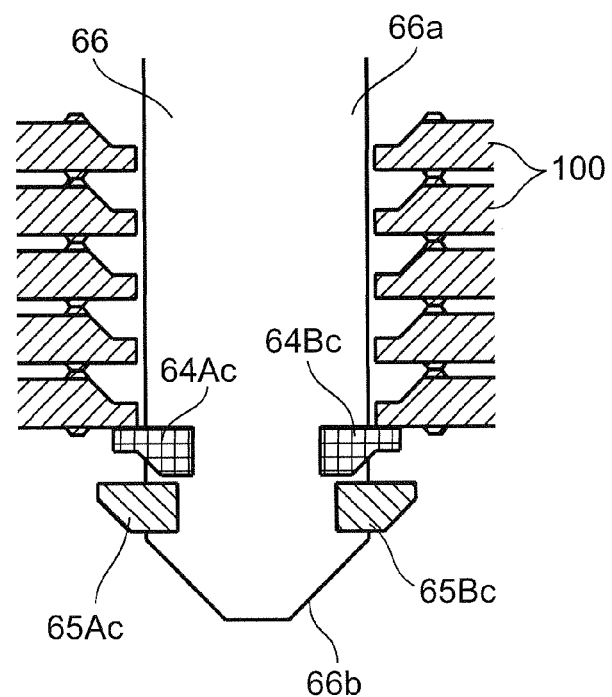
FIG. 49 is a diagram schematically showing the manner of the carrier shown in FIG. 18 separating one disc from a plurality of discs.

Thereafter, the disc chuck motor 71 is reversely driven, whereby the camshaft 67a rotates in the reverse direction. Thus, the hooks 64A to 65B shift from the separating position (see FIG. 41D) to the switching position (see FIG. 41C), and as shown in FIG. 49, the claw portions 65Ac, 65Bc of the bottom hooks 65A, 65B shift to the positions outside the spindle shaft 66a.

Figure 50:
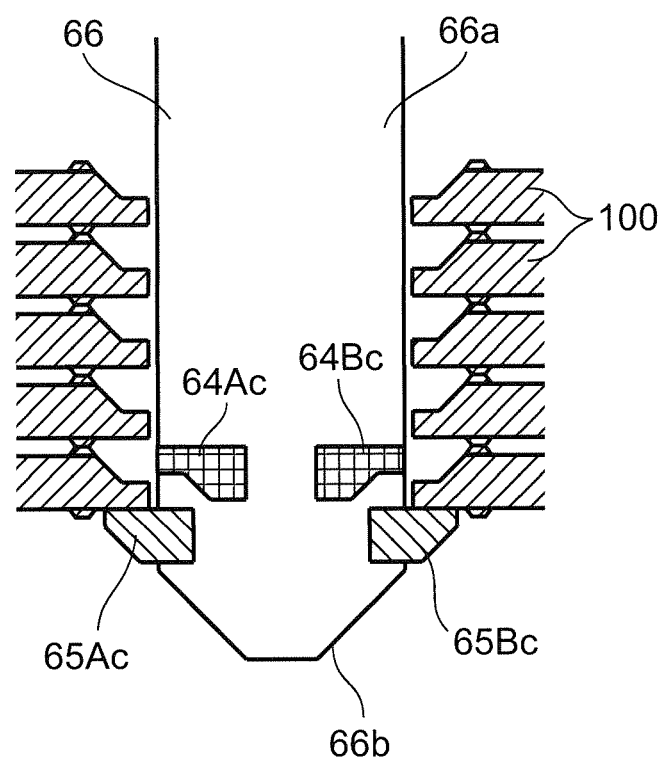
FIG. 50 is a diagram schematically showing the manner of the carrier shown in FIG. 18 separating one disc from a plurality of discs.

Thereafter, the disc chuck motor 71 is further reversely driven, whereby the camshaft 67a further rotates in the reverse direction. Thus, the hooks 64A to 65B shift from the switching position (see FIG. 41C) to the inner circumferential holding position (see FIG. 41B), whereby the claw portions 64Ac, 64Bc of the separators 64A, 64B shift to the positions inside the spindle shaft 66a as shown in FIG. 50. As a result, the rest of the discs 100 held by the top face of the claw portions 64Ac, 64Bc of the separator hooks 64A, 64B fall by their self weight, and held by the top face of the claw portions 65Ac, 65Bc of the bottom hooks 65A, 65B.

Thereafter, the disc chuck motor 71 is driven, whereby the camshaft 67a rotates in the normal direction. Thus, the hooks 64A to 65B shifts from the inner circumferential holding position (see FIG. 41B) to the switching position (see FIG. 41C), and as shown in FIG. 46, the claw portions 64Ac, 64Bc of the separator hooks 64A, 64B are inserted into the recess portion 100b of the bottommost disc 100.

Thereafter, the shift base 61 is lowered such that the plurality of discs 100 retained by the spindle unit 66 is located above (e.g., immediately above) the ejected tray 4a. In this state, the disc chuck motor 71 is further driven, whereby the camshaft 67a further shifts in the normal direction. Thus, the hooks 64A to 65B shift from the switching position (see FIG. 41C) to the separating position (see FIG. 41D), and as shown in FIG. 47, the claw portions 65Ac, 65Bc of the bottom hooks 65A, 65B shift to the position inner than the spindle shaft 66a. As a result, as shown in FIG. 48, the bottommost disc 100 falls by its self weight, to be placed on the tray 4a. Further, at this time, the separator hooks 64A, 64B further project outside the spindle shaft 66a, and the inclined face formed at the bottom face of each of the claw portions 64Ac, 64Bc of the separator hooks 64A, 64B pushes the bottommost disc 100 downward, to function to aid the disc 100 in falling by its self weight. Still further, at this time, the top faces of the claw portions 64Ac, 64Bc of the separator hooks 64A, 64B are brought into contact with the inner circumferential portion of the bottommost disc out of the rest of the discs, and hold the rest of the discs 100.

When the bottommost disc 100 is placed on the tray 4a, the shift base 61 is raised such that the spindle unit 66 and the tray 4a are not brought into contact with each other. Thereafter, the tray 4a is carried into the disc drive 4. Thus, the loading operation as to the disc drives 4 of the bottommost stage (first stage) is completed. This loading operation is repeated as to the second and following stages.

When the loading operation to the topmost-stage disc drives 4 is completed, all the disc drives 4 now accommodate the discs 100, and recording on or reproduction from the discs 100 in the disc drives 4 is enabled.

Next, a description will be given of the operation of the carrier 6 collecting the discs 100 from the disc drives 4.

Firstly, the tray 4a of the topmost-stage disc drive 4 is ejected.

Thereafter, the shift base 61 is lowered, and the spindle unit 66 is inserted into the center hole 100a of the disc 100 on the tray 4a. At this time, the hooks 64A to 65B are at the stored position (see FIG. 41A).

When the shift base 61 is lowered until the disc 100 is located above the bottom hooks 65A, 65B, the disc chuck motor 71 (see FIG. 19) is driven, whereby the camshaft 67a rotates in the normal direction. Thus, the hooks 64A to 65B shift from the stored position (see FIG. 41A) to the inner circumferential holding position (see FIG. 41B).

Thereafter, the shift base 61 is raised, and the top face of the claw portions 65Ac, 65Bc of the bottom hooks 65A, 65B are brought into contact with the inner circumferential portion of the disc 100, to retain the disc 100. Thus, the disc 100 on the tray 4a is collected.

Thereafter, the tray 4a from which the disc 100 is collected is carried into the disc drive 4. Thereafter or simultaneously therewith, the tray 4a of the disc drive 4 opposing to the handled disc drive 4 is ejected.

Thereafter, the shift base 61 is lowered such that the disc retained by the spindle unit 66 is located above (e.g., immediately above) the disc 100 on the ejected tray 4a.

Thereafter, the disc chuck motor 71 (see FIG. 19) is reversely driven, and the camshaft 67a rotates in the reverse direction. Thus, the hooks 64A to 65B shift from the inner circumferential holding position (see FIG. 41B) to the stored position (see FIG. 41A). Thus, the disc 100 retained by the spindle unit 66 falls by its self weight, and stacked on the disc 100 on the ejected tray 4a.

Thereafter, the shift base 61 is lowered, and the spindle unit 66 is inserted into the center holes 100a of the two discs 100 on the ejected tray 4a.

When the shift base 61 is lowered until the two discs 100 are located above the bottom hooks 65A, 65B, the disc chuck motor 71 (see FIG. 19) is driven, whereby the camshaft 67a rotates in the normal direction. Thus, the hooks 64A to 65B shift from the stored position (see FIG. 41A) to the inner circumferential holding position (see FIG. 41B).

Thereafter, the shift base 61 is raised, and the top faces of the claw portions 65Ac, 65Bc of the bottom hooks 65A, 65B are brought into contact with the inner circumferential portion of the bottommost disc 100, to hold all the discs 100.

Thereafter, the tray 4a from which the disc 100 is collected is carried into the disc drive 4. Thus, the disc collection operation of the disc drives 4 of the topmost stage (first stage) is completed. This disc collection operation is repeated until the discs 100 in the bottommost-stage disc drives 4 are collected.

When the spindle unit 66 has collected all the discs 100, the shift base 61 is raised. Thereafter, the picker 3 shifts to the device-rear side, and the magazine tray 21 is set below the spindle unit 66.

Thereafter, the shift base 61 is lowered, and the spindle head 66b (see FIG. 33) engages with the engaging portion 23a (see FIG. 2B) of the core rod 23, whereby the spindle head 66b and the core rod 23 become coaxial to each other.

Thereafter, the disc chuck motor 71 (see FIG. 19) is reversely driven, whereby the camshaft 67a rotates in the reverse direction. Thus, the hooks 64A to 65B shift from the inner circumferential holding position (see FIG. 41B) to the stored position (see FIG. 41A). Thus, all the discs 100 retained by the spindle unit 66 fall by their self weight along the spindle head 66b and the core rod 23, and stored in the magazine tray 21.

Next, a more detailed description will be given of the structure of the carrier 6.

Figure 52:
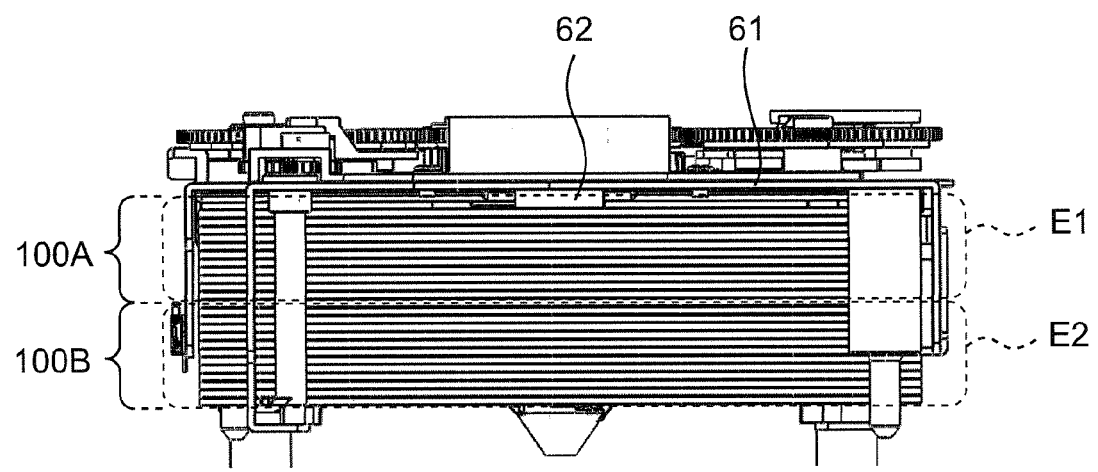
FIG. 52 is a side view showing the state where the carrier shown in FIG. 18 retains first and second plurality of discs.

As shown in FIG. 52, the carrier 6 is structured to be capable of retaining a stacked object made up of a first plurality of (for example, twelve) discs 100A and a second plurality of (for example, twelve) discs 100B. In the present embodiment, the first plurality of discs 100A are the discs collected from a plurality of (for example, twelve) disc drives 4, respectively, and the second plurality of discs 100B are the discs to be supplied next to a plurality of disc drives 4, respectively.

In the state where the carrier 6 retains the stacked object made up of the first and second plurality of discs 100A, 100B, a first retaining space E1 where the first plurality of discs 100A is structured to be located at the same height as a second retaining space E2 where the second plurality of discs 100B is located.

The second retaining space E2 is provided above the nail portions 64Ac to 65Bc of the bottom hooks 65A, 65B being an exemplary disc holding unit. The first retaining space E1 is provided so as to be in contact with the second retaining space E2 on the second retaining space E2.

Figure 53:
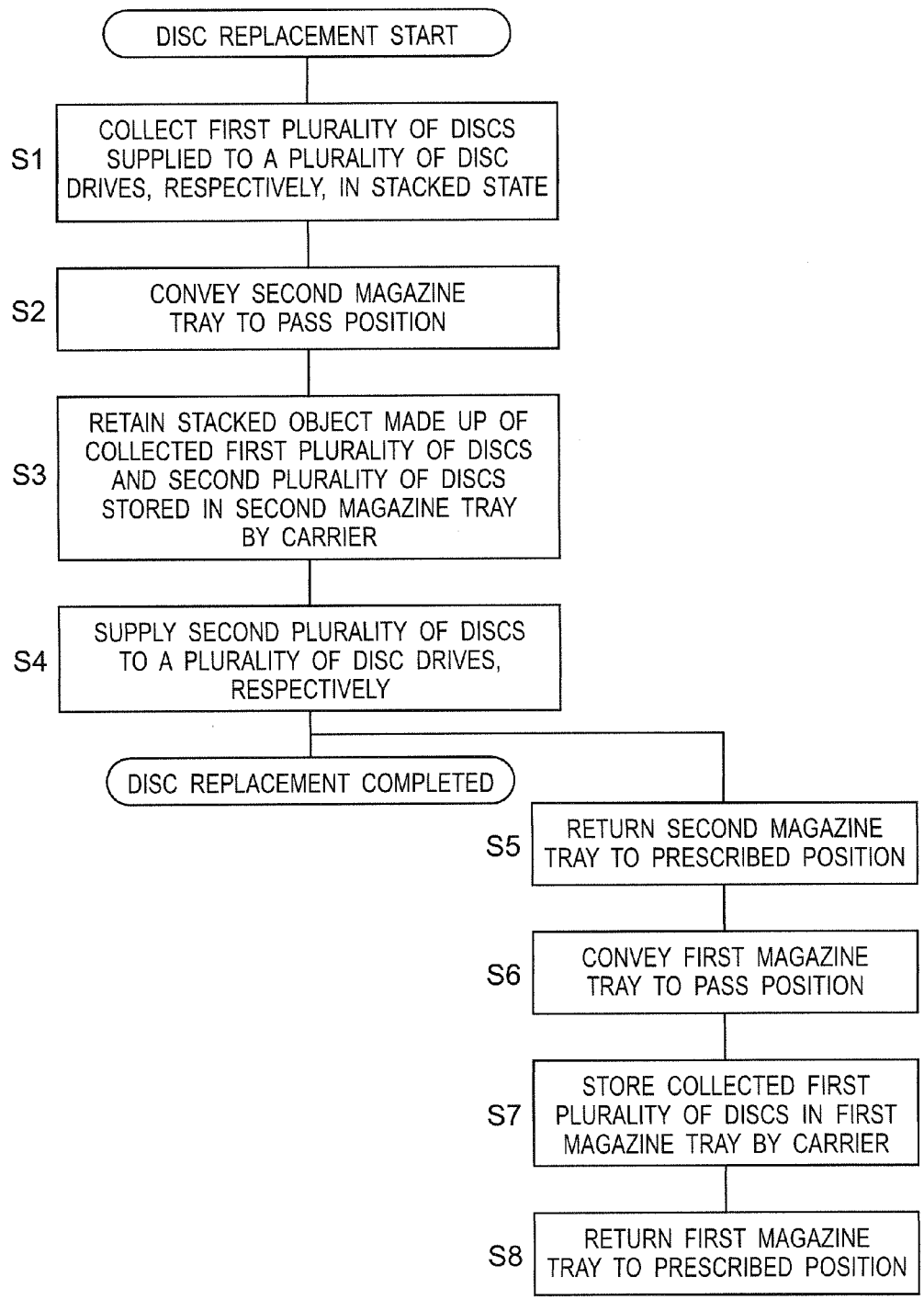
FIG. 53 is a flowchart showing a disc replacing operation performed by the disc device shown in FIG. 1.

Next, with reference to FIGS. 51 to 58, a description will be given of a disc replacing operation performed by the disc device according to the present embodiment. FIG. 53 is a flowchart showing the disc replacing operation performed by the disc device according to the present embodiment. FIGS. 54 to 58 are each a perspective view showing the disc replacing operation performed by the disc device according to the present embodiment.

Figure 51:
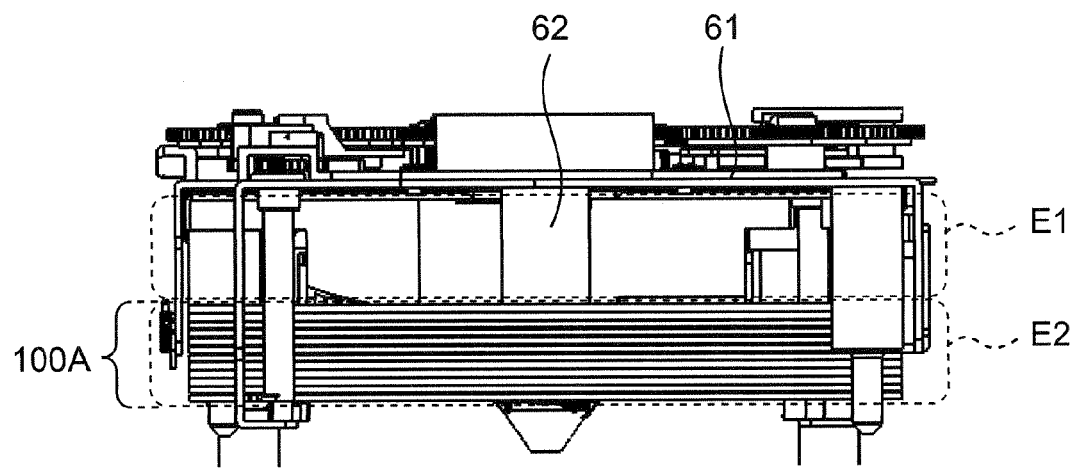
FIG. 51 is a side view showing the state where the carrier shown in FIG. 18 retains a first plurality of discs.

Firstly, the first plurality of discs 100A supplied to a plurality of disc drives 4, respectively, are collected by the carrier 6 in a stacked state, as shown in FIG. 51 (Step S1).

Figure 54:
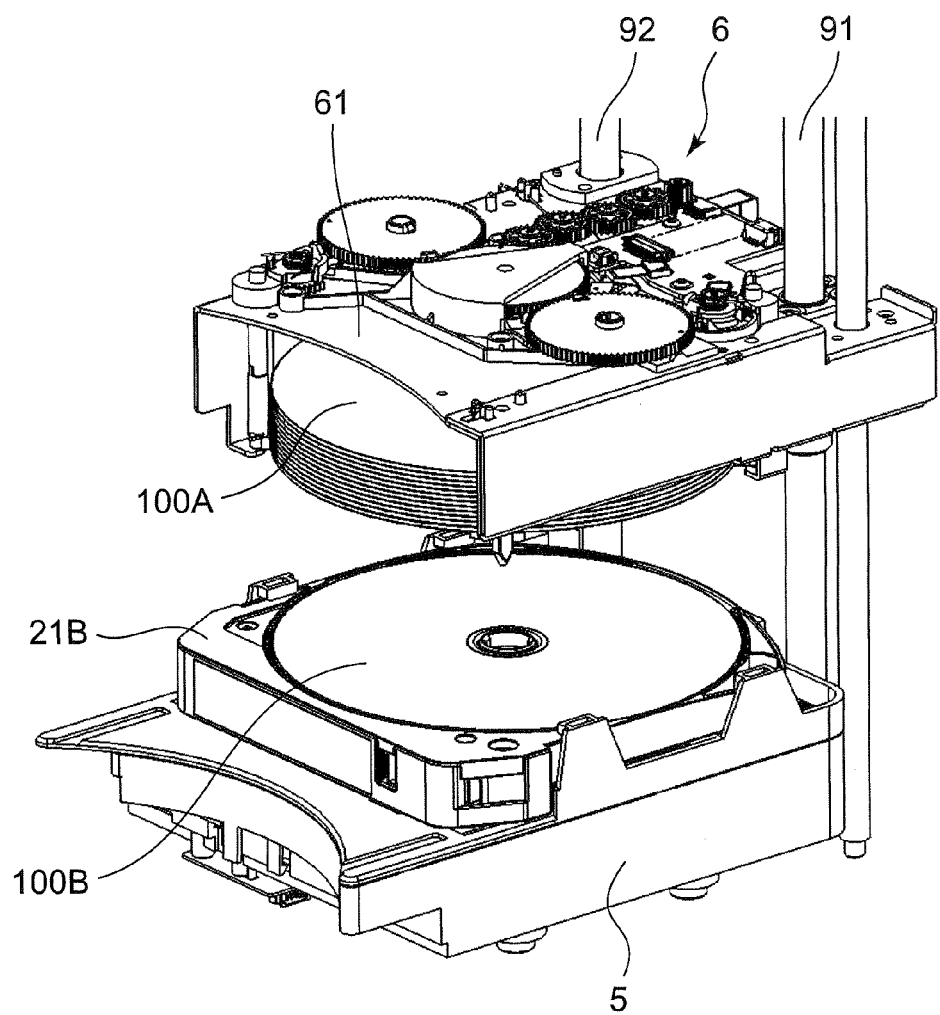
FIG. 54 is a perspective view showing the disc replacing operation performed by the disc device shown in FIG. 1.

Next, as shown in FIG. 54, a second magazine tray 21B storing the second plurality of discs 100B to be supplied next to a plurality of disc drives 4 is conveyed to the pass position (Step S2). Here, the "pass position" refers to the position where a plurality of discs can be passed from the carrier 6 to the magazine tray 21 or from the magazine tray 21 to the carrier 6 (in the present embodiment, the position shown in FIG. 15).

It is to be noted that, in Step S1, it is also possible to allow part of the convey operation of the second magazine tray 21B to be processed in parallel, to thereby reduce the time taken for Step S2.

Next, as shown in FIG. 52, the carrier 6 retains the stacked object made up of the collected first plurality of discs 100A and the second plurality of discs 100B stored in the second magazine tray 21B (Step S3).

Figure 55:
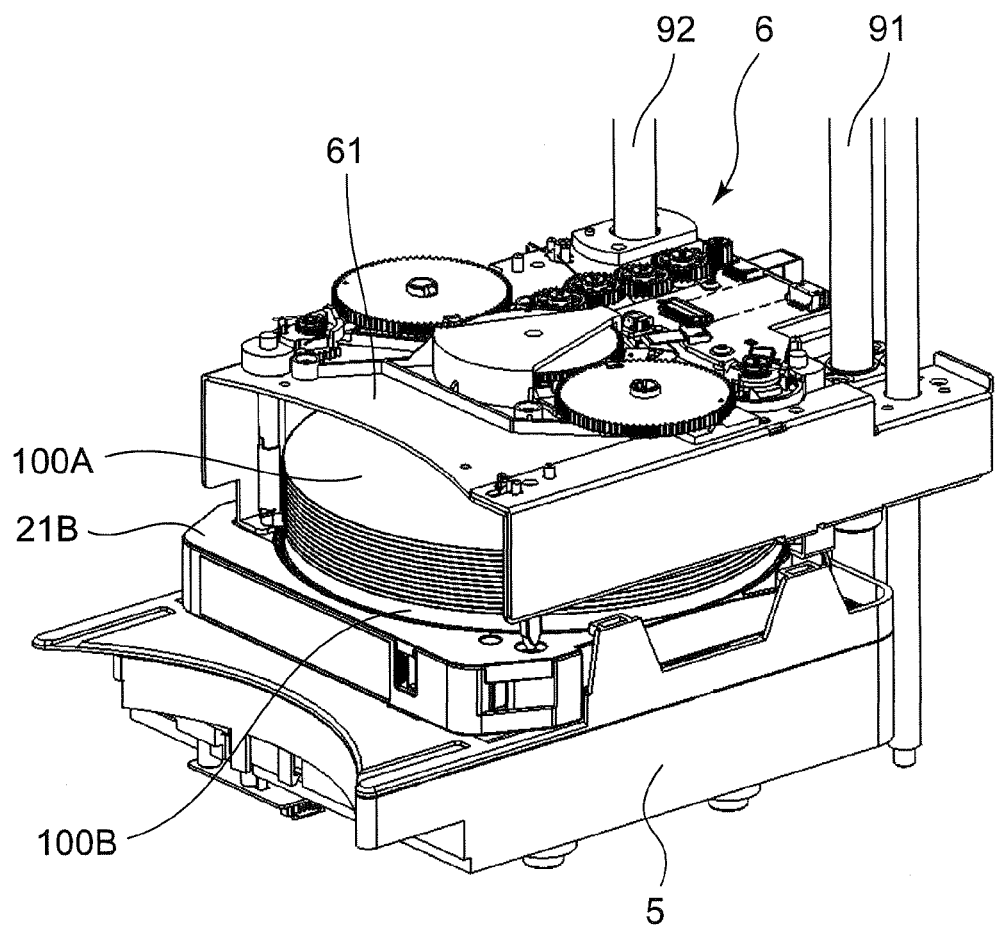
FIG. 55 is a perspective view showing the disc replacing operation performed by the disc device shown in FIG. 1.
Figure 56:
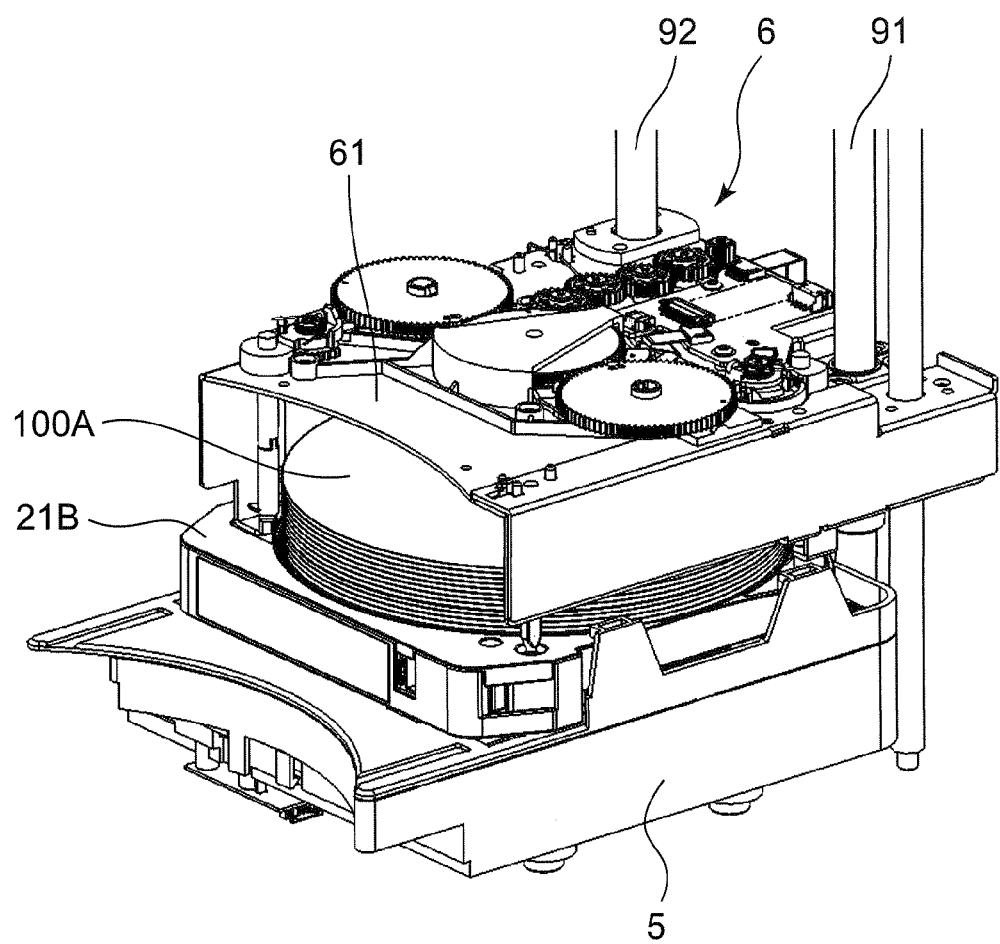
FIG. 56 is a perspective view showing the disc replacing operation performed by the disc device shown in FIG. 1.
Figure 57:
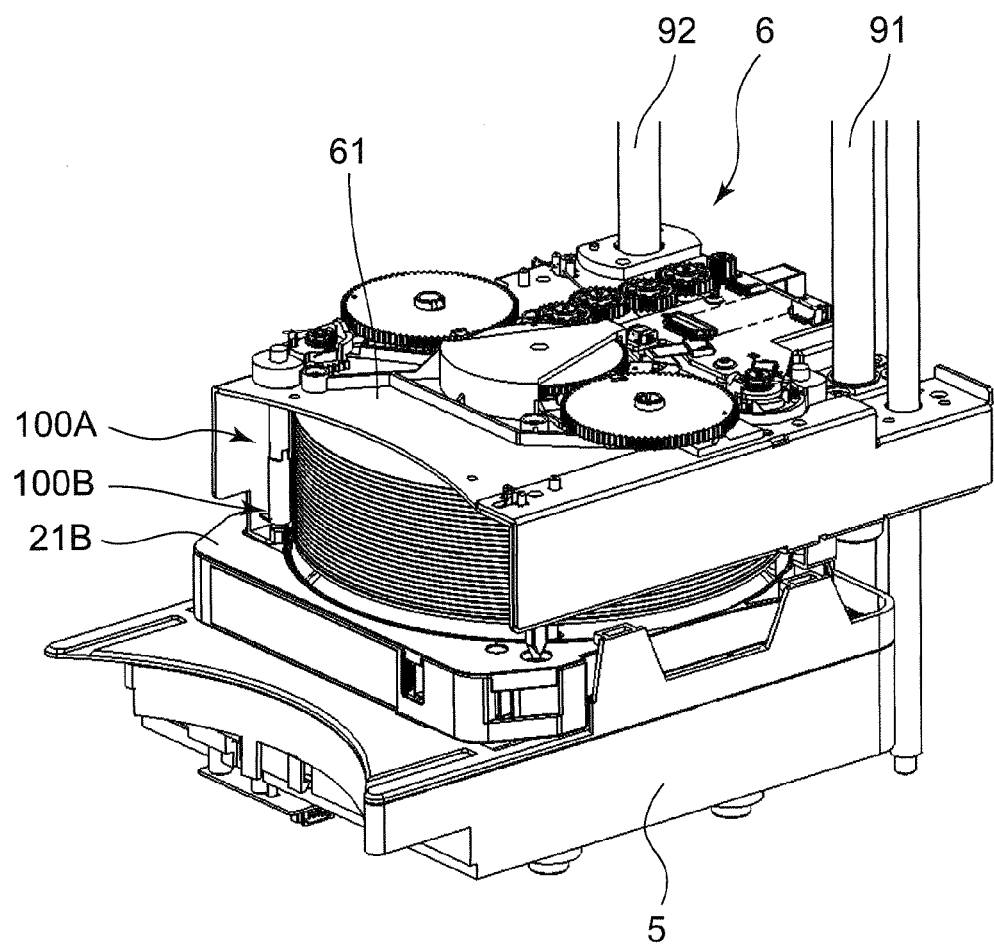
FIG. 57 is a perspective view showing the disc replacing operation performed by the disc device shown in FIG. 1.
Figure 58:
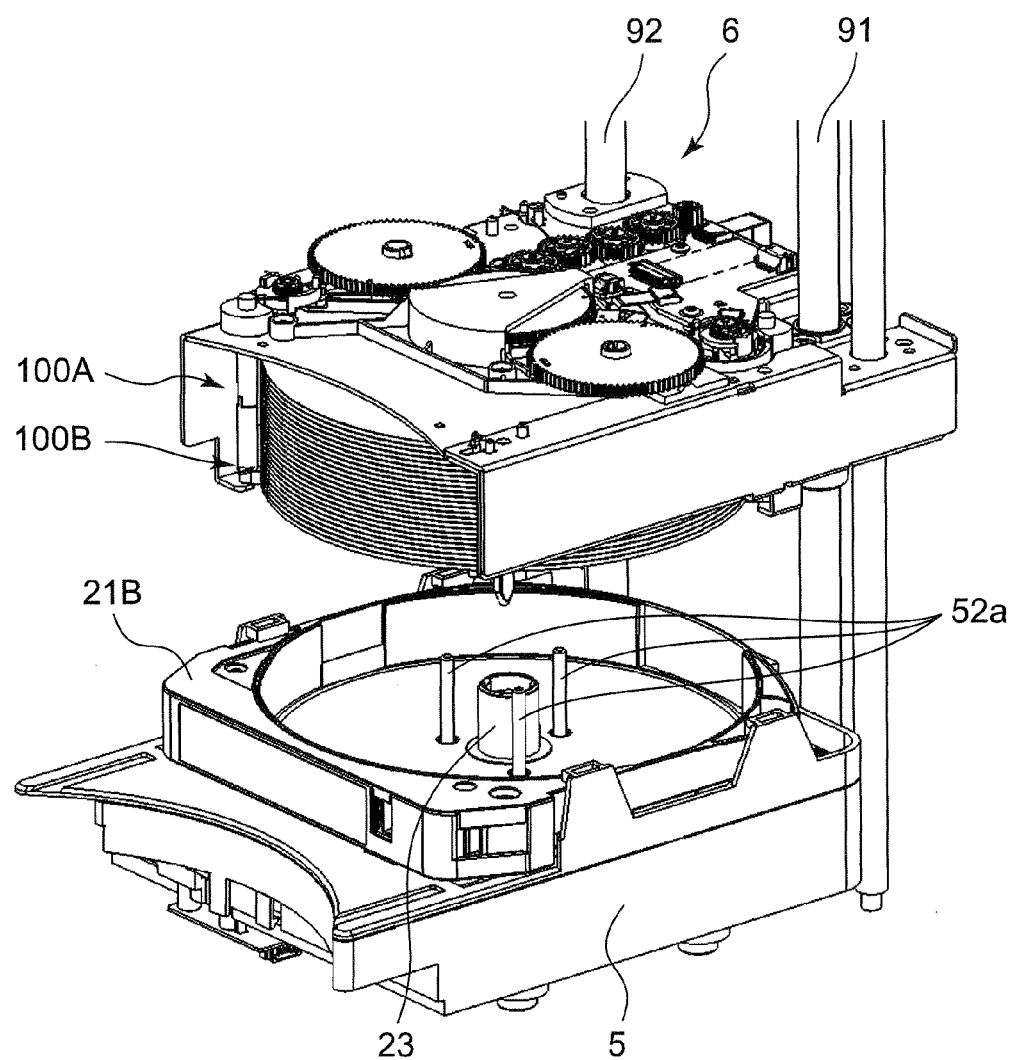
FIG. 58 is a perspective view showing the disc replacing operation performed by the disc device shown in FIG. 1.

More specifically, as shown in FIG. 55, the carrier 6 is lowered to the area near the second magazine tray 21B, and the tip portion of the disc chuck unit 62 engages with the engaging portion 23a (see FIG. 2B) of the core rod 23 provided at the magazine tray 21. Thereafter, the carrier 6 shifts the hooks 64A to 65B from the inner circumference holding position (see FIG. 41B) to the stored position (see FIG. 41A), to thereby once release retaining of the first plurality of discs 100A. Thus, as shown in FIG. 56, the first plurality of discs 100A is stacked on the second plurality of discs 100B. Thereafter, as shown in FIGS. 57 and 58, the carrier 6 retains the stacked object made up of the first plurality of discs 100A and the second plurality of discs 100B. Thereafter, the carrier 6 is raised, and engagement between the tip portion of the disc chuck unit 62 and the engaging portion 23a of the core rod 23 is released. Thus, the state shown in FIG. 58 is entered.

Next, the second plurality of discs 100B are supplied to a plurality of disc drives 4, respectively (Step S4). By the foregoing procedure, replacement of the discs in all the disc drives is completed, and any information can be recorded on or reproduced from the discs 100 in the disc drives 4.

Next, the second magazine tray 21B is returned to a prescribed position (Step S5).

Next, the first magazine tray (not shown) is conveyed to the pass position (Step S6).

Next, the carrier 6 stores the collected first plurality of discs 100A in the first magazine tray (Step S7).

Next, the first magazine tray is returned to a prescribed position (an arbitrary position in the magazine stocker 1) (Step S8).

With the disc device according to the present embodiment, the carrier 6 is structured to be capable of retaining the stacked object made up of the first plurality of discs 100A and the second plurality of discs 100B. Thus, the carrier 6 is allowed to retain the second plurality of discs 100B in addition to the first plurality of discs 100A, and to supply the second plurality of discs 100B to a plurality of disc drives 4, respectively. This makes it possible to reduce the steps required for replacing the discs from seven steps (Steps S11 to S17) to four steps (Steps S1 to S4), and the disc replacing time can be drastically suppressed.

It is to be noted that, since the operations of Steps S5 to S8 can be performed while the disc drives 4 are recording or reproducing any information with the disc 100, it is not necessary to stop the disc drives 4 for replacing the discs. That is, the time taken for performing the operations of Step S5 to S8 does not influence the disc replacing time.

Further, with the disc device according to the present embodiment, since the carrier 6 is structured to be capable of retaining the stacked object made up of the first plurality of discs 100A and the second plurality of discs 100B, the following operations can also be performed.

For example, suppose the case in which, when the carrier 6 retains the first plurality of discs 100A for supplying them to a plurality of disc drives 4, the operator instructs the carrier 6 to supply not the first plurality of discs 100A but the second plurality of discs 100B to a plurality of disc drives 4. In this case, with the disc device according to the present embodiment, it is possible to cause the carrier 6 to retain the second plurality of discs 100B in addition to the first plurality of discs 100A, and to supply the second plurality of discs 100B to a plurality of disc drives 4. Thus, the time required for replacing the first plurality of discs 100A by the second plurality of discs 100B as the discs to be supplied to a plurality of disc drives 4 can be suppressed.

Figure 59:
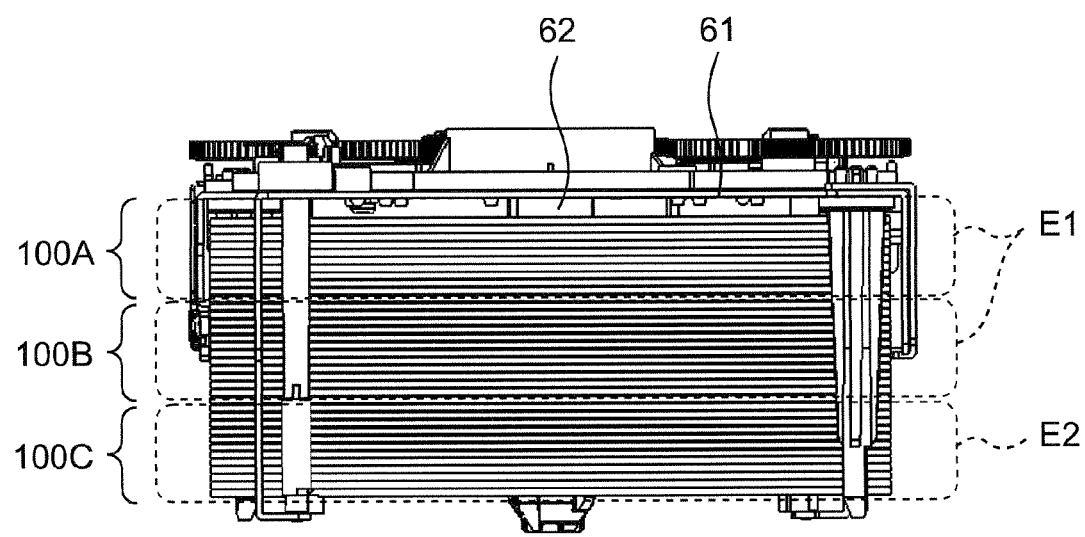
FIG. 59 is a perspective view showing the disc replacing operation performed by the disc device shown in FIG. 1.

It is to be noted that, in the foregoing, though the first retaining space E1 and the second retaining space E2 are structured to have the same height, the present disclosure is not limited thereto. For example, it is also possible for the first retaining space E1 to be structured to have a height corresponding to an integral multiple of two or more times the height of the second retaining space E2. With this structure, as shown in FIG. 59, the carrier 6 can retain a third plurality of discs 100C, in addition to the first and second plurality of discs 100A and 100B. Thus, in the event the magazine trays require successive replacement, for example when the user of the device specifies a wrong magazine tray to be replaced, the operations can be completed with no influence relating to the time taken for performing the operations of Steps S5 to S8.

It is to be noted that, in the foregoing, though it is assumed that the same number of pieces of the discs are stored in every magazine tray 21, the present disclosure is not limited thereto. The number of pieces of the discs stored in the magazine trays 21 may vary among the magazine trays 21. In this case, the height of the first retaining space E1 should be set as appropriate in accordance with the number of pieces of the first plurality of discs 100A. That is, the height of the first retaining space E1 may be greater or smaller than the height of the second retaining space E2.

Still further, in the foregoing, the carrier 6 once releases retaining of the first plurality of discs 100B above the second plurality of discs 100B, to allow the first plurality of discs 100A to be stacked on the second plurality of discs 100B. Thereafter, the carrier 6 retains the stacked object made up of the first and second plurality of discs 100A and 100B. However, the present disclosure is not limited thereto. The carrier 6 may be structured to further retain, in the state in which it retains the first plurality of discs 100A, the second plurality of discs 100B.

Figure 60:
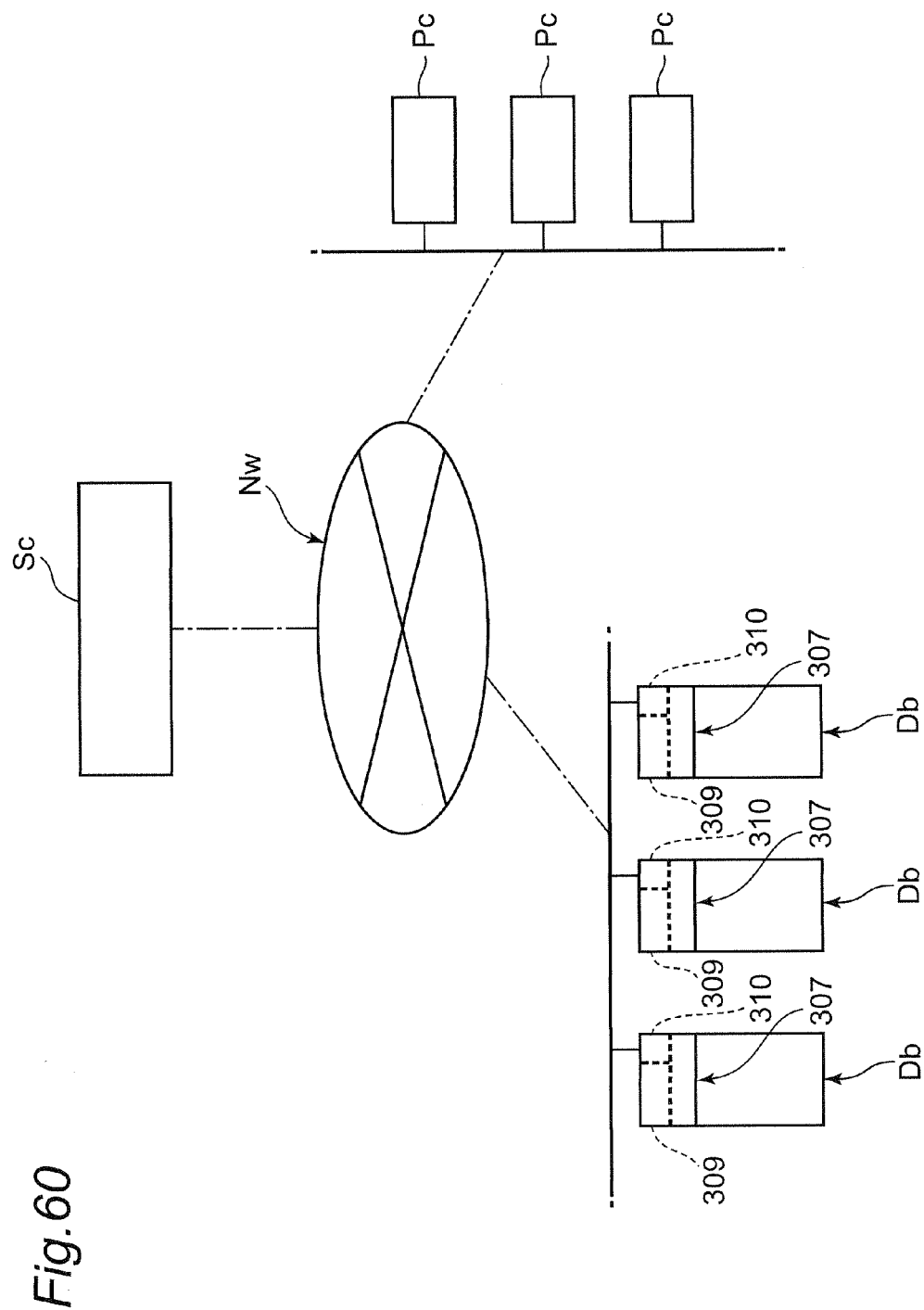
FIG. 60 is a configuration diagram showing an exemplary system configuration when control is exerted over the disc device shown in FIG. 1 using cloud computing system.
Figure 61:
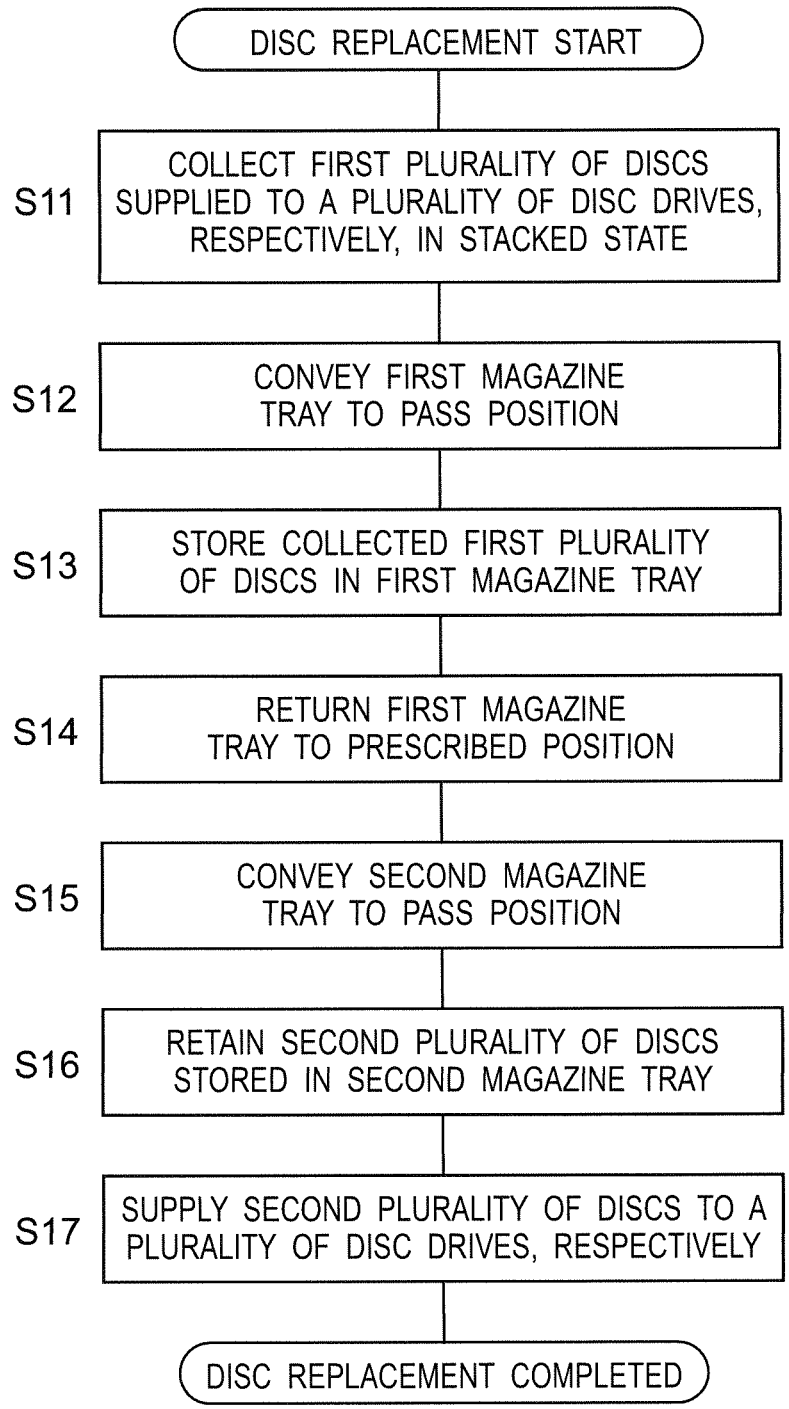
FIG. 61 is a flowchart showing a disc replacing operation according to a comparative example.

Still further, in the foregoing, though the control unit provided to the electric circuit and the power supply 7 controls the operations of devices such as the picker 3, the disc drive 4, the carrier 6 and the like in accordance with instructions from the host computer, such control can also be exerted through use of a so-called cloud computing system. FIG. 60 is a configuration diagram schematically showing an exemplary system configuration when the disc device is controlled through use of a cloud computing system.

As shown in FIG. 60, the cloud computing system includes a server Sc that can be accessed through a network Nw (a so-called cloud server). In this case, a disc device Db includes a network communication unit 310 in a control unit 307 provided to the electric circuit and the power supply 7, for example. This network communication unit 310 enables the disc device Db to be communicatively connected to the cloud server Sc via the network Nw. Such a network communication unit 310 can be provided in the control unit 307 of the disc device D, or it can be provided separately from the control unit 307.

A user terminal machine Pc for operating the disc device Db is also communicatively connected to the cloud server Sc via the network Nw. As such a user terminal machine Pc, for example, a so-called personal computer whose substantial unit is a microcomputer and which has a communication function can be used.

The cloud server Sc retains, for example, programs for exerting control or executing operations through use of the user terminal machine Pc, and furthermore at least part of data required for such control or operations. Then, in accordance with any request from the user, the required programs, data and others can be downloaded in each time to be used.

Further, as shown in FIG. 60, such a plurality of user terminal machines Pc may be connected to the network Nw. Still further, it is also possible to connect a plurality of disc devices Db to the network Nw and to control each of them.

It is to be noted that the disc device Db described above is structured similarly to the disc device according to the foregoing embodiment to perform similar operations, except that the disc device Db includes the network communication unit 310 and is controlled through use of the cloud server Sc.

As compared to the conventional case where programs, data and others are retained by the disc device, the user terminal machine or any storage device provided thereto, use of such a cloud computing system makes it possible to simplify such equipment or devices. It is particularly effective when the programs, data and others to be used become inevitably great in volume.

It is to be noted that, the cloud server Sc may be used for data backup of the disc device Db, in place of or in addition to a use for control or operations of the disc device Db.

In the foregoing, the embodiment has been described in order to illustrate the technique of the present disclosure. The accompanying drawings and the detailed description are provided therefor.

Accordingly, the constituents shown in the accompanying drawings and the detailed description may contain not only the constituents essential for solving the problem, but also the constituents not being essential but presented for the purpose of illustrating the technique. Therefore, those non-essential constituents in the accompanying drawings or the detailed description should not be immediately determined as being essential on the basis of those non-essential constituents being shown in the accompanying drawings or the detailed description.

Further, since the foregoing embodiment is an illustration of the technique of the present disclosure, various changes, replacements, additions, or eliminations can be made within the scope of claims and equivalents thereof.

With the disc device of the present disclosure, the disc replacing time can further be suppressed. Accordingly, it is particularly useful for a disc device including many magazines.

The disclosure of Japanese Patent Application No. 2012-136004 filed on Jun. 15, 2012 including specification, drawing and claims are incorporated herein by reference in its entirety.

The invention claimed is:

1. A disc device, comprising:
a plurality of disc drives,
a magazine configured to store a plurality of discs,
a picker configured to convey the plurality of discs stored in the magazine toward the plurality of disc drives while the plurality of discs are in a stacked state, and
a carrier configured to retain the plurality of discs conveyed by the picker in the stacked state, to supply the retained plurality of discs to a respective one of the plurality of disc drives, and to collect the supplied plurality of discs in a stacked state,
wherein the carrier is further configured to retain a stacked object made up of a first plurality of discs collected from the plurality of disc drives and a second plurality of discs to be supplied next to the plurality of disc drives.

2. The disc device according to claim 1, wherein:
in a state in which the carrier retains the stacked object, a first retaining space where the first plurality of discs are located has a height corresponding to an integral multiple of two or more times a height of a second retaining space where the second plurality of discs are located.

3. The disc device according to claim 2, wherein:
the carrier includes a disc holding unit configured to hold a bottommost disc of the plurality of discs,
the second retaining space is located above the disc holding unit, and
the first retaining space is in contact with the second retaining space on the second retaining space.

4. The disc device according to claim 1, wherein:
the carrier is configured to release retaining of the first plurality of discs above the second plurality of discs, to stack the first plurality of discs on the second plurality of discs, and to thereafter retain the stacked object made up of the first plurality of discs and the second plurality of discs.

5. The disc device according to claim 4, wherein:
the carrier includes a disc chuck unit configured to be inserted into a center hole of each of the first plurality of discs and the second plurality of discs, and to retain the first plurality of discs and the second plurality of discs.

6. The disc device according to claim 4, further comprising:
a first magazine tray configured to store the first plurality of discs, and
a second magazine tray configured to store the second plurality of discs,
wherein the carrier is configured to stack the first plurality of discs on the second plurality of discs stored in the second magazine tray, to thereafter retain the stacked object, to supply the second plurality of discs of the stacked object to a respective one of the plurality of disc drives, and to thereafter store the first plurality of discs in the first magazine tray.

7. The disc device according to claim 6, wherein:
the picker is configured to convey the first magazine tray and the second magazine tray,
the picker is configured to allow the carrier to retain the stacked object by conveying the second magazine tray to a pass position in a state in which the carrier retains the first plurality of discs,
the picker is further configured so that, when the carrier supplies the second plurality of discs of the stacked object to a respective one of the plurality of disc drives, the picker conveys the second magazine tray to a prescribed position and conveys the first magazine tray to the pass position, and
the picker is further configured so that, after the carrier stores the first plurality of discs in the first magazine tray, the picker conveys the first magazine tray to a prescribed position.

\* \* \* \* \*